United States Patent
Seo et al.

(10) Patent No.: US 12,523,840 B2
(45) Date of Patent: Jan. 13, 2026

(54) ACTUATOR FOR CAMERA, CAMERA MODULE, AND PORTABLE ELECTRONIC DEVICE INCLUDING THE SAME

(71) Applicant: SAMSUNG ELECTRO-MECHANICS CO., LTD., Suwon-si (KR)

(72) Inventors: Bo Sung Seo, Suwon-si (KR); Ji Buem Chun, Suwon-si (KR); Jae Won Jung, Suwon-si (KR); Nam Ki Park, Suwon-si (KR); Jun Sup Shin, Suwon-si (KR); Young Bok Yoon, Suwon-si (KR); Su Kyeong Kim, Suwon-si (KR); Kyung Hun Lee, Suwon-si (KR); Hwan Jun Kang, Suwon-si (KR); Jong Woo Hong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1020 days.

(21) Appl. No.: 17/588,730

(22) Filed: Jan. 31, 2022

(65) Prior Publication Data

US 2022/0252826 A1 Aug. 11, 2022

(30) Foreign Application Priority Data

Feb. 5, 2021 (KR) ........................ 10-2021-0016696

(51) Int. Cl.
  *G02B 7/08* (2021.01)
  *G02B 27/64* (2006.01)
  (Continued)

(52) U.S. Cl.
  CPC ............. *G02B 7/08* (2013.01); *G02B 27/646* (2013.01); *G03B 5/00* (2013.01); *G03B 13/36* (2013.01); *G03B 2205/0007* (2013.01)

(58) Field of Classification Search
  CPC .......... G02B 7/08; G02B 27/646; G03B 5/00; G03B 13/36; G03B 2205/0007;
  (Continued)

(56) References Cited

U.S. PATENT DOCUMENTS

2007/0127325 A1 6/2007 Yamashita
2015/0049209 A1* 2/2015 Hwang ................. H04N 23/57
                                              348/208.11
(Continued)

FOREIGN PATENT DOCUMENTS

CN       110830687 A      2/2020
KR   10-2015-0117235 A   10/2015
(Continued)

OTHER PUBLICATIONS

Indian Office Action issued on Sep. 15, 2022, in counterpart Indian Patent Application No. 202214005864 (5 pages in English).
(Continued)

*Primary Examiner* — Ephrem Z Mebrahtu
(74) *Attorney, Agent, or Firm* — NSIP Law

(57) ABSTRACT

An actuator for a camera includes a housing having an inner space, a base and a carrier, disposed in the housing in one direction, a first drive unit generating driving forces in a first direction perpendicular to the one direction and a second direction perpendicular to both the one direction and the first direction, and including a plurality of magnets and a plurality of coils, and a second drive unit generating a driving force in the one direction, and including a magnet and a coil, wherein an optical member is disposed on the carrier, wherein the carrier and the base are configured to be moved together in the first direction and the second direction, and wherein the carrier is configured to be moved relative to the base in the one direction.

31 Claims, 36 Drawing Sheets

(51) Int. Cl.
  *G03B 5/00* (2021.01)
  *G03B 13/36* (2021.01)
(58) Field of Classification Search
  CPC ...... H04N 23/54; H04N 23/55; H04N 23/682;
           H04N 23/687; H02K 41/0354
  See application file for complete search history.

(56) References Cited

U.S. PATENT DOCUMENTS

| | | | |
|---|---|---|---|
| 2015/0146025 A1 | 5/2015 | Bang et al. | |
| 2017/0108705 A1 | 4/2017 | Yu et al. | |
| 2018/0031854 A1* | 2/2018 | Hu | G03B 3/10 |
| 2020/0050013 A1 | 2/2020 | Rhee et al. | |
| 2020/0209439 A1* | 7/2020 | Hu | G02B 3/14 |
| 2020/0333686 A1* | 10/2020 | Kim | G03B 30/00 |
| 2022/0014677 A1* | 1/2022 | Smyth | G02B 7/09 |
| 2022/0146852 A1 | 5/2022 | Yu et al. | |
| 2022/0187616 A1 | 6/2022 | Lee | |
| 2023/0194959 A1* | 6/2023 | Kim | G03B 17/02 359/823 |
| 2023/0305362 A1* | 9/2023 | Lee | H02K 11/33 |
| 2024/0040253 A1* | 2/2024 | Min | H04N 23/54 |

FOREIGN PATENT DOCUMENTS

| | | |
|---|---|---|
| KR | 10-2016-0121684 A | 10/2016 |
| KR | 10-2017-0045978 A | 4/2017 |
| KR | 10-2018-0116965 A | 10/2018 |
| KR | 10-2018-0135392 A | 12/2018 |
| KR | 10-2019-0029169 A | 3/2019 |
| KR | 10-2020-0002357 A | 1/2020 |
| KR | 10-2020-0123599 A | 10/2020 |
| KR | 10-2179952 B1 | 11/2020 |
| KR | 10-2022-0083546 A | 6/2022 |
| KR | 10-2414840 B1 | 6/2022 |

OTHER PUBLICATIONS

Korean Office Action Issued on Dec. 6, 2023, in Counterpart Korean Patent Application No. 10-2021-0016696 (6 Pages in English, 5 Pages in Korean).

Chinese Office Action issued on Mar. 30, 2024, in counterpart Chinese Patent Application No. 202210116324.6 (5 pages in English, 11 pages in Chinese).

* cited by examiner

VI–VI'

IX-IX'

X-X'

XII-XII'

ACTUATOR FOR CAMERA, CAMERA MODULE, AND PORTABLE ELECTRONIC DEVICE INCLUDING THE SAME

CROSS-REFERENCE TO RELATED APPLICATIONS

This application claims the benefit under 35 USC 119(a) of Korean Patent Application No. 10-2021-0016696 filed on Feb. 5, 2021, in the Korean Intellectual Property Office, the entire disclosure of which is incorporated herein by reference for all purposes.

BACKGROUND

1. Field

The present disclosure relates to an actuator for a camera, a camera module and a portable electronic device including the same.

2. Description of the Background

A camera module may be used in a mobile communications terminal such as a tablet personal computer (PC) or a laptop computer, as well as a smartphone.

In addition, the camera module may include an actuator having an autofocusing function and an optical image stabilization function to implement a high-resolution image.

For example, autofocusing may be performed by moving a lens module in an optical axis (Z axis) direction, or optical image stabilization may be performed by moving the lens module in a direction perpendicular to an optical axis (Z axis).

In a case of a conventional actuator, the lens module may be disposed in a carrier, and autofocusing may be performed by moving the carrier and the lens module together in the optical axis (Z axis) direction. The image stabilization may then be performed by moving the lens module in the carrier in the direction perpendicular to the optical axis (Z axis). Here, the lens module may be equipped with a magnet for image stabilization.

In this conventional actuator, the lens module may be moved in the optical axis (Z axis) direction while autofocusing is performed, thereby changing relative positions (i.e., positions in the optical axis (Z axis) direction) of the magnet for image stabilization and a coil for the image stabilization.

When the relative positions (positions in the optical axis (Z axis) direction) of the magnet for image stabilization and the coil for the image stabilization are changed, it may be difficult to precisely control a driving force (i.e., driving force generated in the direction perpendicular to the optical axis (Z axis)) generated by the magnet for image stabilization and the coil for the image stabilization.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an actuator for a camera includes a housing having an inner space, a base and a carrier, disposed in the housing in one direction, a first drive unit generating driving forces in a first direction perpendicular to the one direction and a second direction perpendicular to both the one direction and the first direction, and including a plurality of magnets and a plurality of coils, and a second drive unit generating a driving force in the one direction, and including a magnet and a coil, wherein an optical member is disposed on the carrier, wherein the carrier and the base are configured to be moved together in the first direction and the second direction, and wherein the carrier is configured to be moved relative to the base in the one direction.

The actuator may further include a guide member disposed between the housing and the base, wherein the guide member may be configured to be moved together with the carrier and the base in the first direction.

The first drive unit may include a first sub drive unit including a first magnet and a first coil facing the first magnet in the one direction, and a second sub drive unit including a second magnet and a second coil facing the second magnet in the one direction, wherein the first magnet may be mounted on the guide member, and the second magnet may be mounted on the base.

A first substrate may be mounted on the housing, wherein the first coil and the second coil may be disposed on one surface of the first substrate, and wherein a first yoke on which a magnetic force acts between the first yoke and the first magnet and a second yoke on which a magnetic force acts between the second yoke and the second magnet may be disposed on the other surface of the first substrate.

The actuator may further include a first ball member rolling in the first direction disposed between the guide member and the housing, and a second ball member rolling in the second direction disposed between the guide member and the base.

A first guide groove defining a rolling direction of the first ball member may be positioned in at least one of surfaces of the guide member and the housing, the surfaces opposing each other in the one direction, and a second guide groove defining a rolling direction of the second ball member may be positioned in at least one of surfaces of the guide member and the base, the surfaces opposing each other in the one direction.

The first drive unit may include a first sub drive unit including a first magnet and a first coil facing the first magnet in the one direction, and a second sub drive unit including a second magnet and a second coil facing the second magnet in the one direction, wherein the first magnet and the second magnet may be mounted on the base.

The actuator may further include a first ball member rolling in the first direction and the second direction disposed between the housing and the base, and a first substrate mounted on the housing, wherein the first coil and the second coil may be disposed on one surface of the first substrate, and wherein a first yoke on which a magnetic force acts between the first yoke and the first magnet and a second yoke on which a magnetic force acts between the second yoke and the second magnet may be disposed on the other surface of the first substrate.

The first drive unit may further include a first position sensing unit facing the first magnet and the second magnet in the one direction, wherein at least one of the first coil and the second coil includes two coils, and wherein the first position sensing unit includes at least three position sensors, and two of the at least three position sensors are disposed adjacent to the two coils.

The actuator may further include a first substrate mounted on the housing, wherein the magnet of the second drive unit may include at least two magnets, the coil of the second drive unit may include at least two coils, the two magnets may be respectively disposed on an upper surface and a lower surface of the carrier, and any one of the two coils may be disposed on the first substrate, and the other coil may be disposed on a second substrate positioned spaced apart from the first substrate in the one direction.

The carrier may include a body portion and a guide portion extended from one side of the body portion in the one direction, the base may include a seating portion facing the body portion in the one direction and a receiving portion extended from one side of the seating portion in the one direction, and at least a portion of the guide portion may face the receiving portion in the direction perpendicular to the one direction.

The actuator may further include a third ball member disposed between the guide portion and the receiving portion, and a third guide groove in which the third ball member may be disposed positioned in surfaces of the guide portion and the receiving portion, the surfaces opposing each other in the direction perpendicular to the one direction.

The third ball member may include a first ball group and a second ball group, and the first ball group and the second ball group may each include a plurality of balls disposed in the one direction, and the number of the plurality of balls included in the first ball group may be greater than the number of the plurality of balls included in the second ball group.

At least two of the plurality of balls included in the first ball group may be respectively in contact with the third guide groove at four points, and at least two of the plurality of balls included in the second ball group may be respectively in contact with the third guide groove at three points.

A distance between the at least two balls in contact with the third guide groove at four points may be greater than a distance between the at least two balls in contact with the third guide groove at three points.

The actuator may further include a first magnetic material disposed on the guide portion, and a second magnetic material disposed on the receiving portion, wherein a magnetic force may be generated between the first magnetic material and the second magnetic material in the direction perpendicular to the one direction, and the first magnetic material and the second magnetic material may be disposed closer to the first ball group than to the second ball group.

A camera module may include the actuator for a camera, and a lens module fixed to the housing and including at least one lens, wherein the optical member may be an image sensor, and the image sensor may be moved together with the carrier in the one direction, the first direction and the second direction.

A camera module may include the actuator for a camera, and an image sensor fixed to the housing, wherein the optical member may be a lens module including at least one lens, and the lens module may be moved together with the carrier in the one direction, the first direction and the second direction.

In another general aspect, an actuator for a camera includes a housing, a base movable relative to the housing in a first direction perpendicular to an optical axis direction and a second direction perpendicular to the first direction and the optical axis direction, a carrier disposed on the base and movable relative to the base in the optical axis direction, and an image sensor disposed on the carrier.

The actuator may further include a first magnet facing a first coil in the optical axis direction to generate a driving force on the base in the first direction, a second magnet facing a second coil in the optical axis direction to generate a driving force on the base in the second direction, and a third magnet facing a third coil in the optical axis direction to generate a driving force on the carrier in the optical axis direction.

The actuator may further include a guide member disposed between the housing and the base, wherein the first magnet may be disposed on the guide member, the second magnet may be disposed on the base, and movement of the guide member in the first direction may move the base in the first direction.

The actuator may further include a guide member disposed between the housing and the base, wherein movement of the guide member in the first direction may move the base in the first direction.

A camera may include the actuator for a camera, and a lens module fixed to the housing and including at least one lens, wherein light refracted by the lens module may be incident on the image sensor.

In another general aspect, an actuator for a camera includes a housing, a guide member disposed on the housing, and movable relative to the housing in a first direction perpendicular to an optical axis direction, a first ball member rolling in the first direction disposed between the guide member and the housing, a base disposed on the guide member, movable in the first direction with the guide member, and movable relative to the guide member in a second direction perpendicular to the first direction and the optical axis direction, a second ball member rolling in the second direction disposed between the guide member and the base, a carrier disposed on the base, and movable relative to the base in the optical axis direction, and a lens module including at least one lens, and disposed on the carrier.

The actuator may further include an elastic member connecting the base and the carrier, wherein the elastic member may include a fixed portion fixed to the base, a moving portion disposed in the fixed portion and fixed to the carrier, and a bent portion connecting the fixed portion and the moving portion to each other.

The actuator may further include a third ball member disposed between the base and the carrier.

The actuator may further include a third ball member rolling in the first direction and the second direction disposed between the base and the housing.

In another general aspect, an actuator for a camera includes a housing, a guide member disposed on the housing, and movable relative to the housing in a first direction perpendicular to an optical axis direction, a carrier disposed on the housing, and movable relative to the housing in the optical axis direction, a lens holder disposed on the carrier, and movable relative to the carrier in a second direction perpendicular to the first direction and the optical axis direction, a lens module disposed on the lens holder, and including at least one lens, and an image sensor disposed on the guide member, wherein light refracted by the lens module is incident on the image sensor.

The actuator may further include a first ball member rolling in the first direction disposed between the guide member and the housing, a second ball member rolling in the second direction disposed between the carrier and the lens holder, and a third ball member rolling in the optical axis direction disposed between the carrier and the housing.

The actuator may further include a first magnet facing a first coil in the optical axis direction to generate a driving force on the guide member in the first direction, a second magnet facing a second coil in the second direction to generate a driving force on the lens holder in the second direction, and a third magnet facing a third coil in the first direction to generate a driving force on the carrier in the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
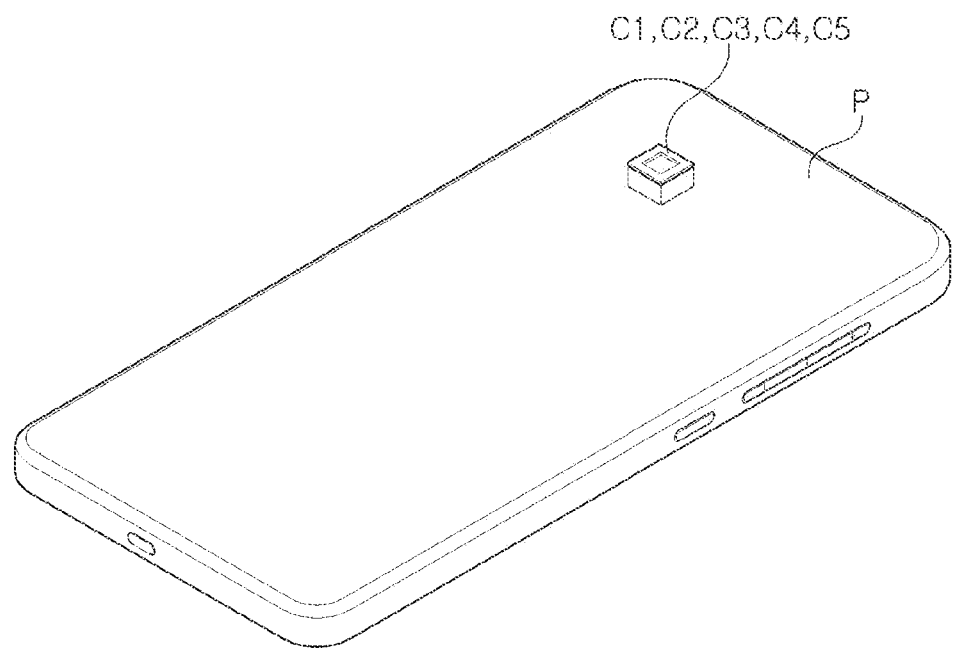
FIG. 1 is a perspective view of a portable electronic device according to an example embodiment of the present disclosure.

Hereinafter, while example embodiments of the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide an actuator for a camera, having improved image stabilization performance, a camera module and a portable electronic device including the same.

FIG. 1 is a perspective view of a portable electronic device according to an example embodiment of the present disclosure.

Figure 2:
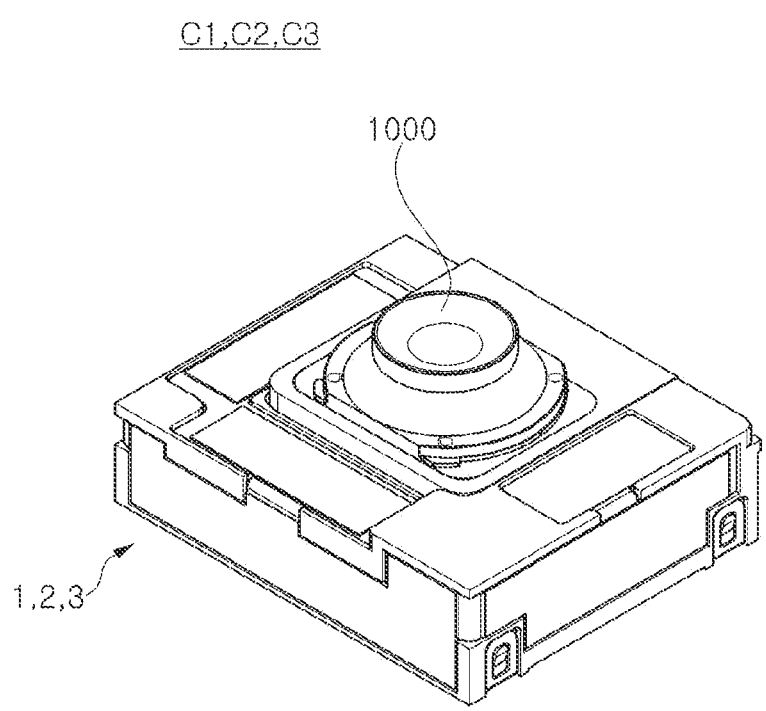
FIG. 2 is a perspective view of a camera module according to an example embodiment of the present disclosure.
Figure 3:
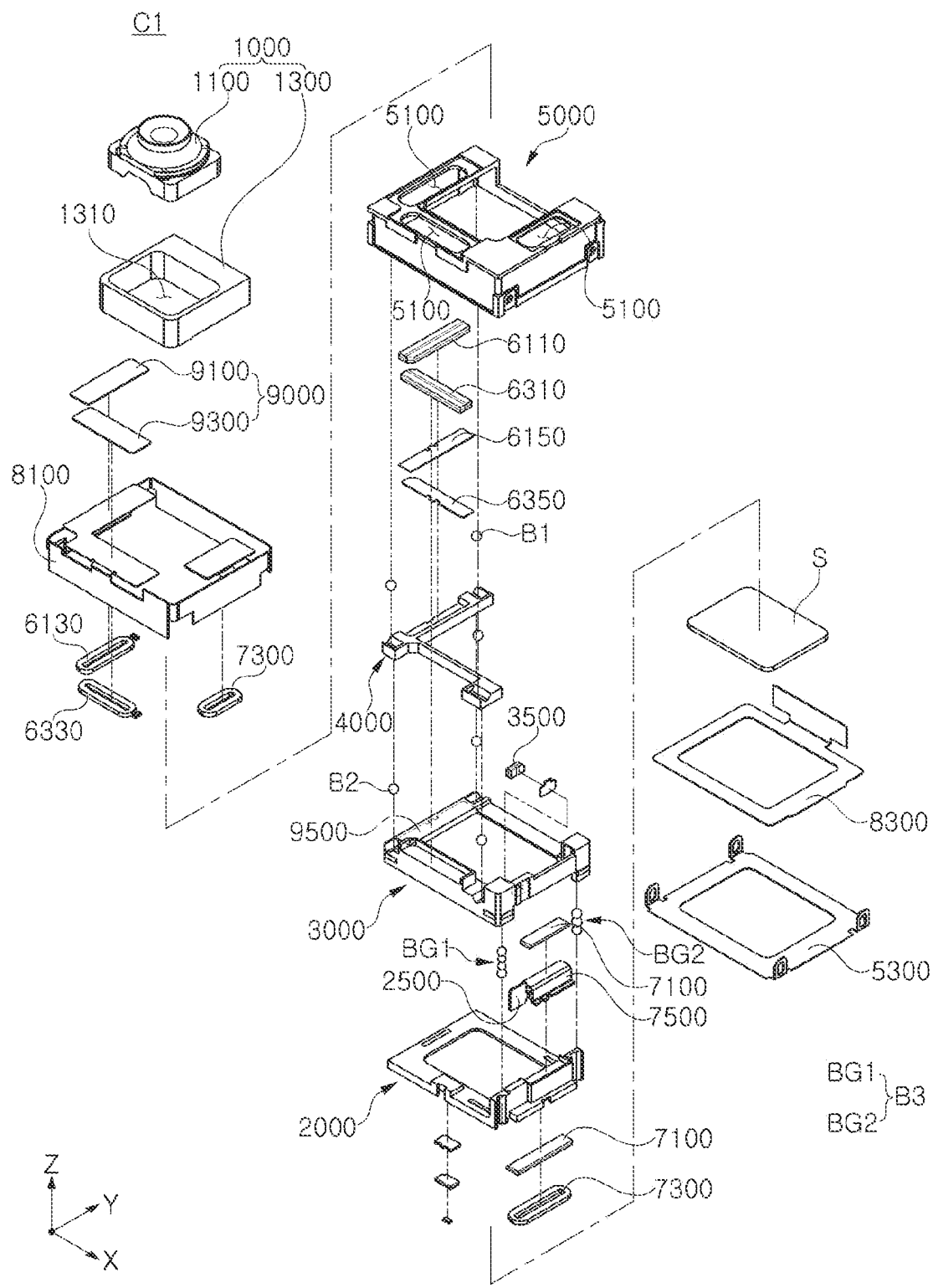
FIG. 3 is a schematic exploded perspective view of the camera module according to an example embodiment of the present disclosure.

FIG. 2 is a perspective view of a camera module according to an example embodiment of the present disclosure; and FIG. 3 is a schematic exploded perspective view of the camera module according to an example embodiment of the present disclosure.

Figure 4:
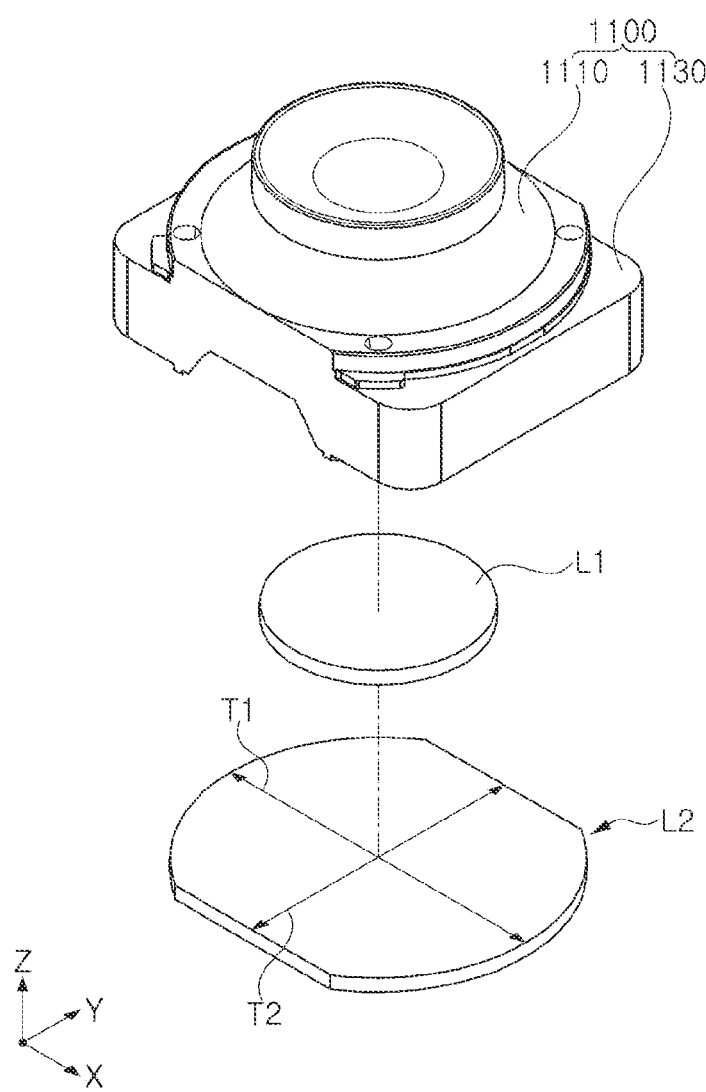
FIG. 4 is a perspective view illustrating a lens and a lens barrel according to an example embodiment of the present disclosure.
Figure 5:
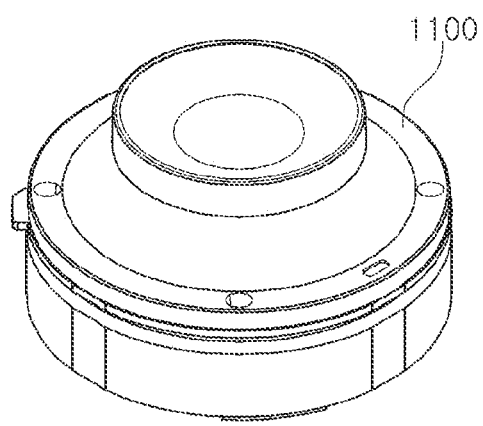
FIG. 5 illustrates a modified example of the lens barrel according to an example embodiment of the present disclosure.

In addition, FIG. 4 is a perspective view illustrating a lens and a lens barrel according to an example embodiment of the present disclosure; and FIG. 5 illustrates a modified example of the lens barrel according to an example embodiment of the present disclosure.

Referring to FIG. 1, an actuator for a camera and a camera module including the same according to example embodiments of the present disclosure may be mounted on a portable electronic device P. The portable electronic device P may be a portable electronic device such as a mobile communications terminal, a smartphone, or a tablet personal computer (PC).

Referring to FIGS. 2 and 3, a camera module C1 according to an example embodiment of the present disclosure may include a lens module 1000 and an actuator 1 for a camera (hereinafter, 'actuator').

The lens module 1000 may include one or more lenses L and a lens barrel 1100. The one or more lenses L may be disposed in the lens barrel 1100. When the lens module 1000 includes the one or more lenses L, the one or more lenses L may be mounted in the lens barrel 1100 along an optical axis (Z axis).

The lens module 1000 may further include a lens holder 1300 coupled to the lens barrel 1100.

The lens holder 1300 may include a coupling hole 1310 passing through the lens holder 1300 in an optical axis (Z axis) direction. The lens barrel 1100 may be inserted into the coupling hole 1310 and fixedly disposed on the lens holder 1300. The lens holder 1300 may serve to secure the lens barrel 1100 relative to a housing 5000. For another example, the lens barrel 1100 may be coupled and secured directly to the housing 5000.

In an example embodiment of the present disclosure, the lens module 1000 may be a fixed member secured to the housing 5000. For example, the lens module 1000 may be the fixed member which is not moved while an autofocusing (AF) and optical image stabilization (OIS) are performed.

The camera module C1 according to an example embodiment of the present disclosure may perform autofocusing (AF) and optical image stabilization (OIS) by moving an image sensor S rather than the lens module 1000. The relatively light image sensor S is moved, and the image sensor S may thus be moved by a smaller driving force. The components included in the actuator 1 may thus be made smaller.

The actuator 1 may include a carrier 2000, a base 3000, a guide member 4000 and the housing 5000.

The carrier 2000 may be moved in the optical axis (Z axis) direction and in a direction perpendicular to the optical axis (Z axis). Referring to FIG. 3, the image sensor S may be disposed on the carrier 2000.

Therefore, the image sensor S may be moved along with the carrier 2000 in the optical axis (Z axis) direction to perform autofocusing, and the image sensor S may be moved along with the carrier 2000 in the direction perpendicular to the optical axis (Z axis) to stabilize an image being captured.

The base 3000 may be moved in the direction perpendicular to the optical axis (Z axis). That is, the base 3000 may be a fixed member that is not moved in the optical axis (Z axis) direction while autofocusing is performed, and may be a moving member that is moved in the direction perpendicular to the optical axis (Z axis) while the image stabilization is performed.

The carrier 2000 may be disposed on the base 3000, and the base 3000 and the carrier 2000 may thus be moved together in the direction perpendicular to the optical axis (Z axis) to stabilize the image. While autofocusing is performed, the carrier 2000 may be moved relative to the base 3000.

The base 3000 may be disposed in the housing 5000. The guide member 4000 may be disposed between the base 3000 and the housing 5000. For example, the guide member 4000 and the base 3000 may be sequentially disposed in the housing 5000 in the optical axis (Z axis) direction.

The guide member 4000 may be moved in a first axial (X axis) direction, and the base 3000 may be moved in the first axial (X axis) direction and a second axial (Y axis) direction.

For example, the guide member 4000 and the base 3000 may be moved together in the first axial (X axis) direction. In addition, the base 3000 may be moved relative to the guide member 4000 in the second axial (Y axis) direction.

The first axial (X axis) direction may indicate the direction perpendicular to the optical axis (Z axis), and the second axial (Y axis) direction may indicate a direction perpendicular to both the optical axis (Z axis) direction and the first axial (X axis) direction.

A first ball member B1 may be disposed between the guide member 4000 and the housing 5000, and a second ball member B2 may be disposed between the guide member 4000 and the base 3000.

The first ball member B1 may be disposed in contact with each of the guide member 4000 and the housing 5000, and the second ball member B2 may be disposed in contact with each of the guide member 4000 and the base 3000.

The carrier 2000 may be disposed on the base 3000. For example, the carrier 2000 and the base 3000 may be sequentially stacked in the optical axis (Z axis) direction. While autofocusing is performed, the base 3000 may be the fixed member that is not moved in the optical axis (Z axis) direction, and the carrier 2000 may be a moving member that is moved in the optical axis (Z axis) direction.

A third ball member B3 may be disposed between the carrier 2000 and the base 3000. The third ball member B3 may be disposed in contact with each of the carrier 2000 and the base 3000.

When the carrier 2000 is moved relative to the base 3000 in the optical axis (Z axis) direction, the third ball member B3 may roll in the optical axis (Z axis) direction to support movement of the carrier 2000.

Referring to FIGS. 4 and 5, the lens barrel 1100 may partially have a cylindrical shape, or entirely have the cylindrical shape.

Referring to FIG. 4, the lens barrel 1100 may include a first barrel 1110 and a second barrel 1130. The first barrel 1110 and the second barrel 1130 may respectively be used to refer to upper and lower portions of one lens barrel 1100. Alternatively, the first barrel 1110 and the second barrel 1130 may be separate components and may be coupled with each other.

The first barrel 1110 may have a shape of a cylinder having an inner space, and the second barrel 1130 may have a shape of a rectangular box having an inner space. A passage hole through which light passes may be disposed in each of an upper surface of the first barrel 1110 and a lower surface of the second barrel 1130.

A lens L1 (hereinafter, 'first lens') having a circular planar shape may be disposed in the first barrel 1110, and a lens L2 (hereinafter, 'second lens') having a non-circular planar shape may be disposed in the second barrel 1130.

For example, the second lens L2 may have the non-circular shape when viewed from the optical axis (Z axis) direction.

The second lens L2 may have a length T1 in the first axial (X axis) direction perpendicular to the optical axis (Z axis), which is longer than a length T2 in the second axial (Y axis) direction perpendicular to both the optical axis (Z axis) and the first axial (X axis) direction, based on a plane perpendicular to the optical axis (Z axis).

For example, the second lens L2 may have a major axis and a minor axis. The major axis may indicate a line segment connecting both side surfaces of the second lens L2 in the first axial (X axis) direction while passing through the optical axis (Z axis), and the minor axis may indicate a line segment connecting both side surfaces of the second lens L2 in the second axial (Y axis) direction while passing through the optical axis (Z axis). The major and minor axes may be perpendicular to each other, and a length of the major axis is longer than a length of the minor axis.

The second lens L2 may have four side surfaces along a periphery of the second lens L2. When viewed in the optical axis direction, two of the four side surfaces may each have an arc shape, and the other two side surfaces may each have a substantially linear shape.

In general, the image sensor S of the camera module C1 may have the rectangular shape, and accordingly, not all light refracted by the circular lens may be imaged on the image sensor S.

In this example embodiment, the second lens L2 may have the non-circular planar shape, and the lens L and the lens barrel 1100 may thus be made smaller without affecting the image formation, thereby reducing a size of the camera module C1.

Meanwhile, the second lens L2 may have the major axis and the minor axis, and may thus have a maximum diameter and a minimum diameter. Here, the maximum diameter of the second lens L2 may be greater than a diameter of the first lens L1.

That is, the second lens L2 having a relatively great diameter may have the non-circular planar shape.

Figure 6:
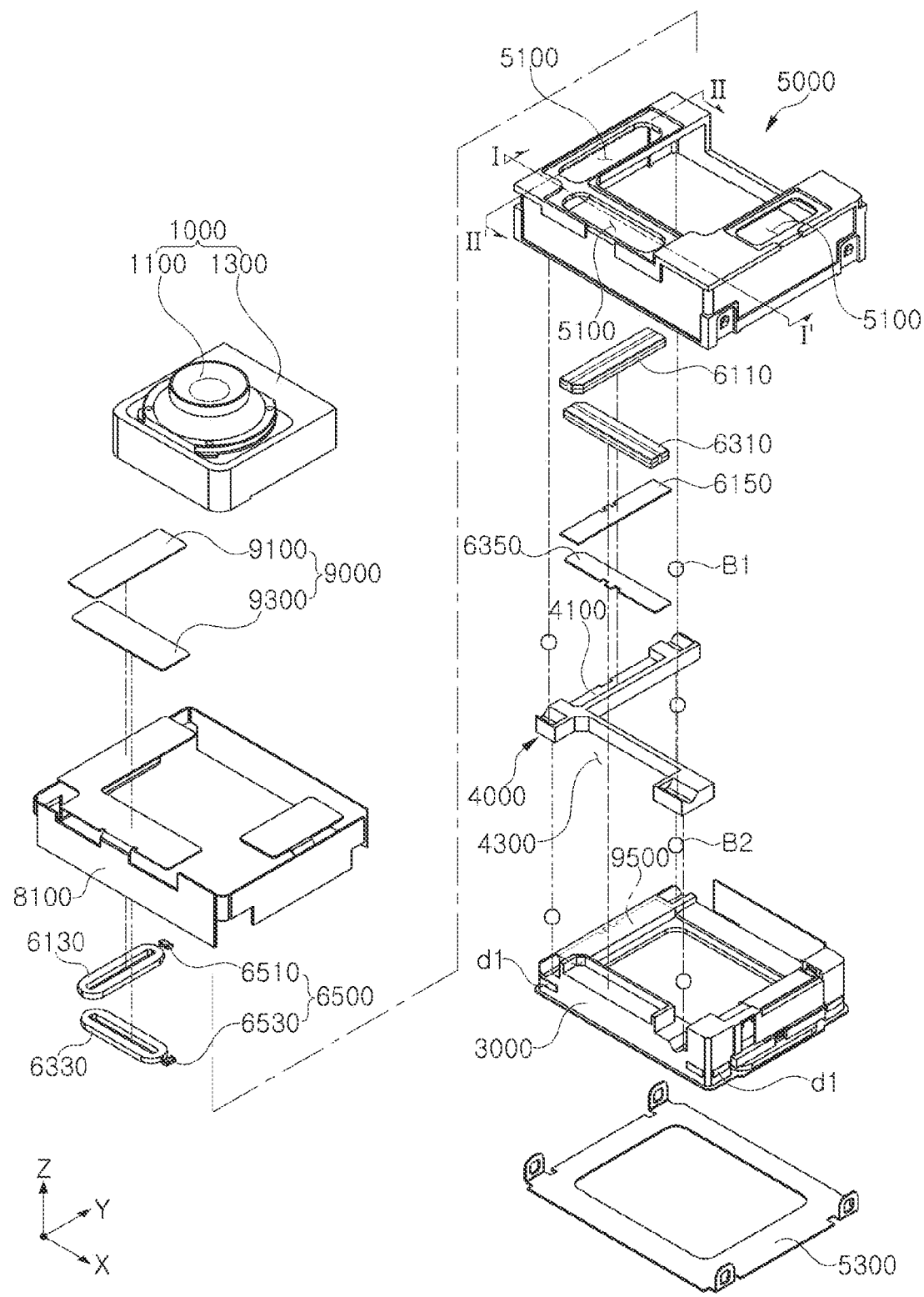
FIG. 6 is an exploded perspective view illustrating the lens module, a first substrate, a housing, a guide member, and a base.
Figure 7:
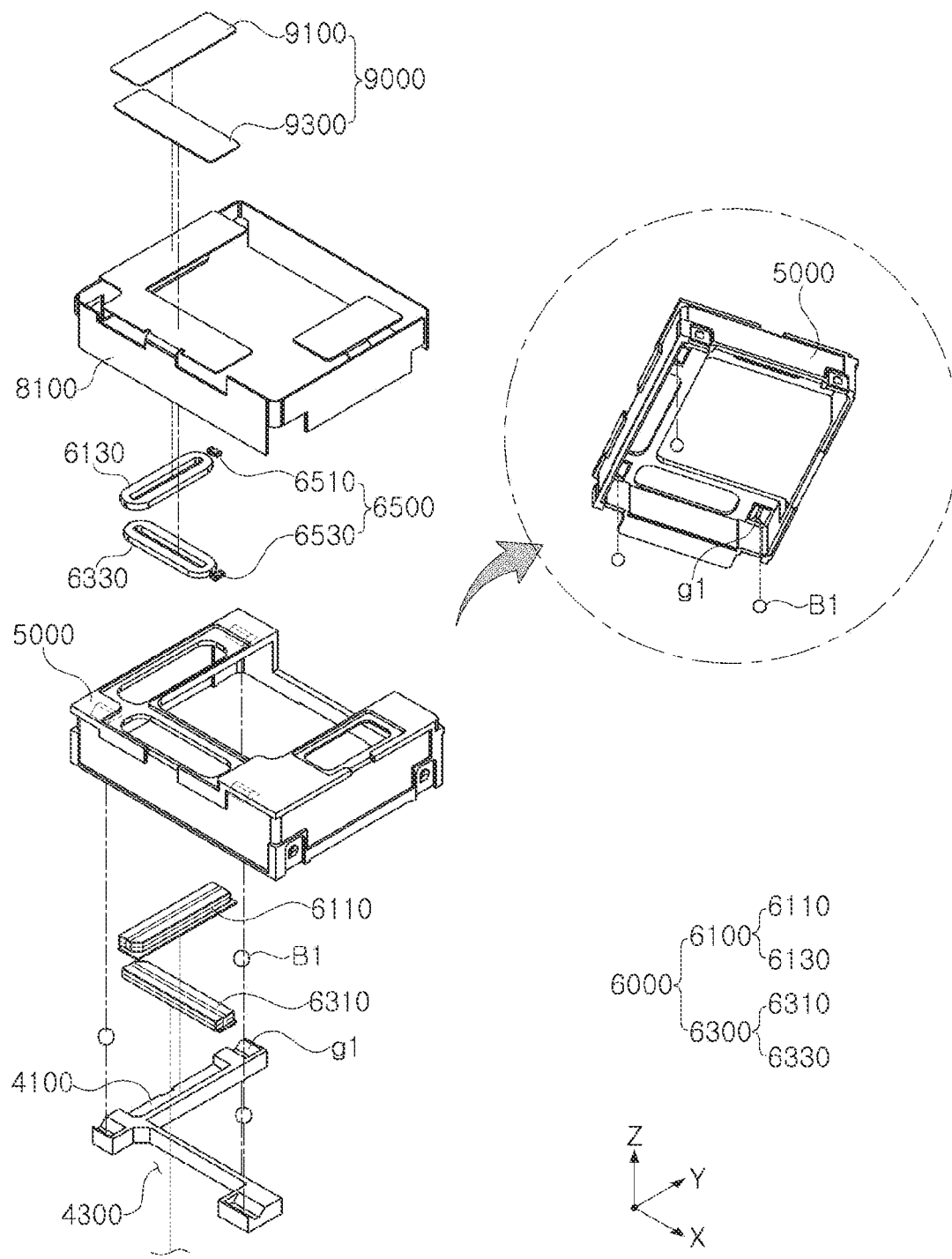
FIG. 7 is an exploded perspective view illustrating the first substrate, the housing, and the guide member.
Figure 8:
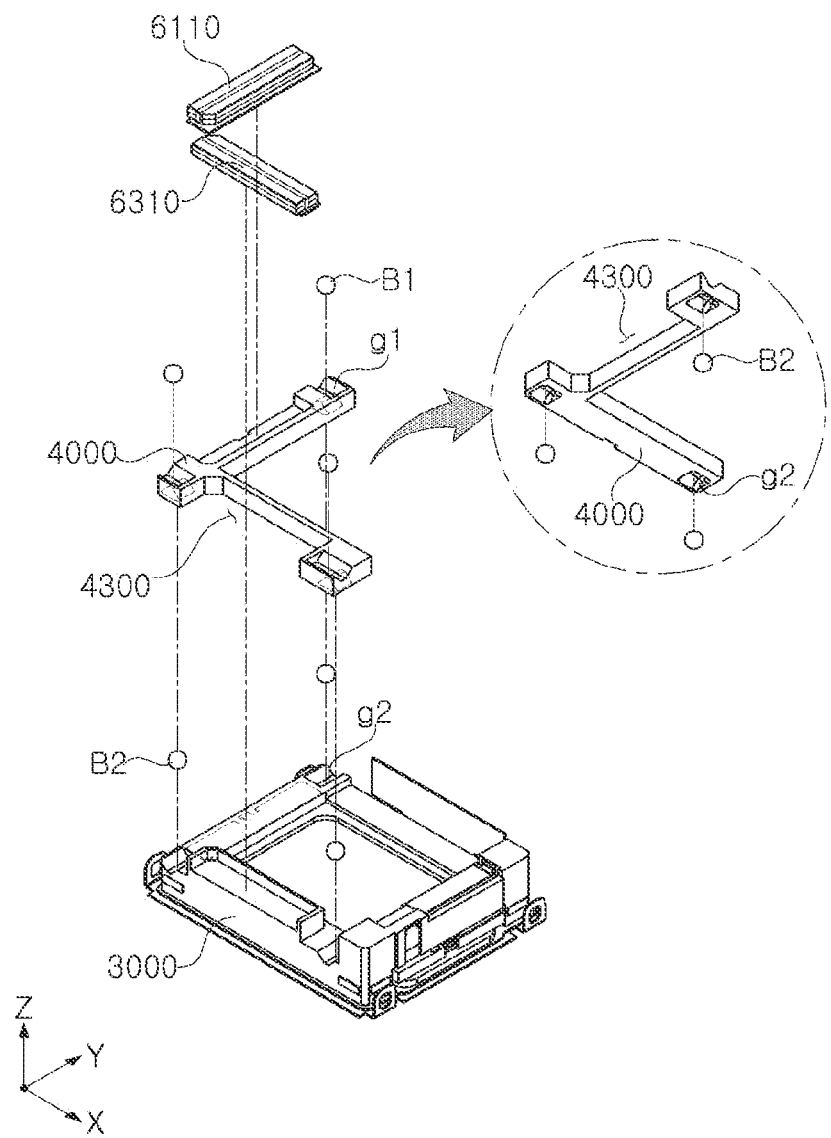
FIG. 8 is an exploded perspective view illustrating the guide member and the base.
Figure 9:
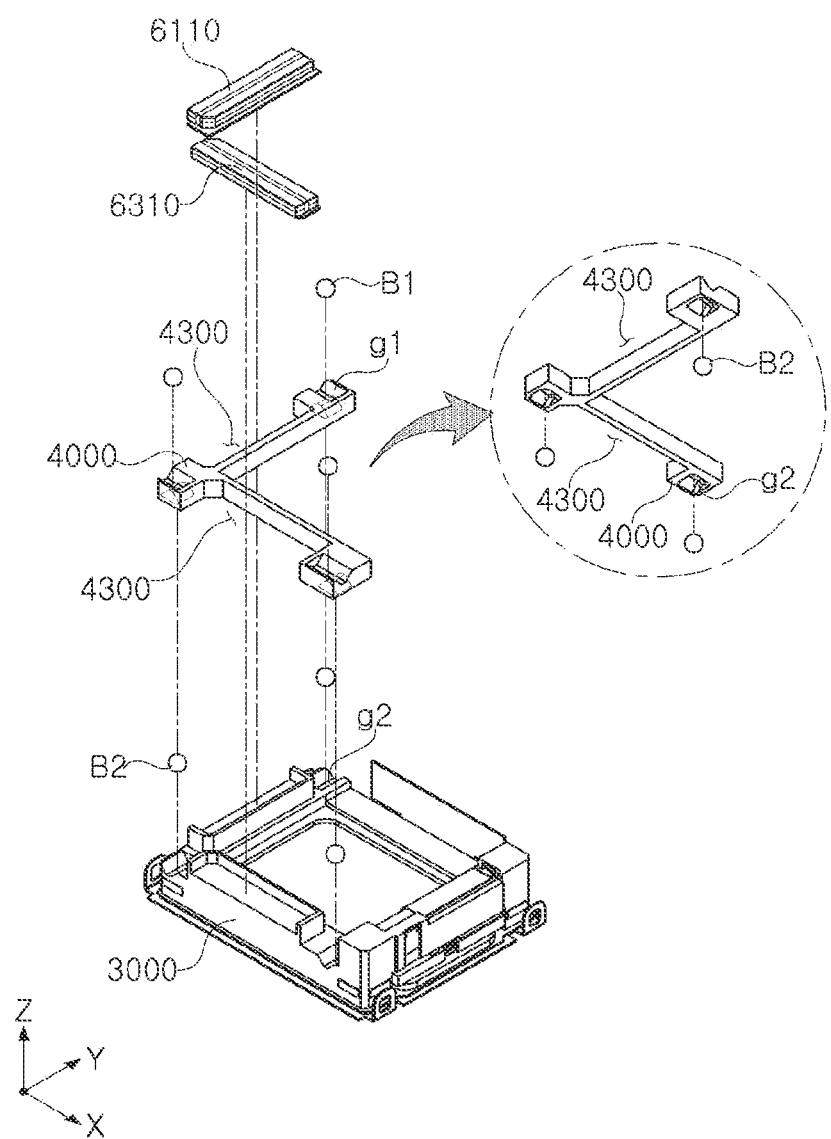
FIG. 9 illustrates a modified example of the guide member and the base.

FIG. 6 is an exploded perspective view illustrating the lens module, a first substrate, a housing, a guide member, and a base; FIG. 7 is an exploded perspective view illustrating the first substrate, the housing, and the guide member; FIG. 8 is an exploded perspective view illustrating the guide member and the base; and FIG. 9 illustrates a modified example of the guide member and the base.

Figure 10:
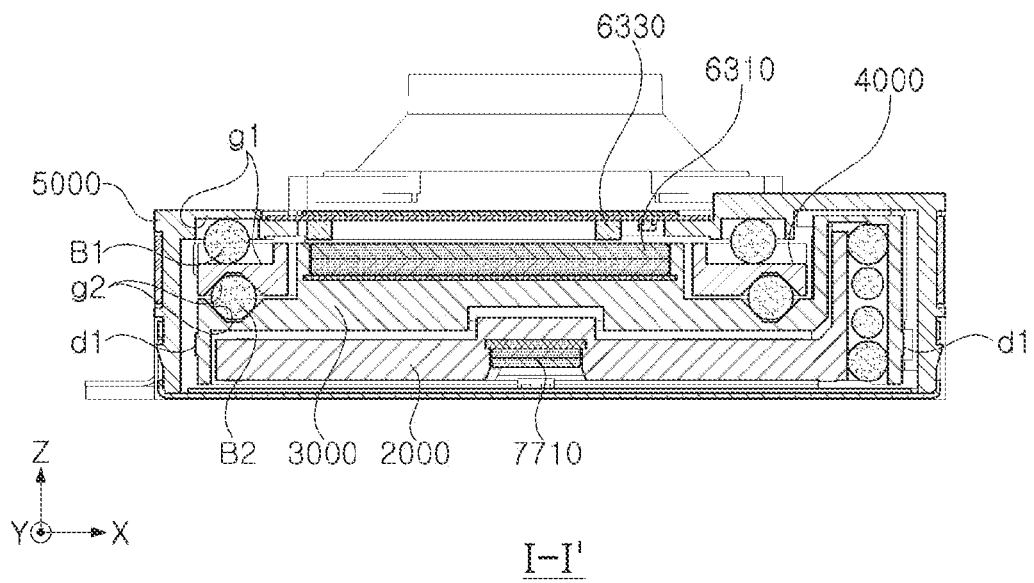
FIG. 10 is a cross-sectional view taken along line I-I' of FIG. 6.
Figure 11:
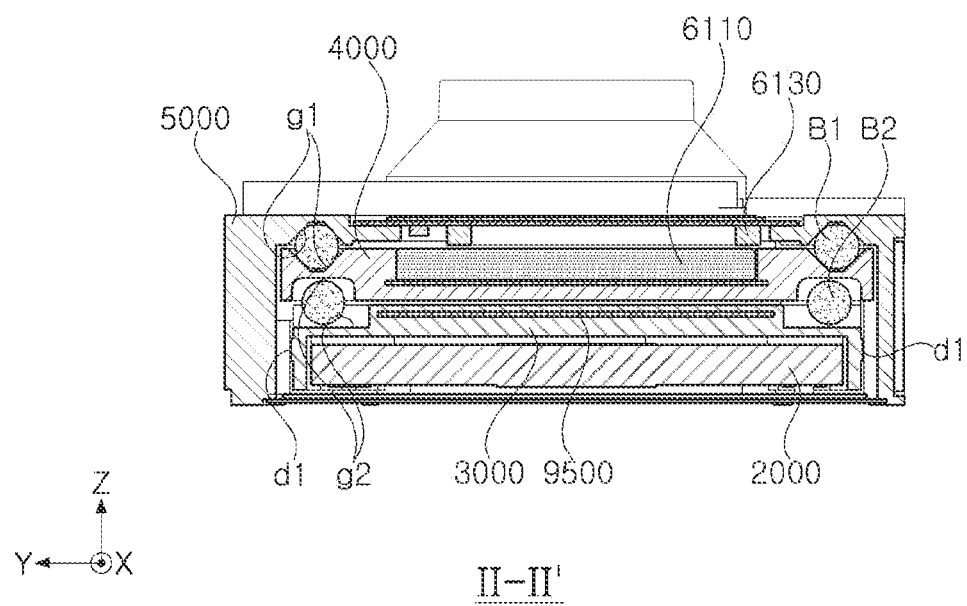
FIG. 11 is a cross-sectional view taken along line II-II' of FIG. 6.

In addition, FIG. 10 is a cross-sectional view taken along line I-I' of FIG. 6; and FIG. 11 is a cross-sectional view taken along line l' of FIG. 6.

One or more examples of the base 3000 and the guide member 4000 moved in the direction perpendicular to the optical axis (Z axis) are further described with reference to FIGS. 6 through 11.

The guide member 4000 and the base 3000 may be disposed in the housing 5000. For example, the guide member 4000 and the base 3000 may be sequentially disposed in the housing 5000 in the optical axis (Z axis) direction. The guide member 4000 may thus be disposed between the housing 5000 and the base 3000.

The guide member 4000 may have a shape of a rectangle whose two sides are removed when viewed from the optical axis (Z axis) direction. For example, the guide member 4000 may have a ']' or '[' shape when viewed from the optical axis (Z axis) direction.

The guide member 4000 may be disposed between the housing 5000 and the base 3000, and it is thus necessary to reduce a thickness of the guide member 4000 to reduce a height of the actuator 1 in the optical axis (Z axis) direction.

However, when having the reduced thickness, the guide member 4000 may have weaker rigidity to have lower reliability against external impact, etc.

Therefore, the guide member 4000 may include a reinforcing plate to have reinforced rigidity.

For example, the reinforcing plate may be insert-injected to be integrally coupled to the guide member 4000. In this case, the reinforcing plate may be manufactured to be integrated with the guide member 4000 by injecting a resin material into a mold in a state where the reinforcing plate is fixed in the mold.

The reinforcing plate may be disposed in the guide member 4000. In addition, the reinforcing plate may be disposed to be partially exposed outwardly from the guide member 4000. In this manner, the reinforcing plate may be partially exposed outwardly from the guide member 4000 while being integrally formed in the guide member 4000, which may improve a bonding force between the reinforcing plate and the guide member 4000, and prevent the reinforcing plate from being separated from the guide member 4000.

the reinforcing plate may be a non-magnetic metal lest the reinforcing plate affects magnetic fields of first and second magnets 6110 and 6310 of a first drive unit 6000 described below.

The guide member 4000 may be moved in the first axial (X axis) direction, and the base 3000 may be moved in the first axial (X axis) direction and the second axial (Y axis) direction.

For example, the guide member 4000 and the base 3000 may be moved together in the first axial (X axis) direction. In addition, the base 3000 may be moved relative to the guide member 4000 in the second axial (Y axis) direction.

The carrier 2000 may be disposed on the base 3000, and the image sensor S may be disposed on the carrier 2000. Therefore, as the base 3000 is moved in the first axial (X axis) direction and the second axial (Y axis) direction, the carrier 2000 and the image sensor S may also be moved in the first axial (X axis) direction and the second axial (Y axis) direction.

The actuator 1 according to an example embodiment of the present disclosure may include the first drive unit 6000. The first drive unit 6000 may generate the driving force in the direction perpendicular to the optical axis (Z axis) to move the base 3000 in the direction perpendicular to the optical axis (Z axis).

The first drive unit 6000 may include a first sub drive unit 6100 and a second sub drive unit 6300. The first sub drive unit 6100 may generate the driving force in the first axial (X axis) direction, and the second sub drive unit 6300 may generate the driving force in the second axial (Y axis) direction.

The first sub drive unit 6100 may include the first magnet 6110 and a first coil 6130. The first magnet 6110 and the first coil 6130 may be disposed opposing each other in the optical axis (Z axis) direction.

The first magnet 6110 may be disposed on the guide member 4000. For example, the first magnet 6110 may be disposed on one side of the guide member 4000 having the ']' or '[' shape. A mounting groove 4100 in which the first magnet 6110 is disposed may be positioned on the one side of the guide member 4000. The first magnet 6110 may be inserted into the mounting groove 4100, thereby preventing the actuator 1 and the camera module C1 from having increased overall heights due to a thickness of the first magnet 6110.

A first back yoke 6150 may be disposed between the guide member 4000 and the first magnet 6110. The first back yoke 6150 may prevent leakage of magnetic flux of the first magnet 6110, thereby improving the driving force thereof.

The first magnet 6110 may be magnetized so that one surface (e.g., surface facing the first coil 6130) thereof has both an N pole and an S pole. For example, the N pole, a neutral region, and the S pole may be sequentially positioned on the one surface of the first magnet 6110, facing the first coil 6130, in the first axial (X axis) direction. The first magnet 6110 may be elongated in the second axial (Y axis) direction.

The other surface (e.g., surface opposite to the one surface) of the first magnet 6110 may be magnetized to have both the S pole and the N pole. For example, the S pole, the neutral region, and the N pole may be sequentially positioned on the other surface of the first magnet 6110 in the first axial (X axis) direction.

The first coil 6130 may be disposed to face the first magnet 6110. For example, the first coil 6130 may be disposed to face the first magnet 6110 in the optical axis (Z axis) direction. The first coil 6130 may have a hollow donut shape, and may be elongated in the second axial (Y axis) direction.

The first coil 6130 may be disposed on a first substrate 8100. The first substrate 8100 may be mounted on the housing 5000 so that the first magnet 6110 and the first coil 6130 face each other in the optical axis (Z axis) direction.

The housing 5000 may include a through-hole 5100. For example, the through-hole 5100 may pass through an upper surface of the housing 5000 in the optical axis (Z axis) direction. The first coil 6130 may be disposed in the through-hole 5100 of the housing 5000. The first coil 6130 may be disposed in the through-hole 5100 of the housing 5000, thereby preventing the actuator 1 and the camera module C1 from having increased overall heights due to a thickness of the first coil 6130.

The first magnet 6110 may be a moving member mounted on the guide member 4000 and moved together with the guide member 4000, and the first coil 6130 may be a fixed member fixed to the first substrate 8100 and the housing 5000.

When power is applied to the first coil 6130, the guide member 4000 may be moved in the first axial (X axis) direction by electromagnetic force generated between the first magnet 6110 and the first coil 6130.

The second sub drive unit 6300 may include the second magnet 6310 and a second coil 6330. The second magnet 6310 and the second coil 6330 may be disposed opposing each other in the optical axis (Z axis) direction.

The second magnet 6310 may be disposed on the base 3000. A second back yoke 6350 may be disposed between the base 3000 and the second magnet 6310. The second back yoke 6350 may prevent leakage of magnetic flux of the second magnet 6310, thereby improving the driving force thereof.

The guide member 4000 may have an escape hole 4300 so that the second magnet 6310 and the second coil 6330 may directly face each other. For example, the escape hole 4300 may be positioned in the other side (where the first magnet 6110 is not disposed) of the guide member 4000 having a '┐' or '└' shape. The escape hole 4300 may pass through the other side of the guide member 4000 in the optical axis (Z axis) direction.

The second magnet 6310 may be disposed in the escape hole 4300 of the guide member 4000 while being mounted on the base 3000. Therefore, the second magnet 6310 may directly face the second coil 6330 through the escape hole 4300.

The guide member 4000 and the base 3000 may be sequentially disposed in the housing 5000 in the optical axis (Z axis) direction, and even though the second magnet 6310 is disposed on the base 3000, it is possible to prevent the actuator 1 and the camera module C1 from having increased overall heights by the escape hole 4300 positioned in the guide member 4000.

The second magnet 6310 may be magnetized so that one surface (e.g., surface facing the second coil 6330) thereof has both the N pole and the S pole. For example, the S pole, the neutral region, and the N pole may be sequentially positioned on the one surface of the second magnet 6310, facing the second coil 6330, in the second axial (Y axis) direction. The second magnet 6310 may be elongated in the first axial (X axis) direction.

The other surface (e.g., surface opposite to the one surface) of the second magnet 6310 may be magnetized to have both the N pole and the S pole. For example, the N pole, the neutral region, and the S pole may be sequentially positioned on the other surface of the second magnet 6310 in the second axial (Y axis) direction.

The second coil 6330 may be disposed to face the second magnet 6310. For example, the second coil 6330 may be disposed to face the second magnet 6310 in the optical axis (Z axis) direction. The second coil 6330 may have the hollow donut shape, and may be elongated in the first axial (X axis) direction.

The second coil 6330 may be disposed on the first substrate 8100. The first substrate 8100 may be mounted on the housing 5000 so that the second magnet 6310 and the second coil 6330 face each other in the optical axis (Z axis) direction.

The housing 5000 may include the through-hole 5100. For example, the through-hole 5100 may pass through the upper surface of the housing 5000 in the optical axis direction. The second coil 6330 may be disposed in the through-hole 5100 of the housing 5000. The second coil 6330 may be disposed in the through-hole 5100 of the housing 5000, thereby preventing the actuator 1 and the camera module C1 from having increased overall heights due to a thickness of the second coil 6330.

The second magnet 6310 may be a moving member mounted on the base 3000 and moved together with the base 3000, and the second coil 6330 may be a fixed member fixed to the first substrate 8100 and the housing 5000.

When power is applied to the second coil 6330, the base 3000 may be moved in the second axial (Y axis) direction by electromagnetic force generated between the second magnet 6310 and the second coil 6330.

In this example embodiment, the first magnet 6110 is mounted on the guide member 4000, and the second magnet 6310 is mounted on the base 3000. For another example, referring to FIG. 9, both the first magnet 6110 and the second magnet 6310 may also be mounted on the base 3000. In this case, the escape hole 4300 may also be positioned in one side of the guide member 4000.

Meanwhile, as illustrated in FIG. 6, the first coil 6130 and the second coil 6330 may be wound coils and may be mounted on the first substrate 8100. For another example, the first coil 6130 and the second coil 6330 may be copper foil patterns stacked and embedded in the first substrate 8100.

The first magnet 6110 and the second magnet 6310 may be disposed perpendicular to each other based on a plane perpendicular to the optical axis (Z axis), and the first coil 6130 and the second coil 6330 may also be disposed perpendicular to each other based on the plane perpendicular to the optical axis (Z axis).

The first ball member B1 may be disposed between the guide member 4000 and the housing 5000, and the second ball member B2 may be disposed between the guide member 4000 and the base 3000.

The first ball member B1 may be disposed in contact with each of the guide member 4000 and the housing 5000, and the second ball member B2 may be disposed in contact with each of the guide member 4000 and the base 3000.

The first ball member B1 and the second ball member B2 may serve to guide the movements of the guide member 4000 and the base 3000 while the image stabilization is performed. In addition, the ball members may also serve to keep each gap between the base 3000, the guide member 4000 and the housing 5000.

The first ball member B1 may guide the movement of the guide member 4000 in the first axial (X axis) direction, and the second ball member B2 may guide the movement of the base 3000 in the second axial (Y axis) direction.

For example, the first ball member B1 may roll in the first axial (X axis) direction when the driving force is generated in the first axial (X axis) direction. Accordingly, the first ball member B1 may guide the movement of the guide member 4000 in the first axial (X axis) direction.

In addition, the second ball member B2 may roll in the second axial (Y axis) direction when the driving force is generated in the second axial (Y axis) direction. Accordingly, the second ball member B2 may guide the movement of the base 3000 in the second axial (Y axis) direction.

The first ball member B1 may include a plurality of balls disposed between the guide member 4000 and the housing 5000, and the second ball member B2 may include a plurality of balls disposed between the base 3000 and the guide member 4000.

Referring to FIG. 7, a first guide groove g1 in which the first ball member B1 is disposed may be positioned in at least one of the surfaces of the guide member 4000 and the housing 5000, the surfaces facing each other in the optical axis (Z axis) direction. The plurality of first guide grooves g1 may be positioned to correspond to the plurality of balls included in the first ball member B1.

The first ball member B1 may be accommodated in the first guide groove g1 and inserted between the guide member 4000 and the housing 5000.

When accommodated in the first guide groove g1, the first ball member B1 may be restricted from being moved in the optical axis (Z axis) direction or the second axial (Y axis) direction, and may be moved only in the first axial (X axis) direction. For example, the first ball member B1 may roll only in the first axial (X axis) direction.

To this end, the first guide groove g1 may be elongated in the first axial (X axis) direction.

Referring to FIG. 8, a second guide groove g2 in which the second ball member B2 is disposed may be positioned in at least one of the surfaces of the base 3000 and the guide member 4000, facing each other in the optical axis (Z axis) direction. The plurality of second guide grooves g2 may be positioned to correspond to the plurality of balls included in the second ball member B2.

The second ball member B2 may be accommodated in the second guide groove g2 and inserted between the base 3000 and the guide member 4000.

When accommodated in the second guide groove g2, the second ball member B2 may be restricted from being moved in the optical axis (Z axis) direction or the first axial (X axis) direction, and may be moved only in the second axial (Y axis) direction. For example, the second ball member B2 may roll only in the second axial (Y axis) direction.

To this end, the second guide groove g2 may be elongated in the second axial (Y axis) direction.

As illustrated in FIG. 10, when the driving force is generated in the first axial (X axis) direction, the guide member 4000 and the base 3000 may be moved together in the first axial (X axis) direction.

Here, the first ball member B1 disposed between the guide member 4000 and the housing 5000 may roll along the first axis (X axis).

The second ball member B2 may be disposed between the guide member 4000 and the base 3000 and restricted from being moved in the first axial (X axis) direction. As a result, the base 3000 may also be moved in the first axial (X axis) direction as the guide member 4000 is moved in the first axial (X axis) direction.

As illustrated in FIG. 11, when the driving force is generated in the second axial (Y axis) direction, the base 3000 may be moved in the second axial (Y axis) direction.

Here, the second ball member B2 disposed between the base 3000 and the guide member 4000 may roll along the second axis (Y axis).

The guide member 4000 may be moved in the first axial (X axis) direction, and the base 3000 may be moved in both the first axial (X axis) direction and the second axial (Y axis) direction.

The carrier 2000 may be disposed on the base 3000, and the image sensor S may be disposed on the carrier 2000. As a result, as the base 3000 is moved, the carrier 2000 and the image sensor S may also be moved in the first axial (X axis) direction and the second axial (Y axis) direction.

A first buffer member d1 having elasticity may be disposed on at least one of the surfaces of the base 3000 and the housing 5000, the surfaces facing each other in the direction perpendicular to the optical axis (Z axis). For example, referring to FIGS. 10 and 11, the first buffer member d1 may be disposed on a side surface of the base 3000. The base 3000 may have four side surfaces, and the first buffer members d1 may be disposed on two points of each side surface of the base 3000 while being spaced apart from each other. The first buffer member d1 may be made of a material having elasticity. For example, the first buffer member d1 may be made of a rubber material.

Therefore, the first buffer member d1 may reduce impact and noise occurring when the base 3000, which may be moved in both the first axial (X axis) direction and the second axial (Y axis) direction, collides with the housing 5000.

The actuator 1 according to an example embodiment of the present disclosure may detect a position of the base 3000 in the direction perpendicular to the optical axis (Z axis).

To this end, the actuator may include a first position sensing unit 6500 (see FIG. 6). The first position sensing unit 6500 may include a first position sensor 6510 and a second position sensor 6530. The first position sensor 6510 may be disposed on the first substrate 8100 to face the first magnet 6110, and the second position sensor 6530 may be disposed on the first substrate 8100 to face the second magnet 6310. The first position sensor 6510 and the second position sensor 6530 may be Hall sensors.

For another example, the actuator may not include a separate position sensor. In this case, the first coil 6130 and the second coil 6330 may serve as the first position sensing unit 6500.

For example, the position of the base 3000 may be detected based on a change in inductances of the first coil 6130 and the second coil 6330.

For example, the first magnet 6110 and the second magnet 6310 may also be moved as the base 3000 is moved, and the levels of inductance of the first coil 6130 and the second coil 6330 may thus be changed. Therefore, the position of the base 3000 may be detected based on the change in the levels of inductance of the first coil 6130 and the second coil 6330.

Referring to FIGS. 6 and 7, the actuator 1 according to an example embodiment of the present disclosure may include a yoke unit 9000. The yoke unit 9000 may provide pressing force to keep the base 3000, the guide member 4000 and the housing 5000 in contact with the first ball member B1 and the second ball member B2, respectively.

The yoke unit 9000 may include a first yoke 9100 and a second yoke 9300, and the first yoke 9100 and the second yoke 9300 may be fixed to the housing 5000. For example, the first yoke 9100 and the second yoke 9300 may be disposed on the first substrate 8100, and the first substrate 8100 may be fixed on the housing 5000.

The first coil 6130 and the second coil 6330 may be disposed on one surface of the first substrate 8100, and the first yoke 9100 and the second yoke 9300 may be disposed on the other surface of the first substrate 8100.

The first yoke 9100 may be disposed to face the first magnet 6110 in the optical axis (Z axis) direction, and the second yoke 9300 may be disposed to face the second magnet 6310 in the optical axis (Z axis) direction.

Therefore, attractive force may act between the first yoke 9100 and the first magnet 6110 and between the second yoke 9300 and the second magnet 6310, respectively, in the optical axis (Z axis) direction.

Therefore, the base 3000 and the guide member 4000 may be pressed in a direction toward the yoke unit 9000, and the base 3000, the guide member 4000 and the housing 5000 may thus remain in contact with the first ball member B1 and the second ball member B2, respectively.

The first yoke 9100 and the second yoke 9300 may each be made of a material which may generate the attractive force between the first magnet 6110 and the second magnet 6310, respectively. For example, the first yoke 9100 and the second yoke 9300 may be made of a magnetic material.

In this example embodiment, the first magnet 6110 may be mounted on the guide member 4000, and the second magnet 6310 may be mounted on the base 3000. Therefore, the guide member 4000 may be pulled toward the first yoke 9100 by the attractive force generated between the first yoke 9100 and the first magnet 6110, and the base 3000 may be pulled toward the second yoke 9300 by the attractive force generated between the second yoke 9300 and the second magnet 6310.

Here, referring to FIGS. 6 and 11, the base 3000 may include a third yoke 9500 for the guide member 4000 and the base 3000 to be pressed to each other. The third yoke 9500 may be positioned on the base 3000 to be disposed to face the first magnet 6110 in the optical axis (Z axis) direction.

Therefore, the attractive force may also act between the third yoke 9500 and the first magnet 6110 in the optical axis (Z axis) direction, and the guide member 4000 and the base 3000 may thus be pressed to each other.

A contact between the respective components may be released by the external impact or the like even though the attractive force acts between the yoke unit 9000, the first magnet 6110 and the second magnet 6310. Accordingly, an example embodiment of the present disclosure may include a cover 5300 to improve its reliability against the external impact, etc.

The cover 5300 may be hooked with the housing 5000.

The actuator 1 according to an example embodiment of the present disclosure may precisely control the driving force for the image stabilization because the relative positions of the first magnet 6110 and the first coil 6130 and the relative positions of the second magnet 6310 and the second coil 6330 are not changed even though the carrier 2000 is moved in the optical axis (Z axis) direction while autofocusing is performed.

Figure 12:
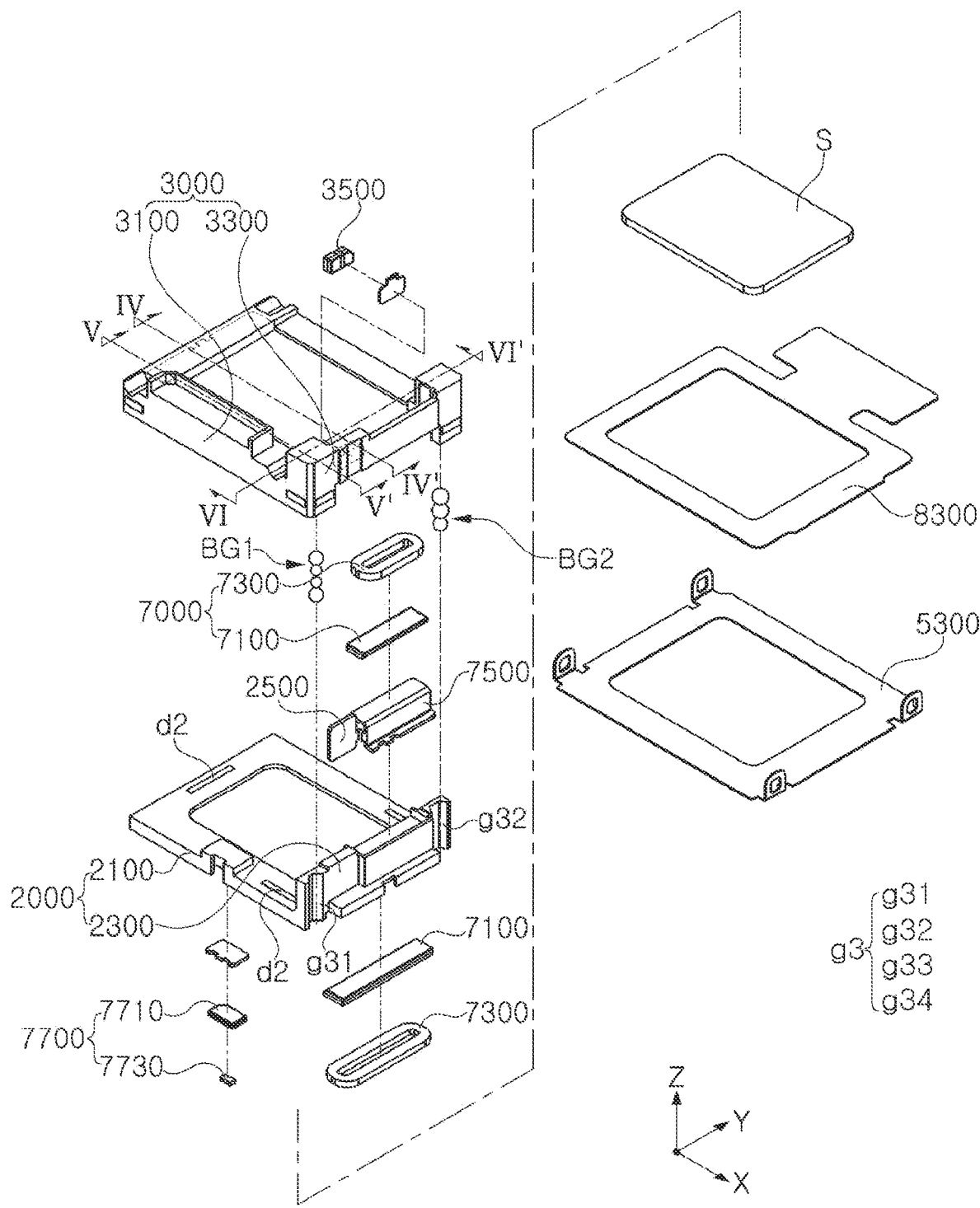
FIG. 12 is an exploded perspective view illustrating a carrier and the base.
Figure 13A:
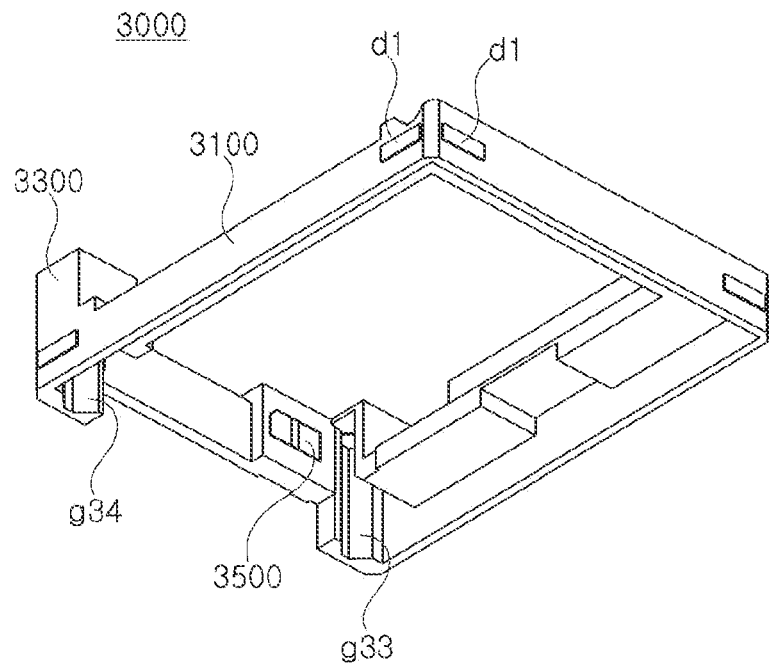
FIGS. 13A and 13B are bottom perspective views of the base.
Figure 13B:
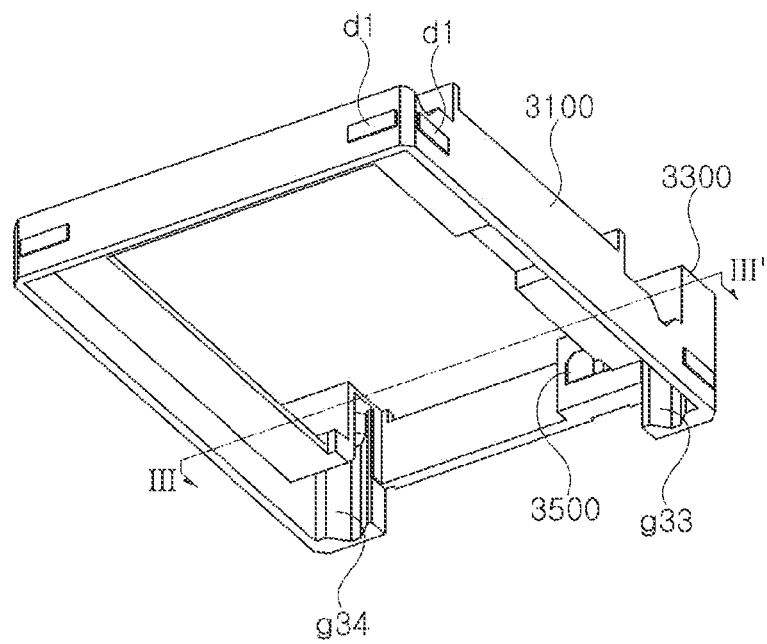
Figure 14:
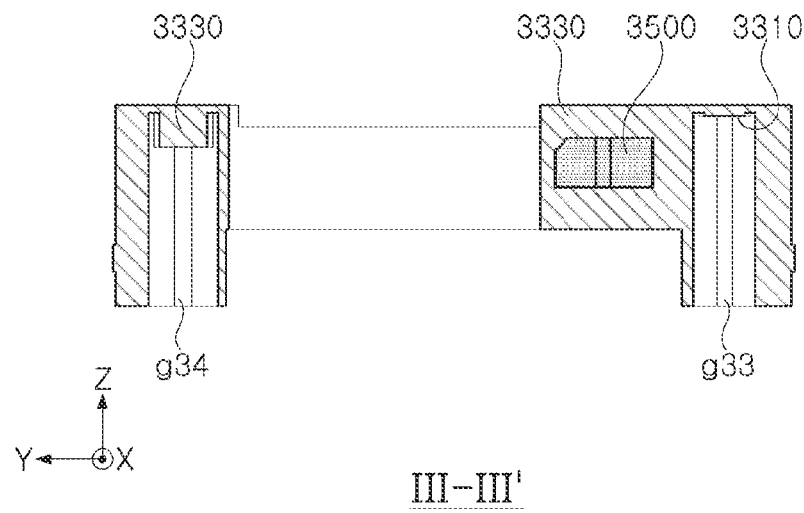
FIG. 14 is a cross-sectional view taken along line III-III' of FIG. 13B.
Figure 15:
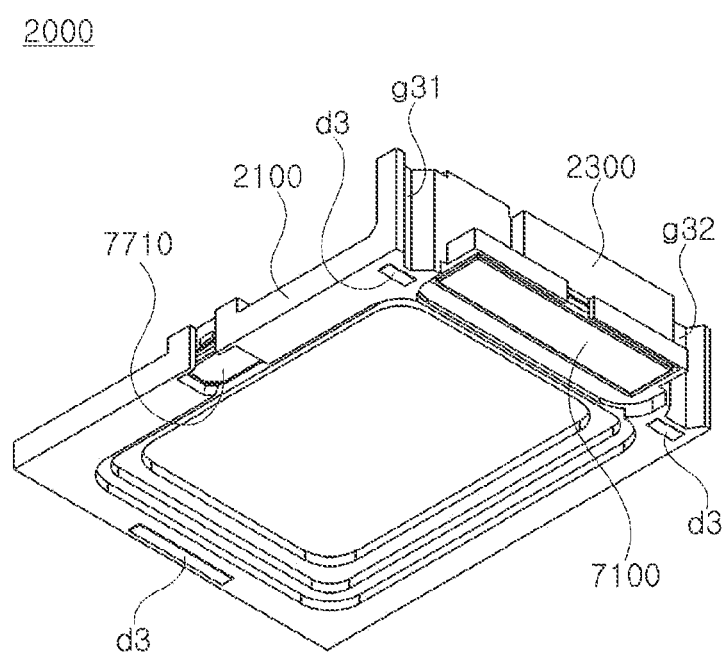
FIG. 15 is a bottom perspective view of the carrier.

FIG. 12 is an exploded perspective view illustrating the carrier and the base; FIGS. 13A and 13B are bottom perspective views of the base; and FIG. 14 is a cross-sectional view taken along line III-III' of FIG. 13B; and FIG. 15 is a bottom perspective view of the carrier.

Figure 16:
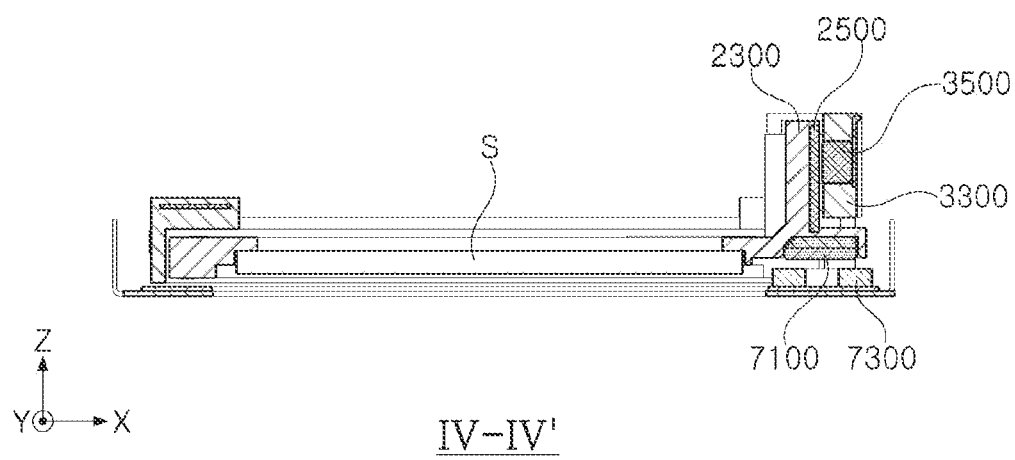
FIG. 16 is a cross-sectional view taken along line IV-IV' of FIG. 12.
Figure 17:
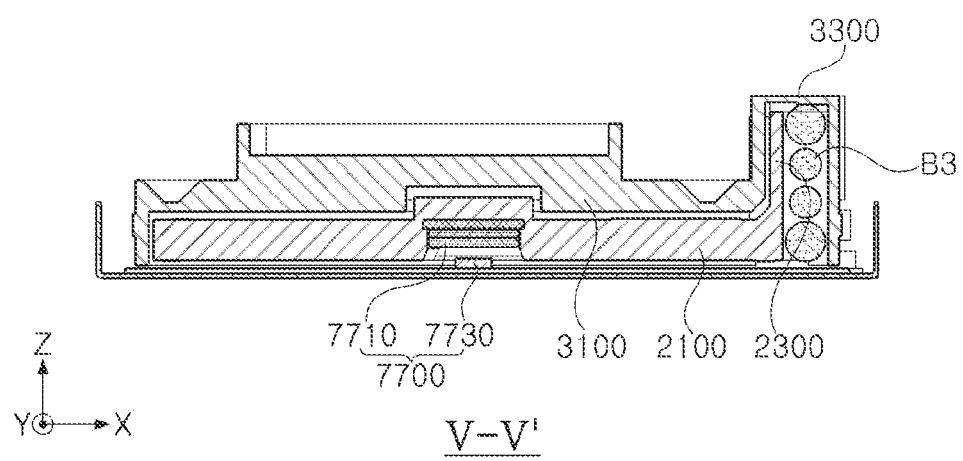
FIG. 17 is a cross-sectional view taken along line V-V' of FIG. 12.
Figure 18:
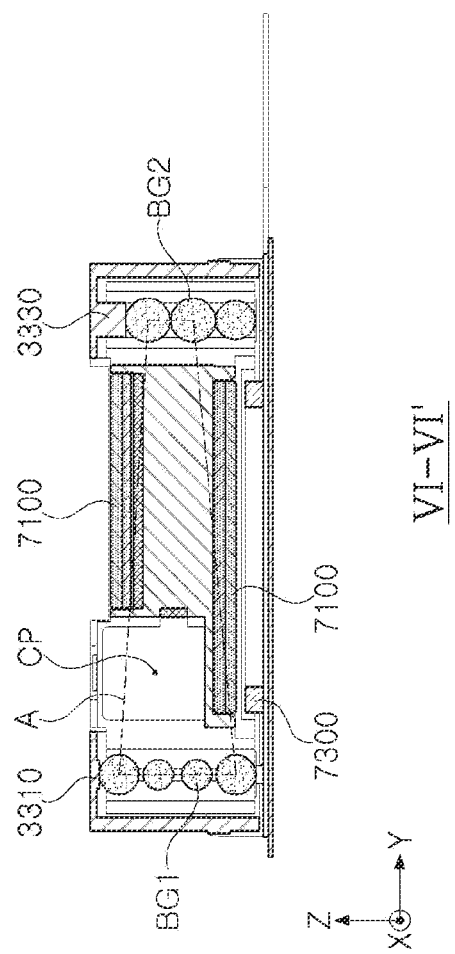
FIG. 18 is a cross-sectional view taken along line VI-VI' of FIG. 12.

In addition, FIG. 16 is a cross-sectional view taken along line IV-IV' of FIG. 12; FIG. 17 is a cross-sectional view taken along line V-V' of FIG. 12; and FIG. 18 is a cross-sectional view taken along line VI-VI' of FIG. 12.

Figure 19:
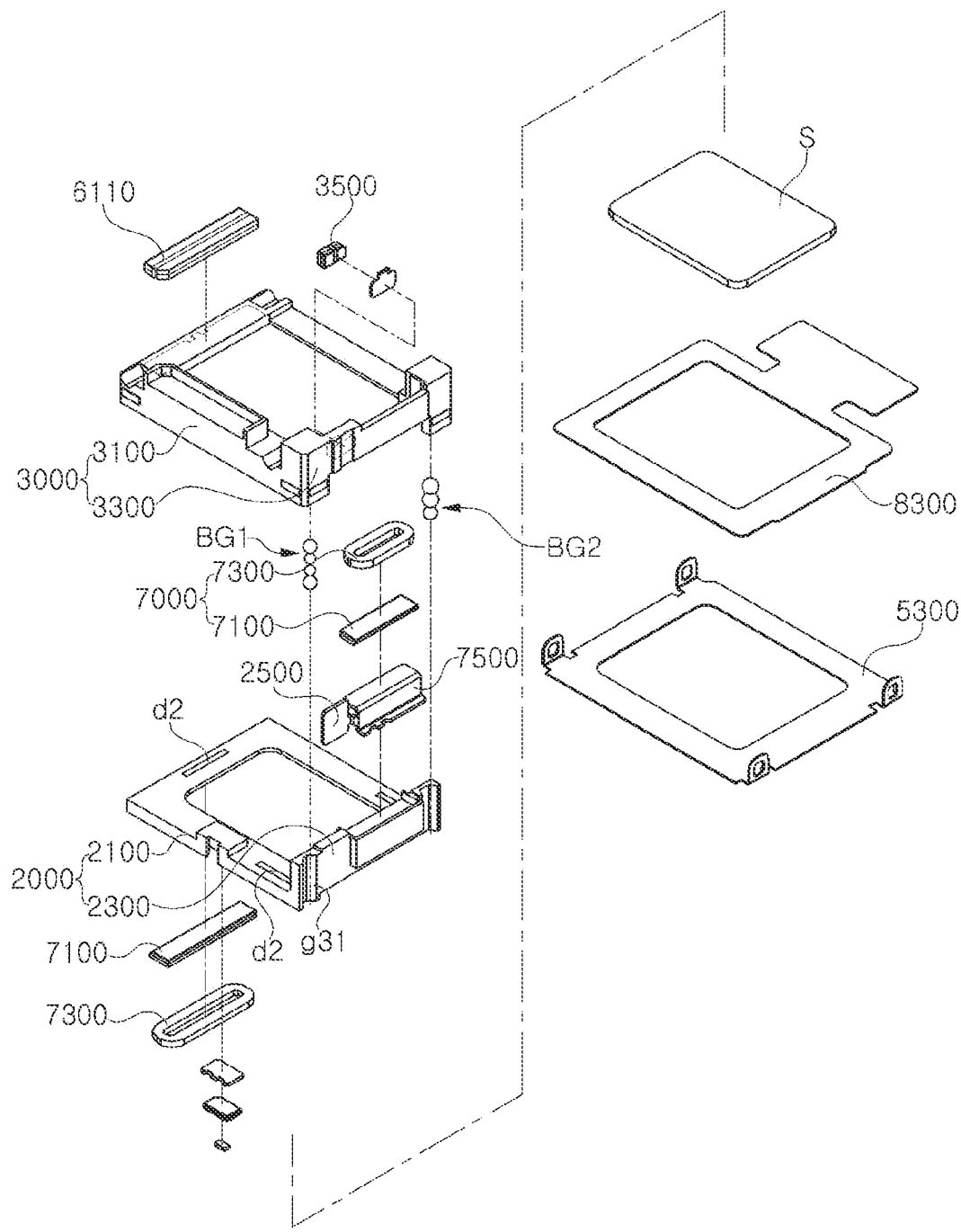
FIG. 19 illustrates a modified example of a position of a third magnet.

In addition, FIG. 19 illustrates a modified example of a position of the third magnet.

One or more examples of the movement of the carrier 2000 in the optical axis (Z axis) direction are further described with reference to FIGS. 12 through 19.

The carrier 2000 may include a body portion 2100 and a guide portion 2300. The body portion 2100 may have a shape of a rectangular frame. The guide portion 2300 may be disposed on one side of the body portion 2100. For example, the guide portion 2300 may be extended from the one side of the body portion 2100 in the optical axis (Z axis) direction.

The base 3000 may include a seating portion 3100 and a receiving portion 3300. The seating portion 3100 may have the shape of a rectangular frame. The receiving portion 3300 may be disposed on one side of the seating portion 3100. For example, the receiving portion 3300 may be extended from the one side of the seating portion 3100 in the optical axis (Z axis) direction.

The body portion 2100 of the carrier 2000 may be disposed on the seating portion 3100 of the base 3000. For example, referring to FIG. 12, the carrier 2000 may be disposed so that an upper surface of the body portion 2100 faces a lower surface of the seating portion 3100 of the base 3000.

The seating portion 3100 of the base 3000 may serve as a stopper to limit a range of the movement of the carrier 2000 when the carrier 2000 is moved upward in the optical axis (Z axis) direction.

A second buffer member d2 having elasticity may be disposed on at least one of surfaces of the body portion 2100 of the carrier 2000 and the seating portion 3100 of the base 3000, the surfaces facing each other in the optical axis (Z axis) direction. For example, referring to FIG. 12, the second buffer member d2 may be disposed on the upper surface of the body portion 2100 of the carrier 2000. The second buffer members d2 may be disposed on at least three points of the upper surface of the body portion 2100 of the carrier 2000, while being spaced apart from each other. The second buffer member d2 may be made of the material having elasticity. For example, the second buffer member d2 may be made of the rubber material.

Therefore, the second buffer member d2 may reduce impact and noise occurring when the carrier 2000 and the base 3000 collide with each other.

The guide portion 2300 of the carrier 2000 may be accommodated in the receiving portion 3300 of the base 3000. To this end, the receiving portion 3300 of the base 3000 may have an accommodation space in which the guide portion 2300 of the carrier 2000 is disposed.

The guide portion 2300 of the carrier 2000 and the receiving portion 3300 of the base 3000 may each include a third guide groove g3, and the third ball member B3 may be disposed in the third guide groove g3. The third guide groove g3 may be elongated in the optical axis (Z axis) direction.

The third ball member B3 may include a plurality of balls disposed in the optical axis (Z axis) direction. The plurality of balls may roll in the optical axis (Z axis) direction when the carrier 2000 is moved in the optical axis (Z axis) direction.

The third guide groove g3 may include a first groove g31, a second groove g32, a third groove g33 and a fourth groove g34. The first groove g31 and the second groove g32 may be positioned in the guide portion 2300 of the carrier 2000, and the third groove g33 and the fourth groove g34 may be positioned in the receiving portion 3300 of the base 3000. Each groove may be elongated in the optical axis (Z axis) direction.

The first groove g31 and the third groove g33 may be disposed opposing each other in the direction perpendicular to the optical axis (Z axis) direction, and some (e.g., first ball group BG1 described below) of the plurality of balls included in the third ball member B3 may be disposed in a space between the first groove g31 and the third groove g33.

In addition, the second groove g32 and the fourth groove g34 may be disposed opposing each other in the direction perpendicular to the optical axis (Z axis) direction, and the rest (e.g., second ball group BG2 described below) of the plurality of balls included in the third ball member B3 may be disposed in a space between the second groove g32 and the fourth groove g34.

The first groove g31, third groove g33 and fourth groove g34 may each have an approximately 'V' shaped cross section cut in a plane perpendicular to the optical axis (Z axis) direction, and the second groove g32 may have an approximately '⌣' shaped cross section cut in the same plane.

Accordingly, the first ball group BG1 of the third ball member B3 may be in contact with the first groove g31 at two points, and may be in contact with the third groove g33 at two points. In addition, the second ball group BG2 of the third ball member B3 may be in contact with the second groove g32 at one point, and may be in contact with the fourth groove g34 at two points.

That is, the first ball group BG1 of the third ball member B3 may be in contact with its subject at four points, and the second ball group BG2 of the third ball member B3 may be in contact with its subject at three points.

When the carrier 2000 is moved in the optical axis (Z axis) direction, the first ball group BG1 of the of third ball member B3, the first groove g31 and the third groove g33 may serve as main guides. In addition, the second ball group BG2 of the third ball member B3, the second groove g32 and the fourth groove g34 may serve as auxiliary guides.

A first magnetic material 2500 may be disposed on the guide portion 2300 of the carrier 2000, and a second magnetic material 3500 may be disposed on the receiving portion 3300 of the base 3000. The first magnetic material 2500 and the second magnetic material 3500 may face each other when the guide portion 2300 of the carrier 2000 is disposed on the receiving portion 3300 of the base 3000.

Attractive force may be generated between the first magnetic material 2500 and the second magnetic material 3500. For example, the attractive force may act between the first magnetic material 2500 and the second magnetic material 3500 in the direction perpendicular to the optical axis (Z axis).

One of the first magnetic material 2500 and the second magnetic material 3500 may be a magnet and the other may be a yoke. For another example, both the first magnetic material 2500 and the second magnetic material 3500 may be magnets.

The third ball member B3 may be in contact with each of the carrier 2000 and the base 3000 by the attractive force generated between the first magnetic material 2500 and the second magnetic material 3500.

The third ball member B3 may include the first ball group BG1 and the second ball group BG2, and the first ball group BG1 and the second ball group BG2 may each include the plurality of balls disposed in the optical axis (Z axis) direction.

The first ball group BG1 and the second ball group BG2 may be spaced apart from each other in the direction (e.g., Y axis direction) perpendicular to the optical axis (Z axis). The number of balls of the first ball group BG1 and the number of balls of the second ball group BG2 may be different from each other (see FIG. 12).

For example, the first ball group BG1 may include four or more balls arranged in the optical axis (Z axis) direction, and the second ball group BG2 may include three or less balls disposed in the optical axis (Z axis) direction.

However, the spirit of the present disclosure is not limited to the number of balls included in each ball group. The number of balls included in each ball group may be changed on a premise that the number of balls included in the first ball group BG1 and the number of balls included in the second ball group BG2 are different from each other. Hereinafter, for convenience of explanation, the description is made based on an example embodiment in which the first ball group BG1 includes four balls and the second ball group BG2 includes three balls.

Referring to FIG. 18, in the first ball group BG1, two balls disposed on an outermost side in the optical axis (Z axis) direction may have the same diameter and the balls disposed therebetween may each have a smaller diameter than the balls disposed on the outermost side. For example, in the first ball group BG1, the two balls disposed on the outermost side in the optical axis (Z axis) direction may each have a first diameter, the two balls disposed therebetween may each have a second diameter, and the first diameter may be greater than the second diameter.

In addition, two balls out of three balls in the second ball group BG2 may each have a greater diameter than the other one ball. For example, in the second ball group BG2, the two balls may each have a third diameter, the other one ball may have a fourth diameter, and the third diameter may be greater than the fourth diameter. In addition, the first diameter and the third diameter may be the same as each other.

Referring to FIG. 18, the two balls disposed above in the optical axis (Z axis) direction among the three balls of the second ball group BG2 may each have the third diameter, and the other one ball disposed at the bottom in the optical axis (Z axis) direction may have the fourth diameter. For another example, one ball disposed at the top in the optical axis (Z axis) direction may have the fourth diameter, and the other two balls may have the third diameter. In addition, the two balls disposed on the outermost side in the optical axis (Z axis) direction among the three balls of the second ball group BG2 may each have the third diameter, and the other one ball disposed therebetween may have the fourth diameter.

Here, the same diameter may indicate the same diameter including a manufacturing error as well as the physically same diameter.

Therefore, the third ball member B3 may be in contact with the carrier 2000 and the base 3000 at least three points.

Meanwhile, a distance between centers of the two balls each having the first diameter among the plurality of balls included in the first ball group BG1 and a distance between centers of the two balls each having the third diameter among the plurality of balls included in the second ball group BG2 may be different from each other. For example, the distance between the centers of the two balls each having the first diameter may be greater than the distance between the centers of the two balls each having the third diameter.

In order for the carrier 2000 to be moved parallel to the optical axis (Z axis) direction when moved in the optical axis (Z axis) direction (that is, in order to prevent the carrier 2000 from being tilted), a center point CP of the attractive force generated between the first magnetic material 2500 and the second magnetic material 3500 is required to be positioned in a support region "A" formed by connecting contact points of the third ball member B3 and the carrier 2000 (or the base 3000) to each other.

If the center point CP of the attractive force deviates from the support region "A," the carrier 2000 may have a shifted position during its movement, which may cause a risk in which the carrier 2000 is tilted. Therefore, it is necessary to make the support region "A" as wide as possible.

In an example embodiment of the present disclosure, intentionally forms each size (e.g., diameter) of some of the plurality of balls included in the third ball member B3 may be intentionally larger than a size (e.g., diameter) of the other balls. In this case, larger balls among the plurality of balls may be intentionally brought into contact with the carrier 2000 (or the base 3000).

Referring to FIG. 18, among the plurality of balls included in the first ball group BG1, the diameters of the two balls disposed on the outermost side in the optical axis (Z axis) direction may be larger than the diameters of the other balls, and the first ball group BG1 may thus be in contact with the carrier 2000 (or the base 3000) at two points. In addition, the diameters of two balls among the plurality of balls included in the second ball group BG2 may be larger than the diameter of the other ball, and the second ball group BG2 may thus be in contact with the carrier 2000 (or the base 3000) at two points.

Therefore, the third ball member B3 including the first ball group BG1 and the second ball group BG2 may be in contact with the carrier 2000 (or the base 3000) at four points. In addition, the support region "A" formed by connecting the contact points to each other may have a rectangular shape (e.g., trapezoid).

Therefore, the support region "A" may be made relatively wide, and the center point CP of the attractive force generated between the first magnetic material 2500 and the second magnetic material 3500 may thus be stably positioned in the support region "A." Therefore, it is possible to ensure the actuator to be stably driven when autofocusing is performed.

Meanwhile, even when some balls have the same diameter as each other, actual sizes of the balls may be different from each other due to the manufacturing error. That is, one of the first ball group BG1 and the second ball group BG2 may be in contact with the carrier 2000 (or the base 3000) at two points, and the other may be in contact with the carrier 2000 (or the base 3000) at one point. In this case, the support region "A" formed by connecting the contact points to each other may have a triangular shape unlike the shape illustrated in FIG. 18.

The first magnetic material 2500 and the second magnetic material 3500 may each be disposed closer to the main guides (e.g., first groove g31 and third groove g33) than to the auxiliary guides (e.g., second groove g32 and fourth groove g34). For example, when viewed from the first axial (X axis) direction, the center point CP of the attractive force generated between the first magnetic material 2500 and the second magnetic material 3500 may be disposed closer to the main guides than the auxiliary guides.

The support region "A" may have a longer length in the optical axis (Z axis) direction as being closer to the main guides. Therefore, the center point CP of the attractive force may be more stably positioned in the support region "A" by disposing the first magnetic material 2500 and the second magnetic material 3500 closer to the main guides.

Meanwhile, while autofocusing is performed, the plurality of balls of the first ball group BG1 and the plurality of balls of the second ball group BG2 may roll in the optical axis (Z axis) direction. Therefore, the support region "A" may have a size changed based on movements of the balls included in each ball group. In this case, there is a risk that the center point CP of the attractive force unexpectedly deviates from the support region "A" while the actuator 1 is being driven.

In an example embodiment of the present disclosure, a first protrusion 3310 and a second protrusion 3330, protruding toward the third ball member B3, may each be disposed on the receiving portion 3300 of the base 3000. For example, the first protrusion 3310 may be disposed in the third groove g33, which is the main guide, and the second protrusion 3330 may be disposed in the fourth groove g34, which is the auxiliary guide.

Here, the first protrusion 3310 and the second protrusion 3330 may have different lengths in the optical axis (Z axis) direction. For example, the length of the second protrusion 3330 in the optical axis (Z axis) direction may be longer than the length of the first protrusion 3310 in the optical axis (Z axis) direction.

In addition, a length of the third groove g33, which is the main guide, in the optical axis (Z axis) direction may be different from a length of the fourth groove g34, the auxiliary guide, in the optical axis (Z axis) direction. For example, the length of the third groove g33 in the optical axis (Z axis) direction may be longer than the length of the fourth groove g34 in the optical axis (Z axis) direction.

In an example embodiment of the present disclosure, the number of the plurality of balls included in the first ball group BG1 and the number of the plurality of balls included in the second ball group BG2 may be different from each other, and the lengths of the respective spaces in which the respective ball groups are accommodated in the optical axis (Z axis) direction may be different from each other. It is thus possible to prevent the size of the support region "A" from being changed, or prevent the center point CP of the attractive force from deviating from the support region "A" even when the size of the support region "A" is changed.

Referring to FIG. 12, the actuator 1 according to an example embodiment of the present disclosure may include a second drive unit 7000. The second drive unit 7000 may generate the driving force in the optical axis (Z axis) direction to move the carrier 2000 in the optical axis (Z axis) direction.

The second drive unit 7000 may include a third magnet 7100 and a third coil 7300. The third magnet 7100 and the third coil 7300 may be disposed opposing each other in the optical axis (Z axis) direction.

The third magnet 7100 may be disposed on the carrier 2000. For example, the third magnet 7100 may be disposed on at least one of the upper surface and lower surface of the carrier 2000. The third magnet 7100 may be disposed on at least one of the upper surface and lower surface of the guide portion 2300 of the carrier 2000. The upper surface of the carrier 2000 may be its surface facing the housing 5000, and the lower surface of the carrier 2000 may be its surface facing the cover 5300.

A third back yoke 7500 may be disposed between the carrier 2000 and the third magnet 7100. The third back yoke 7500 may prevent leakage of magnetic flux of the third magnet 7100, thereby improving the driving force thereof.

Referring to FIG. 12, the third magnet 7100 may include two magnets, and the respective magnets may be disposed on the upper and lower surfaces of the carrier 2000. In addition, the third coil 7300 may include two coils respectively facing the two magnets in the optical axis (Z axis) direction.

The third magnet 7100 and the third coil 7300 may face each other in the optical axis (Z axis) direction. Accordingly, a separation distance between the third magnet 7100 and the third coil 7300 in the optical axis (Z axis) direction may be changed as the third magnet 7100 is moved in the optical axis (Z axis) direction.

In an example embodiment of the present disclosure, the separation distance between the third magnet 7100 and the third coil 7300, disposed on the lower surface of the carrier 2000, may be increased when the separation distance between the third magnet 7100 and the third coil 7300, disposed on the upper surface of the carrier 2000, is decreased.

Therefore, it is possible to compensate the separation distance between the third magnet 7100 and the third coil 7300, thus preventing a magnitude of the driving force of a third drive unit 7000 from being changed based on the movement of the carrier 2000.

However, it is also possible to dispose the third magnet 7100 on either the upper or lower surface of the carrier 2000 based on a movement distance of the carrier 2000 which is required for autofocusing to be performed.

The third magnet 7100 may be a single-pole magnet magnetized so that the N and S poles are disposed in the optical axis (Z axis) direction. For example, the third magnet 7100 may have the S pole on its surface facing the third coil 7300, and the N pole on the opposite surface. The N and S poles may also be magnetized by being disposed in reverse order. The N and S poles may have the neutral region therebetween.

The third coil 7300 may be disposed to face the third magnet 7100. For example, the third coil 7300 may be disposed to face the third magnet 7100 in the optical axis (Z axis) direction.

When the third coil 7300 includes two coils, one coil may be disposed on the first substrate 8100, and the other coil may be disposed on a second substrate 8300. The second substrate 8300 may be mounted on the cover 5300 so that the third magnet 7100 and the third coil 7300 face each other in the optical axis (Z axis) direction.

The third magnet 7100 may be a moving member mounted on the carrier 2000 and moved together with the carrier 2000 in the optical axis (Z axis) direction, and the third coil 7300 may be a fixed member that is fixed to the first substrate 8100 and/or the second substrate 8300.

When power is applied to the third coil 7300, the carrier 2000 may be moved in the optical axis (Z axis) direction by electromagnetic force generated between the third magnet 7100 and the third coil 7300.

The image sensor S may be disposed on the carrier 2000, and the image sensor S may also be moved in the optical axis (Z axis) direction by the movement of the carrier 2000.

FIG. 19 illustrates a modified example of the position of the third magnet 7100. An example embodiment illustrated in FIG. 19 is different from an example embodiment illustrated in FIG. 12 in the positions of the third magnet 7100 and the third coil 7300.

Referring to FIG. 19, any one of the two magnets included in the third magnet 7100 may be disposed on the other portion of the lower surface of the carrier 2000 except for a portion on which the guide portion 2300 is disposed.

Referring to FIGS. 12 and 19, the third magnet 7100 may be disposed on any portion of the lower surface of the carrier 2000.

The third magnet 7100 may be disposed on any portion of the lower surface of the carrier 2000, and at least one magnet included in the third magnet 7100 may thus be disposed to overlap the first magnet 6110 or the second magnet 6310 in the optical axis (Z axis) direction based on the position of the third magnet 7100.

In an example embodiment illustrated in FIG. 19, the first magnet 6110 may be disposed to overlap the third magnet 7100 in the optical axis (Z axis) direction.

In this case, a yoke may thus be disposed between the first magnet 6110 and the third magnet 7100 because the magnetic field of the first magnet 6110 may affect the third coil 7300, or a magnetic field of the third magnet 7100 may affect the first coil 6130. The yoke may be disposed on at least one of the upper surface of the carrier 2000, the lower surface of the carrier 2000, and a lower surface of the base 3000. The yoke may be made of a magnetic metal material.

The actuator 1 according to an example embodiment of the present disclosure may detect a position of the carrier 2000 in the optical axis (Z axis) direction.

To this end, the actuator may include a second position sensing unit 7700 (see FIGS. 12 and 17). The second position sensing unit 7700 may include a sensing magnet 7710 and a third position sensor 7730. The sensing magnet 7710 may be disposed on the lower surface of the carrier 2000, and the third position sensor 7730 may be disposed on the second substrate 8300 to face the sensing magnet 7710. The third position sensor 7730 may be the Hall sensor.

In an example embodiment illustrated in FIG. 12, the second position sensing unit 7700 may include the sensing magnet 7710 and the third position sensor 7730. However, it is also possible to dispose the third position sensor 7730 to face the third magnet 7100 without disposing the separate sensing magnet 7710.

Alternatively, the second position sensing unit 7700 may include the sensing magnet 7710 and a sensing coil. For example, the sensing coil may be disposed on the second substrate 8300 to face the sensing magnet 7710. A level of inductance of the sensing coil may be changed as a distance between the sensing magnet 7710 and the sensing coil in the optical axis (Z axis) direction is changed, and the position of the carrier 2000 may be detected based on this change.

Alternatively, instead of disposing separate sensing magnet and sensing coil, the third coil 7300 may serve as the second position sensing unit 7700.

For example, the position of the carrier 2000 may be detected based on change in a level of inductance of the third coil 7300.

For example, the third magnet 7100 may also be moved as the carrier 2000 is moved, and the level of inductance of the third coil 7300 may thus be changed. Accordingly, the position of the carrier 2000 may be detected based on the change in the level of inductance of the third coil 7300.

The cover 5300 may be coupled to the housing 5000 to cover at least a portion of the lower surface of the carrier 2000.

Therefore, the cover 5300 may serve as a stopper to prevent the carrier 2000 from being separated externally from the actuator.

In addition, the cover 5300 may cover the lower surface of the guide portion 2300 of the carrier 2000 to prevent the third ball member B3 from being separated from the actuator.

A third buffer member d3 having elasticity may be disposed on at least one of surfaces of the body portion 2100 of the carrier 2000 and the cover 5300 (or second substrate 8300), the surfaces facing each other in the optical axis (Z axis) direction. For example, referring to FIG. 15, the third buffer member d3 may be disposed on the lower surface of the body portion 2100 of the carrier 2000. The third buffer members d3 may be disposed on at least three points of the lower surface of the body portion 2100 of the carrier 2000, while being spaced apart from each other. The third buffer member d3 may be made of the material having elasticity. For example, the third buffer member d3 may be made of the rubber material.

Therefore, the third buffer member d3 may reduce impact and noise occurring when the carrier 2000 and the cover 5300 (or second substrate 8300) collide with each other.

The carrier 2000 may be moved relative to the base 3000 in the optical axis (Z axis) direction. In addition, the carrier 2000 may be moved together with base 3000 in the direction perpendicular to the optical axis (Z axis).

The image sensor S may be electrically connected to the first substrate 8100 and/or the second substrate 8300. For example, the image sensor S may be electrically connected to the first substrate 8100 and/or the second substrate 8300.

The image sensor S may be moved in three axial directions, and a connection unit connecting the image sensor S and the first substrate 8100 and/or the second substrate 8300 to each other may be flexible.

For example, the connection unit may be a flexible film on which a conductor is patterned, or may be a plurality of cables. Therefore, the connection unit may be bent when the image sensor S is moved.

For another example, a third substrate connected to the image sensor S may be provided. The third substrate may have the flexible connection unit, and the image sensor S and the third substrate may be connected to each other by the connection unit. The connection unit may be the flexible film on which the conductor is patterned, or may be the plurality of cables.

Referring to FIGS. 3 through 19, the camera module C1 according to an example embodiment of the present disclosure may perform autofocusing (AF) and optical image stabilization (OIS) by moving the image sensor S rather than the lens module 1000. That is, the image sensor S may be moved along with the carrier 2000 in the optical axis (Z axis) direction to perform autofocusing. In addition, the image sensor S may be moved along with the carrier 2000 in the direction perpendicular to the optical axis (Z axis) to stabilize the image being captured.

Figure 20:
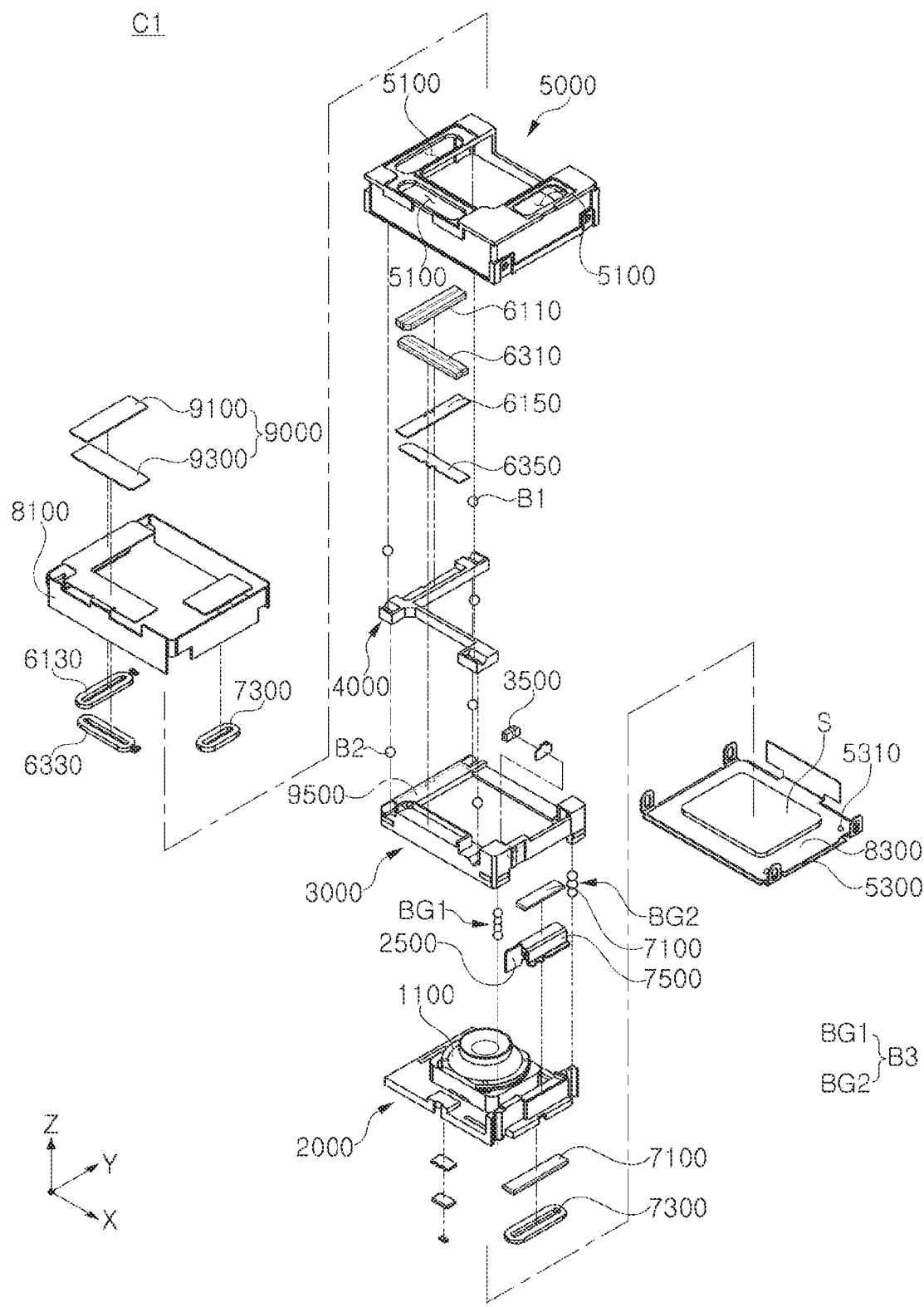
FIG. 20 illustrates a modified example of positions of the lens barrel and an image sensor.

For another example, referring to FIG. 20, the lens barrel 1100 may be coupled to the carrier 2000. Accordingly, the lens barrel 1100 may be moved along with the carrier 2000 in the optical axis (Z axis) direction to perform autofocusing. In addition, the lens barrel 1100 may be moved along with the carrier 2000 in the direction perpendicular to the optical axis (Z axis) to stabilize the image being captured.

The image sensor S may be disposed on the second substrate 8300, and the second substrate 8300 may be mounted on the cover 5300. In addition, the cover 5300 may be coupled to the housing 5000. In this case, the image sensor S may be the fixed member that is not moved while autofocusing (AF) and optical image stabilization (OIS) are performed.

The cover 5300 may include a protrusion 5310 protruding in the optical axis (Z axis) direction, and the protrusion 5310 may be disposed to face the third ball member B3 in the optical axis (Z axis) direction. Therefore, it is possible to prevent the third ball member B3 from being separated from the actuator by the protrusion 5310. For reference, a hole through which the protrusion 5310 passes may be disposed in the second substrate 8300.

Figure 21:
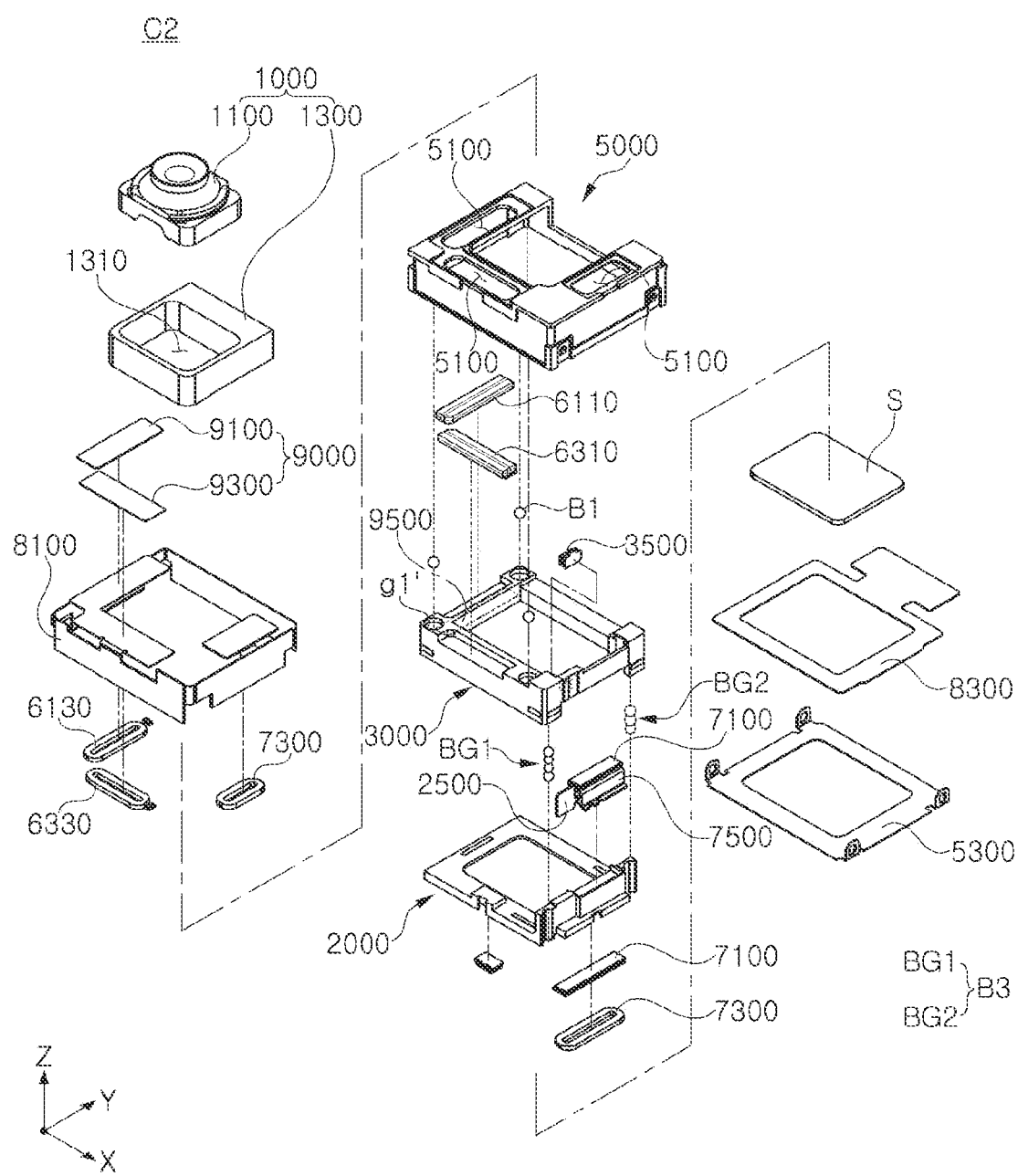
FIG. 21 is a schematic exploded perspective view of a camera module according to another example embodiment of the present disclosure.
Figure 22:
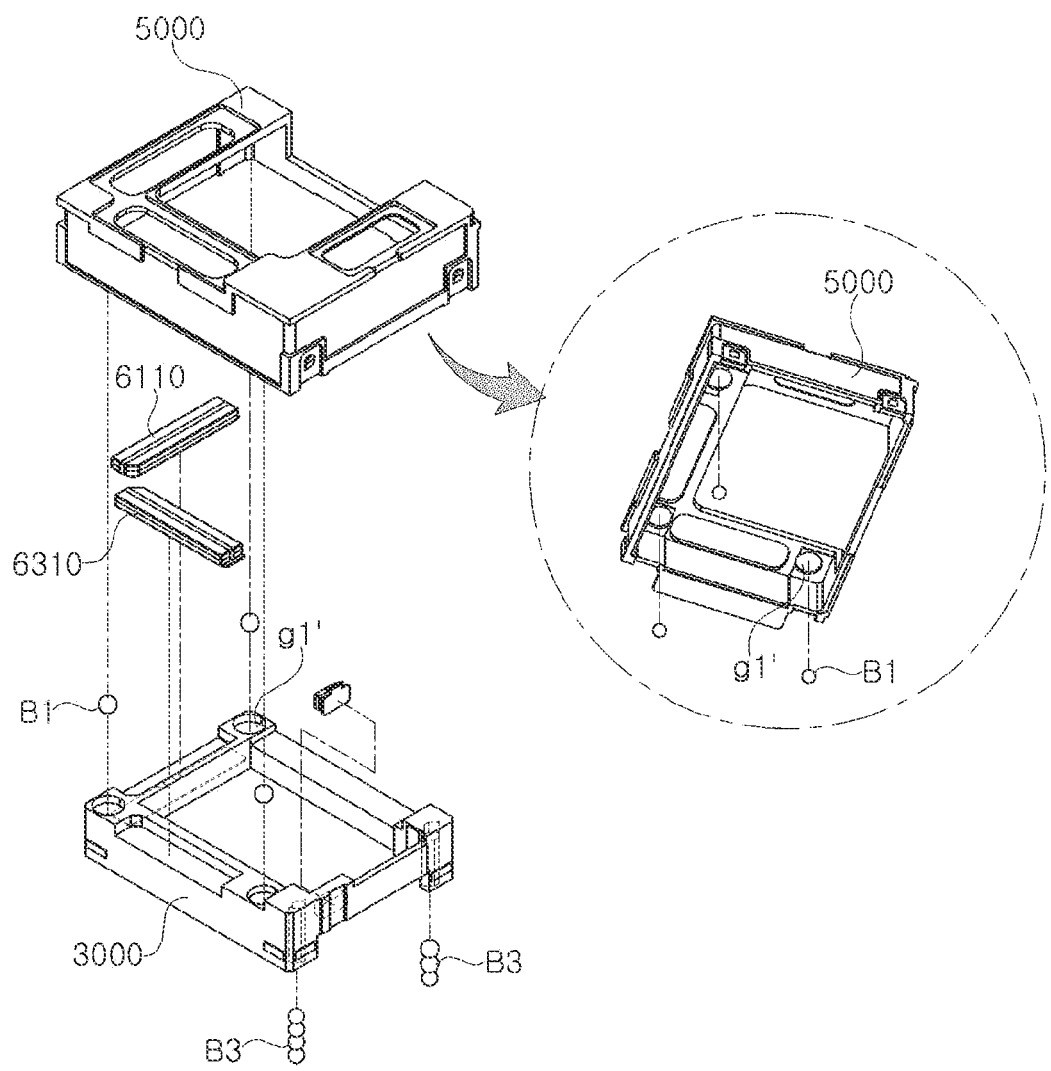
FIG. 22 is an exploded perspective view illustrating the housing and base of the camera module according to another example embodiment of the present disclosure.

FIG. 21 is a schematic exploded perspective view of a camera module according to another example embodiment of the present disclosure; and FIG. 22 is an exploded perspective view illustrating the housing and base of the camera module according to another example embodiment of the present disclosure.

An actuator 2 and a camera module C2 illustrated in FIGS. 21 and 22 are different in a configuration for guiding the movement of the base 3000 when compared to an example embodiment illustrated in FIGS. 3 through 19.

Referring to FIGS. 21 and 22, the base 3000 may be disposed in the housing 5000. Unlike an example embodiment illustrated in FIG. 6 through 19, the guide member 4000 is not disposed between the housing 5000 and the base 3000. In addition, as the guide member 4000 is not disposed between the guide member 4000 and the housing 5000, the ball member (i.e., first ball member of an example embodiment illustrated in FIGS. 6 through 19) is not disposed therebetween either.

The base 3000 may be moved in the housing 5000 in the first axial (X axis) direction and the second axial (Y axis) direction.

The first ball member B1 may be disposed between the housing 5000 and the base 3000. The first ball member B1 may be disposed in contact with each of the housing 5000 and the base 3000.

The first ball member B1 may serve to guide the base 3000 to be moved in two axial directions while the image stabilization is performed. In addition, the first ball member B1 may also serve to keep the gap between the housing 5000 and the base 3000.

The first ball member B1 may guide both the movements of the base 3000 in the first axial (X axis) direction and the second axial (Y axis) direction.

For example, the first ball member B1 may roll in the first axial (X axis) direction when the driving force is generated in the first axial (X axis) direction. Accordingly, the first ball member B1 may guide the movement of the base 3000 in the first axial (X axis) direction.

In addition, the first ball member B1 may roll in the second axial (Y axis) direction when the driving force is generated in the second axial (Y axis) direction. Accordingly, the first ball member B1 may guide the movement of the base 3000 in the second axial (Y axis) direction.

The first ball member B1 may include the plurality of balls disposed between the housing 5000 and the base 3000.

A first guide groove g1' in which the first ball member B1 is disposed may be positioned in at least one of the surfaces of the housing 5000 and the base 3000, the surfaces facing each other in the optical axis (Z axis) direction. The plurality of first guide grooves g1' may be positioned to correspond to the plurality of balls included in the first ball member B1.

The first ball member B1 may be disposed in the first guide groove g1' and inserted between the housing 5000 and the base 3000. When accommodated in the first guide groove g1', the first ball member B1 may be restricted from being moved in the optical axis (Z axis) direction, and may be moved in the first axial (X axis) direction and the second axial (Y axis) direction. For example, the first ball member B1 may roll in the first axial (X axis) direction and the second axial (Y axis) direction.

The first guide groove g1' may have a circular shaped cross section cut in the plane perpendicular to the optical axis (Z axis) direction.

Meanwhile, the first magnet 6110 and second magnet 6310 of the first drive unit 6000 may be mounted on the base 3000.

In another example embodiment illustrated in FIGS. 21 and 22, the guide member 4000 is not disposed between the housing 5000 and the base 3000, unlike in an example embodiment illustrated in FIGS. 6 through 19, and heights of the actuator 2 and the camera module C2 may thus be further reduced.

Figure 23:
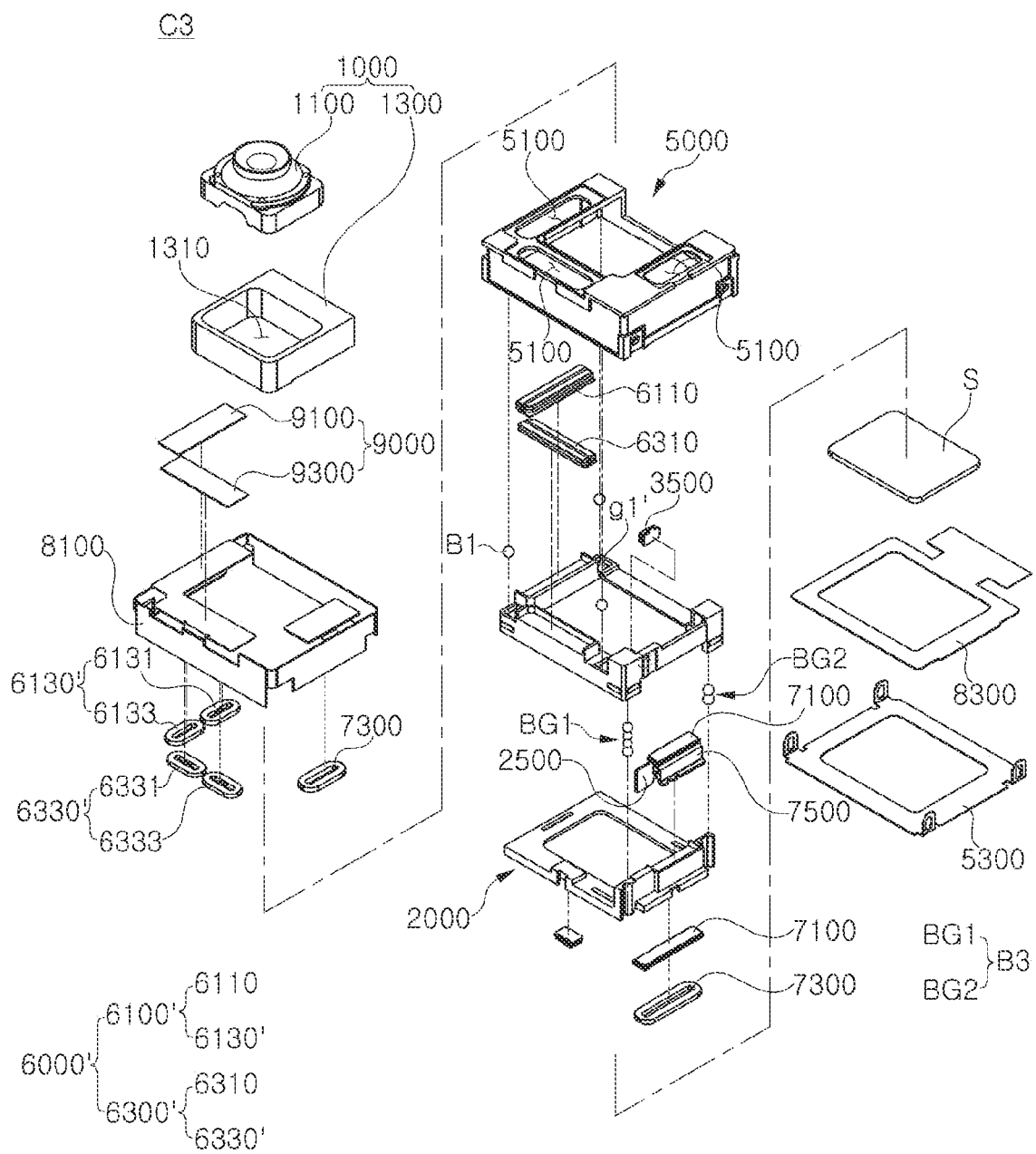
FIG. 23 is a perspective view of a camera module according to yet another example embodiment of the present disclosure.
Figure 24:
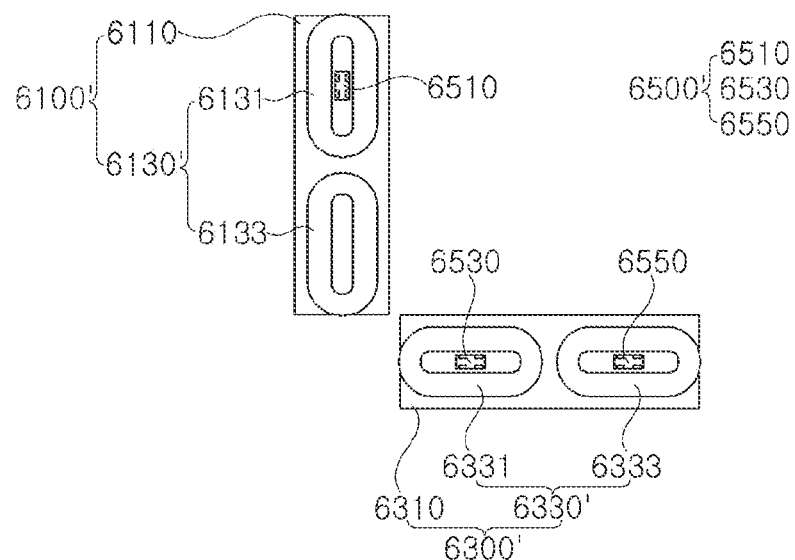
FIG. 24 is a plan view of a first drive unit of the camera module according to yet another example embodiment of the present disclosure.
Figure 25:
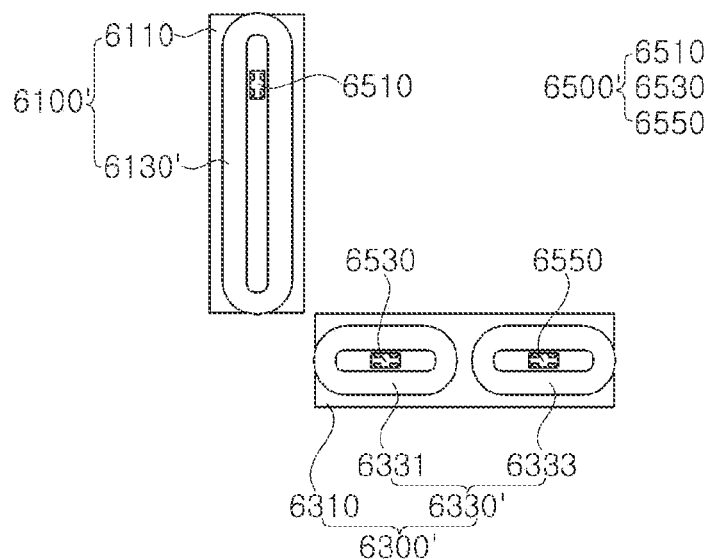
FIGS. 25 and 26 are modified examples of the first drive unit illustrated in FIG. 24.
Figure 26:
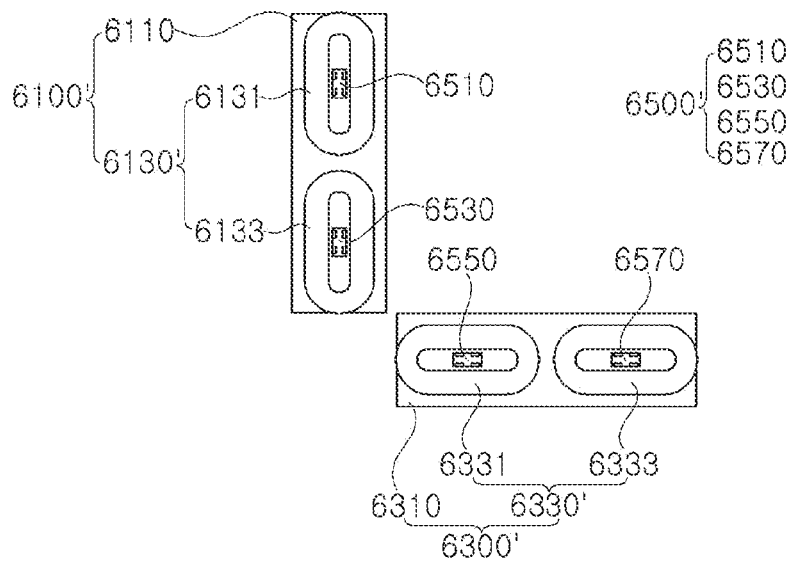

FIG. 23 is a perspective view of a camera module according to yet another example embodiment of the present disclosure; FIG. 24 is a plan view of a first drive unit of the camera module according to yet another example embodiment of the present disclosure; and FIGS. 25 and 26 are modified examples of the first drive unit illustrated in FIG. 24.

An actuator 3 and a camera module C3 illustrated in FIGS. 23 and 24 are different in a configuration of a first drive unit 6000' when compared to another example embodiment illustrated in FIGS. 21 and 22.

Referring first to another example embodiment illustrated in FIGS. 21 and 22, the first drive unit 6000 may include the first sub drive unit 6100 and the second sub drive unit 6300. The first sub drive unit 6100 may include the first magnet 6110 and the first coil 6130, and the second sub drive unit 6300 may include the second magnet 6310 and the second coil 6330.

In addition, the first guide groove g1' in which the first ball member B1 is disposed may have the circular shaped cross section cut in the plane perpendicular to the optical axis (Z axis) direction. The first ball member B1 may roll in the first guide groove g1' in the direction perpendicular to the optical axis (Z axis) direction.

Therefore, when the driving force unintentionally deviates in a process of generating the driving force in the first axial (X axis) direction or the second axial (Y axis) direction, there is a risk that a rotational force having the optical axis (Z axis) as its rotation axis acts on the base 3000.

In another example embodiment illustrated in FIGS. 21 and 22, it may be difficult to generate the driving force which may prevent the occurrence of such a rotational force or offset the rotational force.

However, in yet another example embodiment illustrated in FIGS. 23 through 25, the first drive unit 6000' may additionally generate the driving force that offsets the rotational force.

Referring to yet another example embodiment illustrated in FIGS. 23 through 25, the first drive unit 6000' may include a first sub drive unit 6100' and a second sub drive unit 6300'. The first sub drive unit 6100' may include the first magnet 6110 and a first coil unit 6130', and the second sub drive unit 6300' may include the second magnet 6310 and a second coil unit 6330'.

At least one of the first coil unit 6130' and the second coil unit 6330' may include two coils.

For example, the first coil unit 6130' may include a first sub-coil 6131 and a second sub-coil 6133, and the second coil unit 6330' may include a third sub-coil 6331 and a fourth sub-coil 6333.

The first sub-coil 6131 and the second sub-coil 6133 may each be disposed to face the first magnet 6110 in the optical axis (Z axis) direction. In addition, the first sub-coil 6131 and the second sub-coil 6133 may be disposed spaced apart from each other in a longitudinal direction of the first magnet 6110.

The third sub-coil 6331 and the fourth sub-coil 6333 may each be disposed to face the second magnet 6310 in the optical axis (Z axis) direction. In addition, the third sub-coil 6331 and the fourth sub-coil 6333 may be disposed spaced apart from each other in a longitudinal direction of the second magnet 6310.

FIGS. 23 and 24 show that yet another example embodiment in which the first coil unit 6130' and the second coil unit 6330' each include two coils. However, as illustrated in FIG. 25, any one of the first coil unit 6130' and the second coil unit 6330' may include two coils and the other coil unit may include one coil.

A first position sensing unit 6500' may include at least three position sensors. When the three position sensors are provided, one position sensor may be disposed to face any one of the first magnet 6110 and the second magnet 6310, and the other two position sensors may be disposed to face the other one of the first magnet 6110 and the second magnet 6310.

For example, referring to FIG. 24, the first position sensing unit 6500' may include the first position sensor 6510, the second position sensor 6530, and a third position sensor 6550.

The first position sensor 6510 may be disposed to face the first magnet 6110 in the optical axis (Z axis) direction, and the second position sensor 6530 and the third position sensor 6550 may each be disposed to face the second magnet 6310 in the optical axis (Z axis) direction. The second position sensor 6530 and the third position sensor 6550 may be disposed spaced apart from each other in the longitudinal direction of the second magnet 6310.

When the base 3000 is rotated because the rotational force having the optical axis (Z axis) as its rotation axis acts, the second magnet 6310 disposed on the base 3000 may also be rotated together with the base 3000. The second magnet 6310 may face the second position sensor 6530 and the third position sensor 6550 disposed apart from each other, and it may thus be determined whether the base 3000 is rotated by using the second position sensor 6530 and the third position sensor 6550. In addition, it is also possible to detect a position of the rotated base 3000.

Referring to FIG. 24, the first sub drive unit 6100' may include two coils, and the second sub drive unit 6300' may include two coils. Accordingly, the two coils of the first sub drive unit 6100' and the first magnet 6110, and the two coils of the second sub drive unit 6300' and the second magnet 6310 may interact with each other to generate the driving force that offsets the rotational force.

Referring to FIG. 26, the first sub drive unit 6100' may include two coils, and the second sub drive unit 6300' may include two coils, and the first position sensing unit 6500' may include four position sensors.

For example, the first position sensing unit 6500' may include the first position sensor 6510, the second position sensor 6530, the third position sensor 6550 and a fourth position sensor 6570.

The first position sensor 6510 and the second position sensor 6530 may each be disposed to face the first magnet 6110 in the optical axis (Z axis) direction, and the third position sensor 6550 and the fourth position sensor 6570 may each be disposed to face the second magnet 6310 in the optical axis (Z axis) direction. The first position sensor 6510 and the second position sensor 6530 may be disposed spaced apart from each other in the longitudinal direction of the first magnet 6110, and the third position sensor 6550 and the fourth position sensor 6570 may be disposed spaced apart from each other in the longitudinal direction of the second magnet 6310.

It is possible to detect whether the base 3000 is rotated and the position of the rotated base 3000 by using the four position sensors, and it is possible to offset the rotational force acting on the base 3000 by using the first sub drive unit 6100' and the second sub drive unit 6300'.

Figure 27:
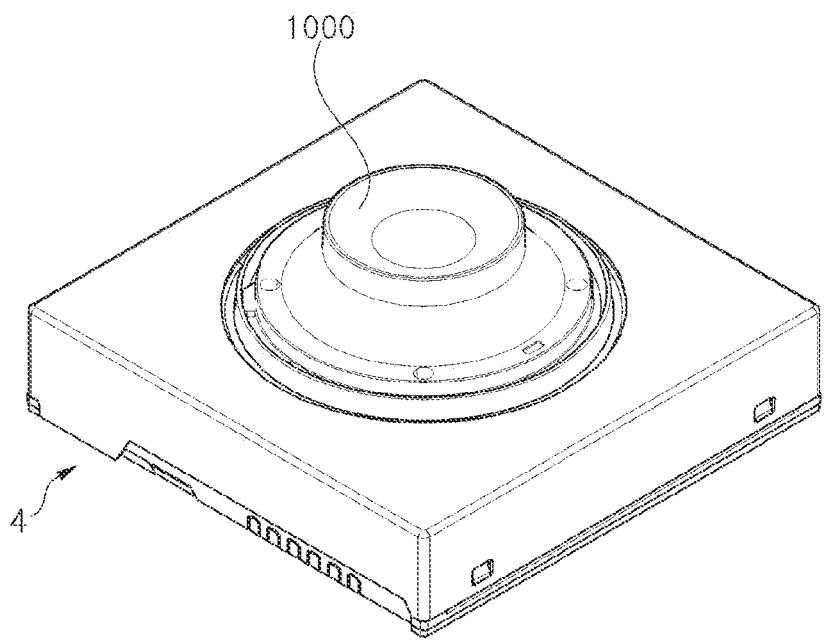
FIG. 27 is a perspective view of a camera module according to still another example embodiment of the present disclosure.
Figure 28:
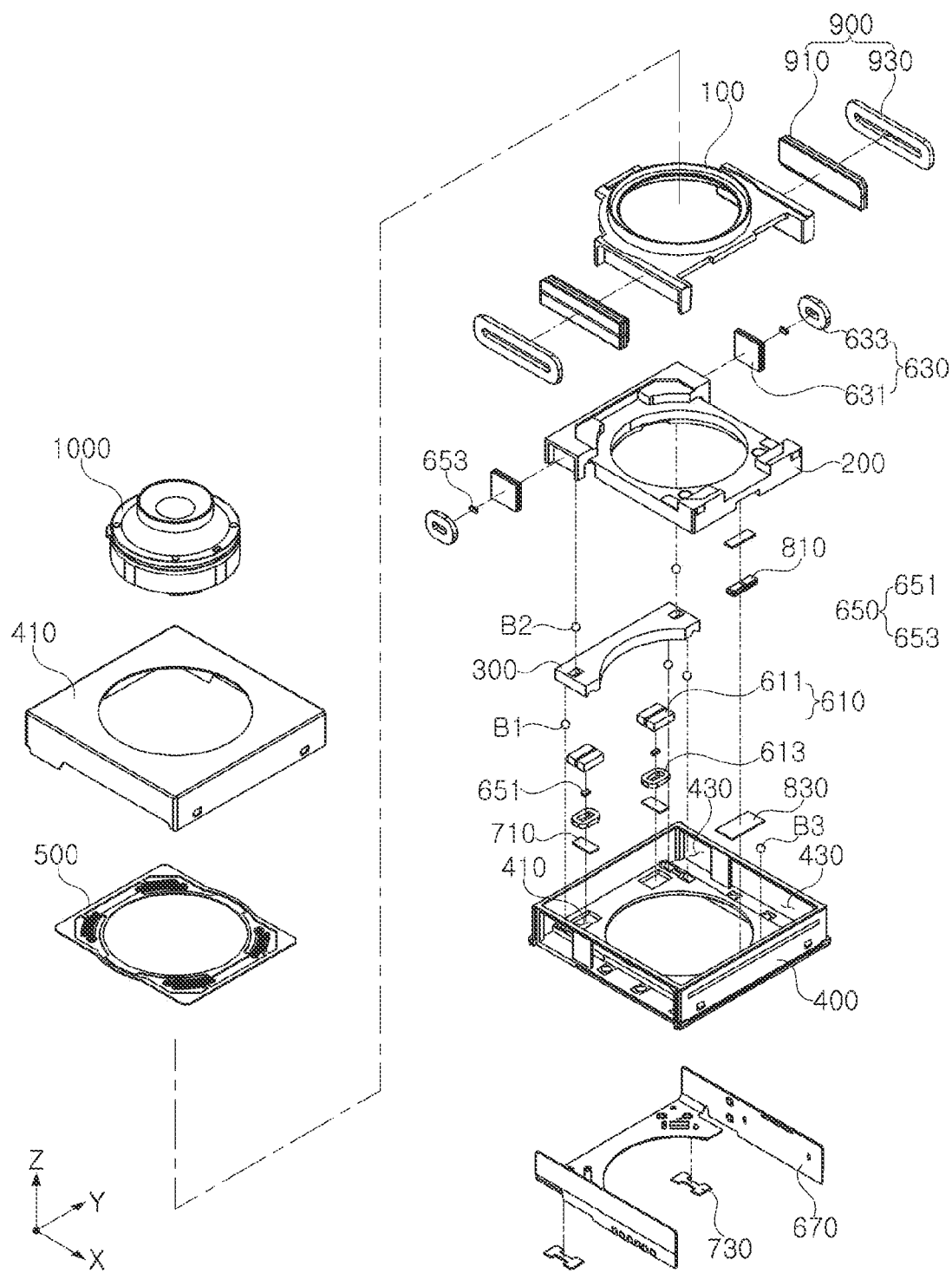
FIG. 28 is a schematic exploded perspective view of the camera module according to still another example embodiment of the present disclosure.

FIG. 27 is a perspective view of a camera module according to still another example embodiment of the present disclosure; and FIG. 28 is a schematic exploded perspective view of the camera module according to still another example embodiment of the present disclosure.

Referring to FIGS. 27 and 28, a camera module C4 according to still another example embodiment of the present disclosure may include the lens module 1000 and an actuator 4.

The lens module 1000 may include the at least one lens L and the lens barrel 1100. The at least one lens L may be disposed in the lens barrel 1100. When the lens module 1000 includes the plurality of lenses L, the plurality of lenses L may be mounted in the lens barrel 1100 along an optical axis (Z axis).

The at least one lens L and the lens barrel 1100 may each have the structure described with reference to FIGS. 4 and 5.

In this example embodiment, the lens module 1000 may be a moving member which is moved while the autofocusing (AF) and optical image stabilization (OIS) are performed. For example, autofocusing may be performed by moving the lens module 1000 in the optical axis (Z axis) direction, or the optical image may be stabilized by moving the lens module 1000 in the direction perpendicular to the optical axis (Z axis) direction.

For another example, it is also possible to dispose the image sensor S instead of the lens module 1000 on a carrier 100. In this case, the automatic focusing (AF) and optical image stabilization (OIS) may be performed by moving the image sensor S.

The actuator 4 may include the carrier 100, a base 200, a guide member 300 and a housing 400.

The carrier 100 may be moved in the optical axis (Z axis) direction. Referring to FIG. 28, the lens module 1000 may be coupled to the carrier 100.

Accordingly, the lens module 1000 may be moved along with the carrier 100 in the optical axis (Z axis) direction to perform autofocusing.

The carrier 100 may be disposed on the base 200. For example, the carrier 100 may be coupled to the base 200 by using an elastic member 500.

The base 200 may be moved in the direction perpendicular to the optical axis (Z axis). That is, the base 200 may be a fixed member that is not moved in the optical axis (Z axis) direction while autofocusing is performed, and may be a moving member that is moved in the direction perpendicular to the optical axis (Z axis) while the image stabilization is performed.

The carrier 100 may be disposed on the base 200, and the base 200 and the carrier 100 may thus be moved together in the direction perpendicular to the optical axis (Z axis) to stabilize the image. While autofocusing is performed, the carrier 100 may be moved relative to the base 200.

The base 200 may be disposed in the housing 400. The guide member 300 may be disposed between the base 200 and the housing 400. For example, the base 200 and the guide member 300 may be sequentially stacked in the housing 400 in the optical axis (Z axis) direction.

The guide member 300 may be moved in the first axial (X axis) direction, and the base 200 may be moved in the first axial (X axis) direction and the second axial (Y axis) direction.

For example, the guide member 300 and the base 200 may be moved together in the first axial (X axis) direction. In addition, the base 200 may be moved relative to the guide member 300 in the second axial (Y axis) direction.

The first axial (X axis) direction may indicate the direction perpendicular to the optical axis (Z axis), and the second axial (Y axis) direction may indicate the direction perpendicular to both the optical axis (Z axis) direction and the first axial (X axis) direction.

The first ball member B1 may be disposed between the guide member 300 and the housing 400, and the second ball member B2 may be disposed between the guide member 300 and the base 200. In addition, the third ball member B3 may be disposed between the base 200 and the housing 400.

The first ball member B1 may be disposed in contact with each of the guide member 300 and the housing 400, the second ball member B2 may be disposed in contact with each of the guide member 300 and the base 200, and the third ball member B3 may be disposed in contact with each of the base 200 and housing 400.

The carrier 100 may be disposed on the base 200. For example, the carrier 100 may be stacked on an upper surface of the base 200. While autofocusing is performed, the base 200 may be the fixed member that is not moved in the optical axis (Z axis) direction, and the carrier 100 may be a moving member that is moved in the optical axis (Z axis) direction.

The carrier 100 may be coupled to the base 200 by using the elastic member 500. Accordingly, the carrier 100 may be moved relative to the base 200 in the optical axis (Z axis) direction while being elastically supported by the elastic member 500.

Figure 29:
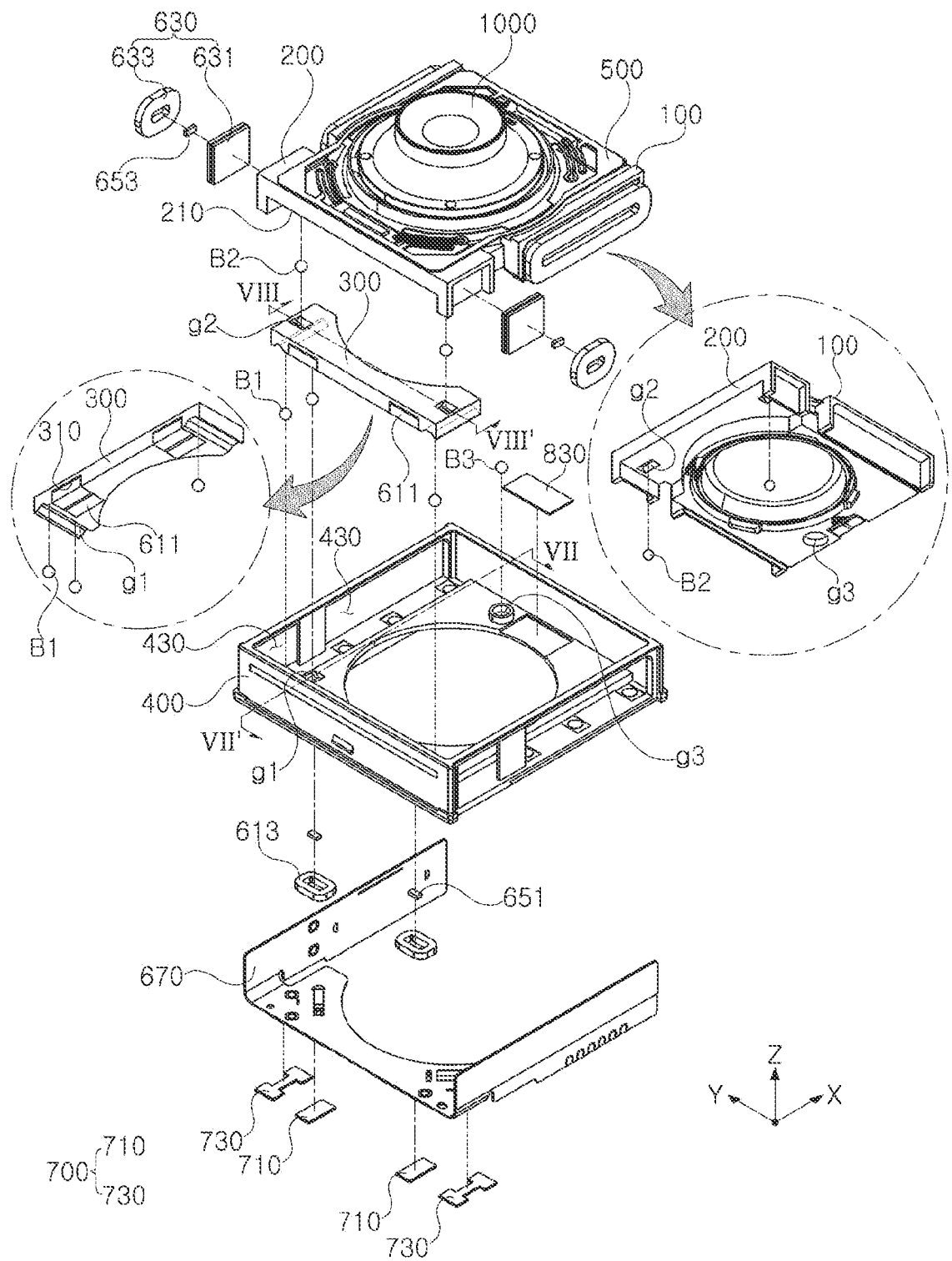
FIG. 29 is a perspective view illustrating that the lens module, the carrier, and the base are assembled to one another, and the guide member and the housing are exploded.
Figure 30:
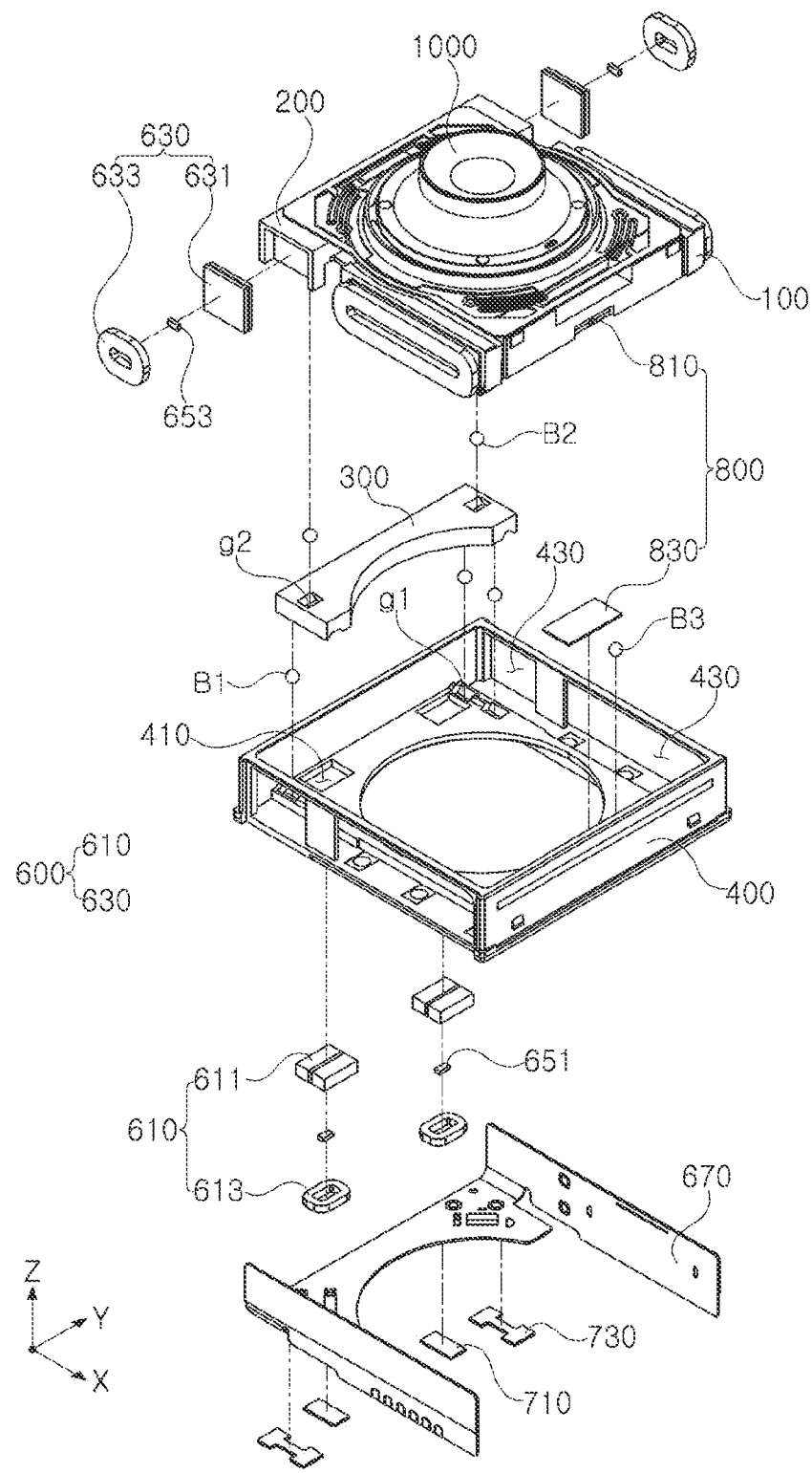
FIG. 30 is a perspective view of the components illustrated in FIG. 29, viewed from another direction.

FIG. 29 is a perspective view illustrating that the lens module, the carrier, and the base are assembled to one another, and the guide member and the housing are exploded; and FIG. 30 is a perspective view of the components illustrated in FIG. 29, viewed from another direction.

Figure 31:
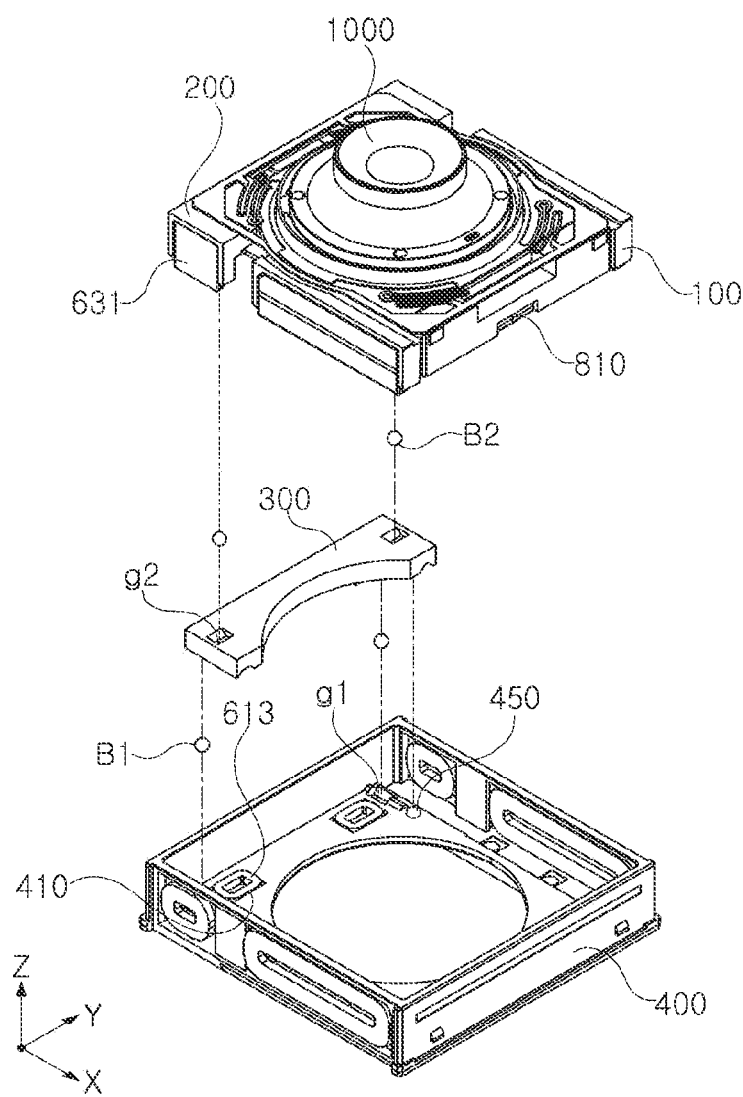
FIG. 31 illustrates a modified example of a support type of the guide member with respect to the housing.
Figure 32:
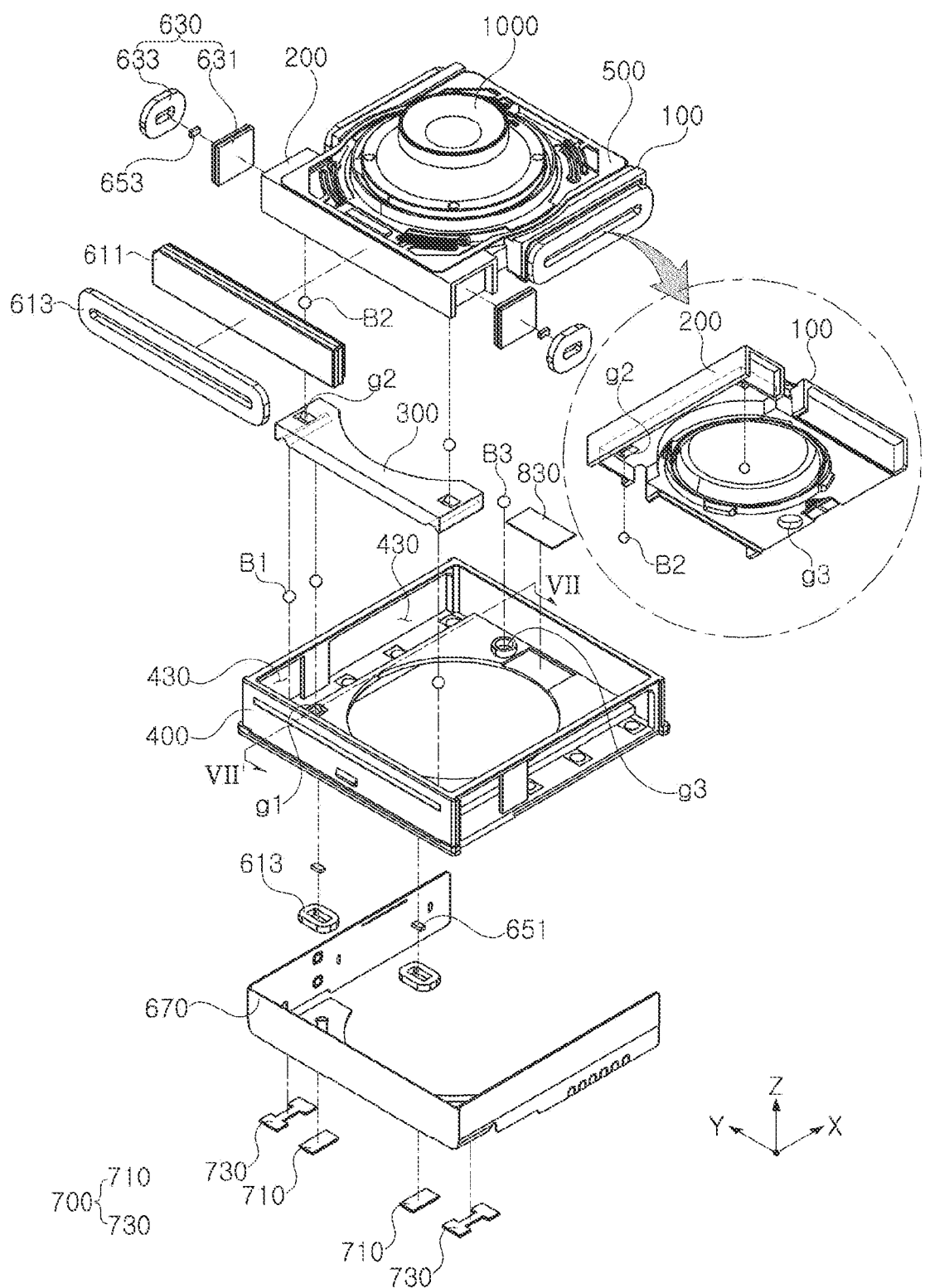
FIG. 32 illustrates a modified example of positions of a first magnet and a first coil.

In addition, FIG. 31 illustrates a modified example of a support type of the guide member with respect to the housing; and FIG. 32 illustrates a modified example of the positions of the first magnet and the first coil.

Figure 33:
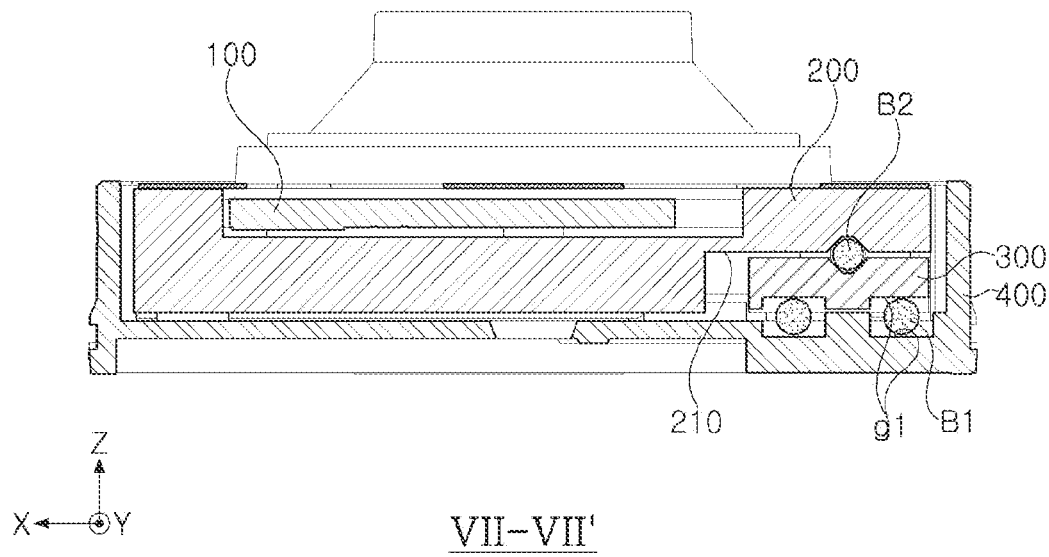
FIG. 33 is a cross-sectional view taken along line VII-VII' of FIG. 29.
Figure 34:
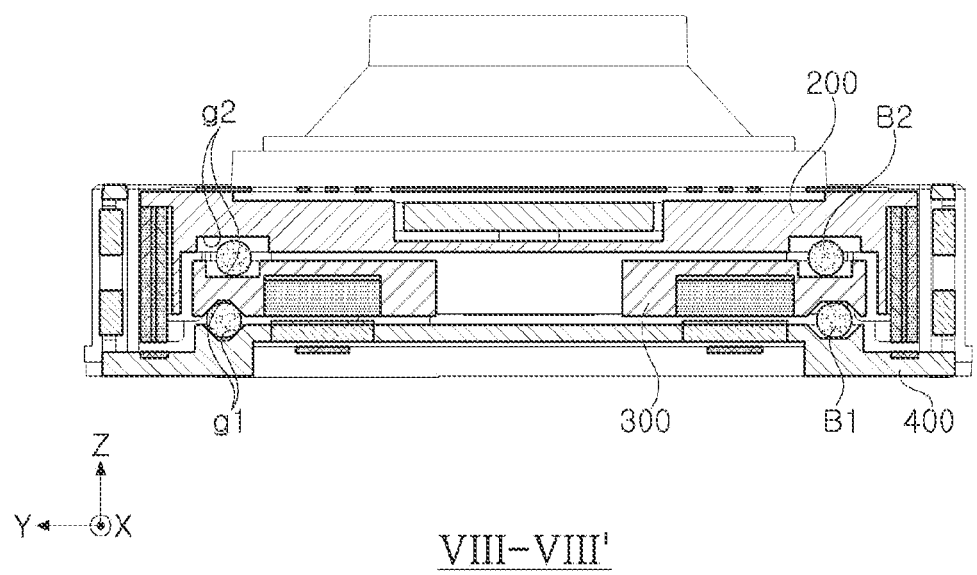
FIG. 34 is a cross-sectional view taken along line VIII-VIII' of FIG. 29.

FIG. 33 is a cross-sectional view taken along line VII-VII' of FIG. 29; and FIG. 34 is a cross-sectional view taken along line VIII-VIII' of FIG. 29.

One or more examples of the base 200 and the guide member 300 moved in the direction perpendicular to the optical axis (Z axis) are further described with reference to FIGS. 29 through 34.

The guide member 300 and the base 200 may be disposed in the housing 400. For example, the guide member 300 and the base 200 may be sequentially stacked in the housing 400 in the optical axis (Z axis) direction. The guide member 300 may thus be disposed between the housing 400 and the base 200.

The guide member 300 may have a shape of a rectangle whose three sides are removed when viewed from the optical axis (Z axis) direction. For example, the guide member 300 may have a '—' shape when viewed from the optical axis (Z axis) direction. That is, the guide member 300 may have a bar shape.

The guide member 300 may be disposed on one side of the base 200. For example, the guide member 300 may be disposed adjacent to one side surface of the base 200. A receiving groove 210 may be positioned in a lower surface of the base 200, and the guide member 300 may be disposed in the receiving groove 210 of the base 200.

The guide member 300 may be inserted into the receiving groove 210, thereby preventing the actuator 4 and the camera module C4 from having increased overall heights due to a thickness of the guide member 300.

The guide member 300 may be disposed in the receiving groove 210 of the base 200, and it may still be desired to reduce the thickness of the guide member 300 to further reduce the height of the actuator 4 in the optical axis (Z axis) direction.

However, when having the reduced thickness, the guide member 300 may have weaker rigidity to have lower reliability against the external impact, etc.

Therefore, the guide member 300 may include a reinforcing plate to have reinforced rigidity.

For example, the reinforcing plate may be insert-injected to be integrally coupled to the guide member 300. In this case, the reinforcing plate may be manufactured to be integrated with the guide member 300 by injecting a resin material into a mold in a state where the reinforcing plate is fixed in the mold.

The reinforcing plate may be disposed in the guide member 300. In addition, the reinforcing plate may be disposed to be partially exposed outwardly from the guide member 300. In this manner, the reinforcing plate may be partially exposed outwardly from the guide member 300 while being integrally formed in the guide member 300, which may improve a bonding force between the reinforcing plate and the guide member 300, and prevent the reinforcing plate from being separated from the guide member 300.

The reinforcing plate may be the non-magnetic metal lest the reinforcing plate affects magnetic fields of first and second magnets 611 and 631 of the first drive unit 600 described below.

The guide member 300 may be moved in the first axial (X axis) direction, and the base 200 may be moved in the first axial (X axis) direction and the second axial (Y axis) direction.

For example, the guide member 300 and the base 200 may be moved together in the first axial (X axis) direction. In addition, the base 200 may be moved relative to the guide member 300 in the second axial (Y axis) direction.

The carrier 100 may be disposed on the base 200, and the lens module 1000 may be disposed on the carrier 100. Therefore, as the base 200 is moved in the first axial (X axis) direction and the second axial (Y axis) direction, the carrier 100 and the lens module 1000 may also be moved in the first axial (X axis) direction and the second axial (Y axis) direction.

The actuator 4 may include the first drive unit 600. The first drive unit 600 may generate the driving force in the direction perpendicular to the optical axis (Z axis) to move the base 200 in the direction perpendicular to the optical axis (Z axis).

The first drive unit 600 may include a first sub drive unit 610 and a second sub drive unit 630. The first sub drive unit 610 may generate the driving force in the first axial (X axis) direction, and the second sub drive unit 630 may generate the driving force in the second axial (Y axis) direction.

The first sub drive unit 610 may include a first magnet 611 and a first coil 613. The first magnet 611 and the first coil 613 may be disposed opposing each other in the optical axis (Z axis) direction.

The first magnet 611 may include two magnets, and the two magnets may be disposed spaced apart from each other in the second axial (Y axis) direction.

The first coil 613 may include two coils, and the two coils may be disposed spaced apart from each other in the second axial (Y axis) direction.

The first magnet 611 may be disposed on the guide member 300. For example, a mounting groove 310 may be positioned in a lower surface of the guide member 300, and the first magnet 611 may be disposed in the mounting groove 310. The first magnet 611 may be inserted into the mounting groove 310, thereby preventing the actuator 4 and the camera module C4 from having increased overall heights due to a thickness of the first magnet 611.

A first back yoke may be disposed between the guide member 300 and the first magnet 611. The first back yoke may prevent leakage of magnetic flux of the first magnet 611, thereby improving the driving force thereof.

The first magnet 611 may be magnetized so that one surface (e.g., surface facing the first coil 613) thereof has both the N pole and the S pole. For example, the N pole, the neutral region, and the S pole may be sequentially positioned on the one surface of the first magnet 611, facing the first coil 613, in the first axial (X axis) direction.

The first coil 613 may be disposed to face the first magnet 611. For example, the first coil 613 may be disposed to face the first magnet 611 in the optical axis (Z axis) direction. The first coil 613 may have the hollow donut shape.

The first coil 613 may be disposed on a substrate 670. The substrate 670 may be mounted on the housing 400 so that the first magnet 611 and the first coil 613 face each other in the optical axis (Z axis) direction.

The housing 400 may include a first through-hole 410. For example, the first through-hole 410 may pass through a bottom surface of the housing 400 in the optical axis (Z axis) direction. The first coil 613 may be disposed in the first through-hole 410 of the housing 400. The first coil 613 may be disposed in the first through-hole 410 of the housing 400, thereby preventing the actuator 4 and the camera module C4 from having increased overall heights due to a thickness of the first coil 613.

The first magnet 611 may be a moving member mounted on the guide member 300 and moved together with the guide member 300, and the first coil 613 may be a fixed member fixed to the substrate 670 and the housing 400.

When power is applied to the first coil 613, the guide member 300 may be moved in the first axial (X axis) direction by electromagnetic force generated between the first magnet 611 and the first coil 613.

The second sub drive unit 630 may include a second magnet 631 and a second coil 633. The second magnet 631 and the second coil 633 may be disposed to face each other in the direction (e.g., second axial (Y axis) direction) perpendicular to the optical axis (Z axis).

The second magnet 631 may include two magnets, and the two magnets may be disposed spaced apart from each other in the second axial (Y axis) direction.

The second coil 633 may include two coils, and the two coils may be disposed spaced apart from each other in the second axial (Y axis) direction.

The second magnet 631 may be disposed on the base 200. For example, the second magnet 631 may be disposed on the side surface of the base 200. The second magnet 631 may be biased to one side of the side surface of the base 200. That is, the second magnet 631 may be disposed spaced apart from a center of the side surface (e.g., surface extended in the first axial (X axis) direction) of the base 200 in the first axial (X axis) direction.

Therefore, the second magnet 631 may be disposed adjacent to the guide member 300. For example, the second magnet 631 may be disposed to overlap the side surface of the guide member 300 in the second axial (Y axis) direction.

When the driving force generated by the second magnet 631 and the second coil 633 acts at a position far from the guide member 300, there may occur a moment in which the rotational force acts on the base 200. However, in this example embodiment, it is possible to prevent the moment of the rotational force from occurring and to minimize loss of the driving force by disposing the second magnet 631 and the second coil 633 close to the guide member 300.

A second back yoke may be disposed between the base 200 and the second magnet 631. The second back yoke may prevent leakage of magnetic flux of the second magnet 631, thereby improving the driving force thereof.

The second magnet 631 may be magnetized so that one surface (e.g., surface facing the second coil 633) thereof has the S pole or the N pole. For example, the one surface of the second magnet 631 facing the second coil 633 may have the N pole, and the other surface (e.g., surface opposite to the one surface) of the second magnet 631 may have the S pole.

The second coil 633 may be disposed to face the second magnet 631. For example, the second coil 633 may be disposed to face the second magnet 631 in the direction (e.g., second axial (Y axis) direction) perpendicular to the optical axis (Z axis). The second coil 633 may have the hollow donut shape.

The second coil 633 may be disposed on the substrate 670. The substrate 670 may be mounted on the housing 400 so that the second magnet 631 and the second coil 633 face each other in the second axial (Y axis) direction.

The housing 400 may include a second through-hole 430. For example, the second through-hole 430 may pass through a side surface of the housing 400 in the second axial (Y axis) direction. The second coil 633 may be disposed in the second through-hole 430 of the housing 400. The second coil 633 may be disposed in the second through-hole 430 of the housing 400, thereby preventing the actuator 4 and the camera module C4 from having increased overall sizes due to a thickness of the second coil 633.

The second magnet 631 may be a moving member mounted on the base 200 and moved together with the base 200, and the second coil 633 may be a fixed member fixed to the substrate 670 and the housing 400.

When power is applied to the second coil 633, the base 200 may be moved in the second axial (Y axis) direction by electromagnetic force generated between the second magnet 631 and the second coil 633.

In this example embodiment, the first magnet 611 may be mounted on the guide member 300, and the second magnet 631 may be mounted on the base 200. For another example, both the first magnet 611 and the second magnet 631 may also be mounted on the base 200 (see FIG. 32). In this case, the first magnet 611 may be disposed on a side surface (e.g., surface extended in the second axial (Y axis) direction) of the base 200, on which the second magnet 631 is not disposed among its side surfaces. The first magnet 611 and the first coil 613 may be disposed opposing each other in the optical axis (Z axis) direction.

The first magnet 611 may be magnetized so that one surface (e.g., surface facing the first coil 613) thereof has the S pole or the N pole. For example, the one surface of the first magnet 611 facing the first coil 613 may have the N pole, and the other surface (e.g., surface opposite to the one surface) of the first magnet 611 may have the S pole.

FIG. 32 illustrates still another example embodiment in which the first magnet 611 may include one magnet and the first coil 613 may include one coil. In this case, the first magnet 611 and the first coil 613 may each be elongated in the second axial (Y axis) direction. For another example, the first magnet 611 may include a plurality of magnets disposed spaced apart from each other in the second axial (Y axis) direction, and the first coil 613 may also include a plurality of magnets disposed spaced apart from each other in the second axial (Y axis) direction.

As illustrated in FIGS. 28 and 29, the first coil 613 and the second coil 633 may be wound coils and mounted on the substrate 670. For another example, the first coil 613 and the second coil 633 may be copper foil patterns stacked and embedded in the substrate 670.

The first ball member B1 may be disposed between the guide member 300 and the housing 400, and the second ball member B2 may be disposed between the guide member 300 and the base 200. In addition, the third ball member B3 may be disposed between the base 200 and the housing 400.

The first ball member B1 may be disposed in contact with each of the guide member 300 and the housing 400, the second ball member B2 may be disposed in contact with each of the guide member 300 and the base 200, and the third ball member B3 may be disposed in contact with each of the base 200 and housing 400.

The first ball member B1 and the second ball member B2 may serve to guide the movements of the guide member 300 and the base 200 while the image stabilization is performed. In addition, the ball members may also serve to keep each gap between the base 200, the guide member 300 and the housing 400.

In addition, the third ball member B3 may roll without limitation in the direction perpendicular to the optical axis (Z axis) as described below, and may assist in guiding the movement of the base 200 while keeping the gap between the base 200 and the housing 400.

The first ball member B1 may guide the movement of the guide member 300 in the first axial (X axis) direction, and the second ball member B2 may guide the movement of the base 200 in the second axial (Y axis) direction.

For example, the first ball member B1 may roll in the first axial (X axis) direction when the driving force is generated in the first axial (X axis) direction. Accordingly, the first ball member B1 may guide the movement of the guide member 300 in the first axial (X axis) direction.

In addition, the second ball member B2 may roll in the second axial (Y axis) direction when the driving force is generated in the second axial (Y axis) direction. Accordingly, the second ball member B2 may guide the movement of the base 200 in the second axial (Y axis) direction.

The first ball member B1 may include a plurality of balls disposed between the guide member 300 and the housing 400. For example, the first ball member B1 may include three balls.

The second ball member B2 may include a plurality of balls disposed between the base 200 and the guide member 300. For example, the second ball member B2 may include two balls.

That is, the number of the plurality of balls included in the first ball member B1 and the number of the plurality of balls included in the second ball member B2 may be different from each other, and any one of the first ball member B1 and the second ball member B2 may include at least three balls.

The guide member 300 has the straight shape, and when the guide member 300 is in contact with the subjects (base 200 and housing 400) at two points, the guide member 300 may be tilted. Therefore, in this example embodiment, the guide member 300 needs to be in contact with at least one of the subjects, i.e., base 200 and housing 400, at three points. Here, 'contact at three points' may indicate the minimum number of the contacts required to prevent the guide member 300 from being tilted. Therefore, the guide member 300 may be in contact with the subject at four points or more.

Referring to FIGS. 29 and 30, the first guide groove g1 in which the first ball member B1 is disposed may be positioned in at least one of the surfaces of the guide member 300 and the housing 400, the surfaces facing each other in the optical axis (Z axis) direction. The plurality of first guide grooves g1 may be positioned to correspond to the plurality of balls included in the first ball member B1.

The first ball member B1 may be disposed in the first guide groove g1 and inserted between the guide member 300 and the housing 400.

When accommodated in the first guide groove g1, the first ball member B1 may be restricted from being moved in the optical axis (Z axis) direction or the second axial (Y axis) direction, and may be moved only in the first axial (X axis) direction. For example, the first ball member B1 may roll only in the first axial (X axis) direction.

To this end, the first guide groove g1 may be elongated in the first axial (X axis) direction.

Referring to FIGS. 29 and 30, the second guide groove g2 in which the second ball member B2 is disposed may be positioned in at least one of the surfaces of the base 200 and the guide member 300, the surfaces facing each other in the optical axis (Z axis) direction. The plurality of second guide grooves g2 may be positioned to correspond to the plurality of balls included in the second ball member B2.

The second ball member B2 may be accommodated in the second guide groove g2 and inserted between the base 200 and the guide member 300.

When accommodated in the second guide groove g2, the second ball member B2 may be restricted from being moved in the optical axis (Z axis) direction or the first axial (X axis) direction, and may be moved only in the second axial (Y axis) direction. For example, the second ball member B2 may roll only in the second axial (Y axis) direction.

To this end, the second guide groove g2 may be elongated in the second axial (Y axis) direction.

As illustrated in FIG. 33, when the driving force is generated in the first axial (X axis) direction, the guide member 300 and the base 200 may be moved together in the first axial (X axis) direction.

Here, the first ball member B1 disposed between the guide member 300 and the housing 400 may roll along the first axis (X axis).

The second ball member B2 may be disposed between the guide member 300 and the base 200 and restricted from being moved in the first axial (X axis) direction. As a result, the base 200 may also be moved in the first axial (X axis) direction as the guide member 300 is moved in the first axial (X axis) direction.

As illustrated in FIG. 34, when the driving force is generated in the second axial (Y axis) direction, the base 200 may be moved in the second axial (Y axis) direction.

Here, the second ball member B2 disposed between the base 200 and the guide member 300 may roll along the second axis (Y axis).

The guide member 300 may be moved in the first axial (X axis) direction, and the base 200 may be moved in both the first axial (X axis) direction and the second axial (Y axis) direction.

The carrier 100 may be disposed on the base 200, and the lens module 1000 may be disposed on the carrier 100. As a result, as the base 200 is moved, the carrier 100 and the lens module 1000 may also be moved in the first axial (X axis) direction and the second axial (Y axis) direction.

Meanwhile, both the first ball member B1 and the second ball member B2 may be biased to one side of the base 200, and the base 200 may thus be tilted. That is, the components (e.g., first ball member B1, second ball member B2 and guide member 300) supporting the base 200 may be all disposed adjacent to the one side surface of the base 200, and the base 200 may thus be tilted.

Therefore, the third ball member B3 may be disposed between the base 200 and the housing 400.

The third ball member B3 may be disposed to roll without limitation in the direction perpendicular to the optical axis (Z axis). Therefore, the third ball member B3 may roll in the first axial (X axis) direction when the base 200 is moved in the first axial (X axis) direction, and the third ball member B3 may roll in the second axial (Y axis) direction when the base 200 is moved in the second axial (Y axis) direction.

The third ball member B3 may assist in guiding the movement of the base 200 while keeping the gap between the base 200 and the housing 400, thereby preventing the base 200 from being tilted.

A third guide groove g3 in which the third ball member B3 is disposed may be disposed on at least one of the surfaces of the base 200 and the housing 400, the surfaces facing each other in the optical axis (Z axis) direction.

The third ball member B3 may be accommodated in the third guide groove g3 and inserted between the base 200 and the housing 400.

When accommodated in the third guide groove g3, the third ball member B3 may be restricted from being moved in the optical axis (Z axis) direction, and may be moved in the direction perpendicular to the optical axis (Z axis). For example, the third ball member B3 may roll in the first axial (X axis) direction and the second axial (Y axis) direction.

A shape of the third guide groove g3 may be different from those of the first guide groove g1 and the second guide groove g2. For example, the third guide groove g3 may have the circular shaped cross section cut in the plane perpendicular to the optical axis (Z axis) direction.

A buffer member having elasticity may be disposed on at least one of the surfaces of the base 200 and the housing 400, the surfaces facing each other in the direction perpendicular to the optical axis (Z axis). For example, a configuration of the first buffer member d1 described with reference to FIGS. 10 and 11 may be provided in the base 200.

Therefore, the buffer member may reduce impact and noise occurring when the base 200, which may be moved in both the first axial (X axis) direction and the second axial (Y axis) direction, collides with the housing 400.

The actuator 4 may detect a position of the base 200 in the direction perpendicular to the optical axis (Z axis).

To this end, the actuator may include a first position sensing unit 650. The first position sensing unit 650 may include a first position sensor 651 and a second position sensor 653. The first position sensor 651 may be disposed on the substrate 670 to face the first magnet 611, and the second position sensor 653 may be disposed on the substrate 670 to face the second magnet 631. The first position sensor 651 and the second position sensor 653 may be the Hall sensors.

For another example, the actuator may not include a separate position sensor. In this case, the first coil 613 and the second coil 633 may serve as the first position sensing unit 650.

For example, the position of the base 200 may be detected based on a change in inductances of the first coil 613 and the second coil 633.

For example, the first magnet 611 and the second magnet 631 may also be moved as the base 200 is moved, and the levels of inductance of the first coil 613 and the second coil 633 may thus be changed. Therefore, the position of the base 200 may be detected based on the change in the levels of inductance of the first coil 613 and the second coil 633.

Referring to FIGS. 28 and 29, the actuator 4 may include a yoke unit 700. The yoke unit 700 may provide pressing force to keep the base 200, the guide member 300 and the housing 400 in contact with the first ball member B1 and the second ball member B2.

The yoke unit 700 may include a first yoke 710 and a second yoke 730, and the first yoke 710 and the second yoke 730 may be fixed to the housing 400. For example, the first yoke 710 and the second yoke 730 may be disposed on the substrate 670, and the substrate 670 may be fixed on the housing 400.

The first coil 613 may be disposed on one surface of the substrate 670, and the first yoke 710 and the second yoke 730 may be disposed on the other surface (e.g., the surface opposite to the surface facing a lower surface of the housing 400) of the substrate 670.

For another example, the yoke unit 700 may be disposed on the housing 400. For example, the first yoke 710 and the second yoke 730 may be insert-injected to be integrally coupled to the housing 400. In this case, the first yoke 710 and the second yoke 730 may be manufactured to be integrated with the housing 400 by injecting the resin material into the mold in a state where the first yoke 710 and the second yoke 730 are fixed in the mold.

The first yoke 710 may be disposed to face the first magnet 611 in the optical axis (Z axis) direction, and the second yoke 730 may be disposed to face the second magnet 631 in the optical axis (Z axis) direction.

Therefore, attractive force may act between the first yoke 710 and the first magnet 611 and between the second yoke 730 and the second magnet 631, respectively, in the optical axis (Z axis) direction.

Therefore, the base 200 and the guide member 300 may be pressed in a direction toward the yoke unit 700, and the base 200, the guide member 300 and the housing 400 may thus remain in contact with the first ball member B1 and the second ball member B2, respectively.

The first yoke 710 and the second yoke 730 may each be made of a material which may generate the attractive force between the first magnet 611 and the second magnet 631. For example, the first yoke 710 and the second yoke 730 may be made of the magnetic material.

In this example embodiment, the first magnet 611 may be mounted on the guide member 300, and the second magnet 631 may be mounted on the base 200. Therefore, the guide member 300 may be pulled toward the first yoke 710 by the attractive force generated between the first yoke 710 and the first magnet 611, and the base 200 may be pulled toward the second yoke 730 by the attractive force generated between the second yoke 730 and the second magnet 631.

For another example, the yoke unit 700 may include only the second yoke 730 without the first yoke 710. For example, the base 200 may be pulled toward the second yoke 730 by the attractive force generated between the second yoke 730 and the second magnet 631, and the guide member 300 disposed between the base 200 and the housing 400 may thus also remain in contact with the first ball member B1 and the second ball member B2.

The actuator 4 may include a pulling unit 800 so that the third ball member B3 may remain in contact with each of the base 200 and the housing 400.

The pulling unit 800 may include a first magnetic material 810 and a second magnetic material 830. The first magnetic material 810 and the second magnetic material 830 may respectively be disposed on the surfaces of the base 200 and the housing 400, the surfaces facing each other in the optical axis (Z axis) direction.

For example, the first magnetic material 810 may be disposed on the lower surface of the base 200, and the second magnetic material 830 may be disposed on the bottom surface of the housing 400. The first magnetic material 810 and the second magnetic material 830 may face each other in the optical axis (Z axis) direction.

The first magnetic material 810 and the second magnetic material 830 may generate attractive force between each other. For example, the attractive force may act between the first magnetic material 810 and the second magnetic material 830 in the optical axis (Z axis) direction.

One of the first magnetic material 810 and the second magnetic material 830 may be a magnet and the other may be a yoke. For another example, both the first magnetic material 810 and the second magnetic material 830 may be magnets.

The third ball member B3 may be in contact with each of the base 200 and the housing 400 by the attractive force generated between the first magnetic material 810 and the second magnetic material 830.

Meanwhile, FIG. 31 illustrates a modified example of a support type of the guide member with respect to the housing. The example illustrated in FIG. 31 is different in the support type between the guide member 300 and the housing 400 when compared to still another example embodiment illustrated in FIGS. 29 and 30.

For example, referring to FIG. 31, the first ball member B1 and the second ball member B2 may each include two balls. That is, unlike still another example embodiment illustrated in FIGS. 29 and 30, the number of the plurality of balls included in the first ball member B1 and the number of the plurality of balls included in the second ball member B2 are the same as each other. In addition, the first ball member B1 and the second ball member B2 may each be in contact with the guide member 300 at two points.

In this case, the guide protrusion 450 may be provided so that the guide member 300 remains in contact with at least one of the base 200 and the housing 400, which are the subjects, at three points.

For example, the guide protrusion 450 may be disposed on the lower surface of the housing 400, facing the lower surface of the guide member 300. The guide protrusion 450 and the guide member 300 may be in point contact or line contact with each other. For example, the guide protrusion 450 may have a spherical or hemispherical shape.

Therefore, the guide member 300 may be in contact with the two balls of the first ball member B1 and the guide protrusion 450 at three points.

When the guide member 300 is moved in the first axial (X axis) direction, the first ball member B1 may roll in the first axial (X axis) direction, and the guide member 300 may be slid relative to the guide protrusion 450.

FIG. 31 illustrates still another example embodiment in which the guide protrusion 450 may be disposed on the lower surface of the housing 400. However, for another example, the guide protrusion 450 may be disposed on the lower surface of the guide member 300.

Figure 35:
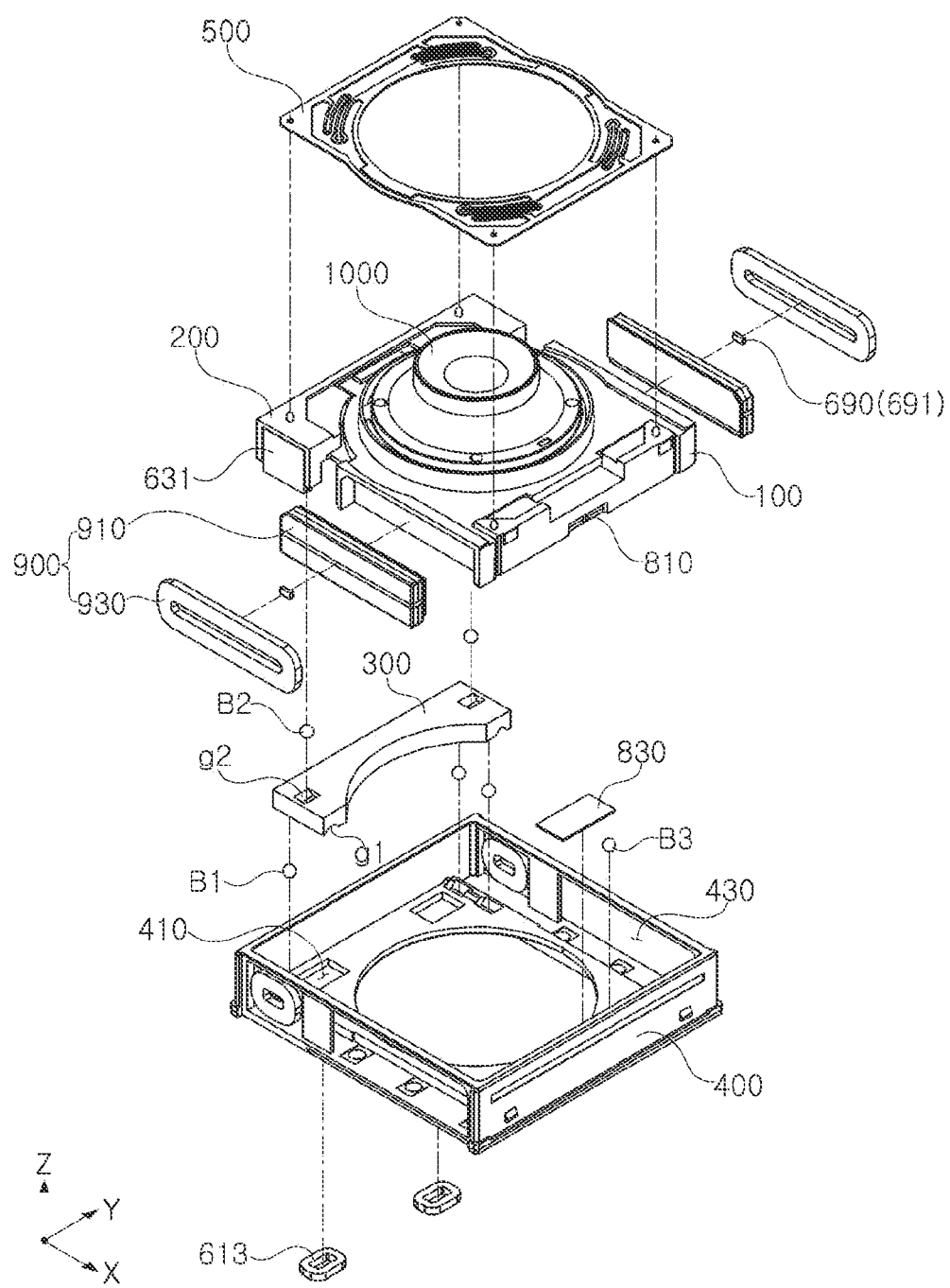
FIG. 35 is an exploded perspective view illustrating the lens module, an elastic member, the base, and the housing.
Figure 36:
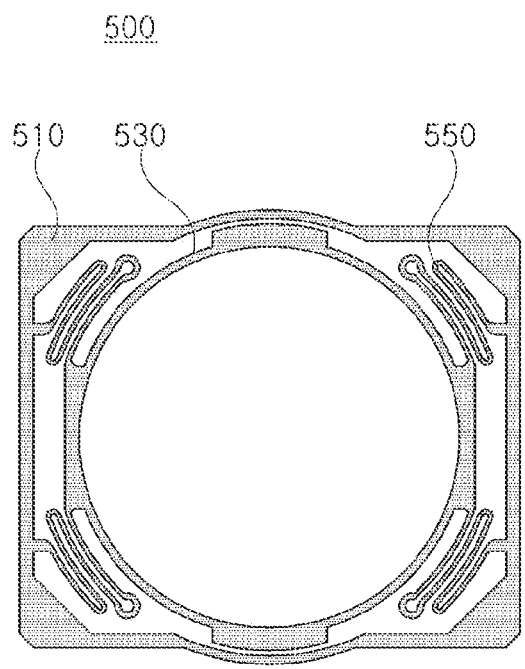
FIG. 36 is a plan view of the elastic member.

FIG. 35 is an exploded perspective view illustrating the lens module, an elastic member, the base, and the housing; and FIG. 36 is a plan view of the elastic member.

One or more examples of the movement of the carrier 100 in the optical axis (Z axis) direction are further described with reference to FIGS. 35 and 36.

The lens module 1000 may be fixedly disposed on the carrier 100, and the carrier 100 may be disposed on the base 200. For example, the carrier 100 and the base 200 may be sequentially stacked in the optical axis (Z axis) direction. While autofocusing is performed, the base 200 may be the fixed member that is not moved in the optical axis (Z axis) direction, and the carrier 100 may be the moving member that is moved in the optical axis (Z axis) direction.

The carrier 100 may be coupled to the base 200 by using the elastic member 500. The elastic member 500 may have one side fixed to the base 200, and the other side fixed to the carrier 100. Accordingly, the carrier 100 may be moved relative to the base 200 in the optical axis (Z axis) direction while being elastically supported by the elastic member 500.

When the carrier 100 is moved, relative to the base 200 in the optical axis (Z axis) direction, the elastic member 500 may be elastically deformed in the optical axis (Z axis) direction to support the movement of the carrier 100. The elastic member 500 may be a leaf spring.

Referring to FIG. 36, the elastic member 500 may include a fixed portion 510, a moving portion 530 and a bent portion 550.

The fixed portion 510 may have the shape of a rectangular frame. The fixed portion 510 may be fixed to the base 200.

The moving portion 530 may be disposed in the fixed portion 510 and may be circular. The moving portion 530 may be fixed to the carrier 100.

The bent portion 550 may connect the fixed portion 510 and the moving portion 530 to each other, and may be bent several times to be extended. For example, the bent portion 550 may be repeatedly extended in a zigzag form to connect the fixed portion 510 and the moving portion 530 to each other.

The bent portion 550 may be elastically deformed as the carrier 100 is moved in the optical axis (Z axis) direction to support the movement of the carrier 100.

Referring to FIG. 35, the actuator 4 may include a second drive unit 900. The second drive unit 900 may generate the driving force in the optical axis (Z axis) direction to move the carrier 100 in the optical axis (Z axis) direction.

The second drive unit 900 may include a third magnet 910 and a third coil 930. The third magnet 910 and the third coil 930 may be disposed to face each other in the direction (e.g., second axial (Y axis) direction) perpendicular to the optical axis (Z axis). The third magnet 910 may include two magnets, and the third coil 930 may also include two coils.

The third magnet 910 may be disposed on the carrier 100. For example, the third magnet 910 may be disposed on each of two side surfaces of the carrier 100.

A third back yoke may be disposed between the carrier 100 and the third magnet 910. The third back yoke may prevent leakage of magnetic flux of the third magnet 910, thereby improving the driving force thereof.

The third magnet 910 may be a polarized magnet magnetized so that the N pole and the S pole are disposed in the optical axis (Z axis) direction. For example, the third magnet 910 may be magnetized so that its surface facing the third coil 930 has both the N pole and the S pole. For example, the N pole, the neutral region, and the S pole may be sequentially positioned on one surface of the third magnet 910, facing the third coil 930, in the optical axis (Z axis) direction. The third magnet 910 may be elongated in the first axial (X axis) direction.

The third coil 930 may be disposed to face the third magnet 910. For example, the third coil 930 may be disposed to face the third magnet 910 in the second axial (Y axis) direction.

The third coil 930 may be disposed on the substrate 670, and the substrate 670 may be mounted on the housing 400 so that the third magnet 910 and the third coil 930 face each other in the second axial (Y axis) direction.

The third coil 930 may be disposed in the second through-hole 430 of the housing 400 while being mounted on the substrate 670. The third coil 930 may be disposed in the second through-hole 430 of the housing 400, thereby preventing the actuator 4 and the camera module C4 from having the increased overall sizes due to a thickness of the third coil 930.

The third magnet 910 may be a moving member mounted on the carrier 100 and moved together with the carrier 100 in the optical axis (Z axis) direction, and the third coil 930 may be a fixed member that is fixed to the substrate 670 and the housing 400.

When power is applied to the third coil 930, the carrier 100 may be moved in the optical axis (Z axis) direction by electromagnetic force generated between the third magnet 910 and the third coil 930.

The lens module 1000 may be disposed on the carrier 100, and the lens module 1000 may also be moved in the optical axis (Z axis) direction by the movement of the carrier 100.

Meanwhile, the actuator 4 may detect a position of the carrier 100 in the optical axis (Z axis) direction.

To this end, the actuator may include a second position sensing unit 690. The second position sensing unit 690 may include a third position sensor 691. The third position sensor 691 may be disposed on the substrate 670 to face the third magnet 910. The third position sensor 691 may be the Hall sensor.

Alternatively, instead of disposing a separate position sensor, the third coil 930 may serve as the second position sensing unit 690.

For example, the position of the carrier 100 may be detected based on change in a level of inductance of the third coil 930.

For example, the third magnet 910 may also be moved as the carrier 100 is moved, and the level of inductance of the third coil 930 may thus be changed. Accordingly, the position of the carrier 100 may be detected based on the change in the level of inductance of the third coil 930.

Figure 37:
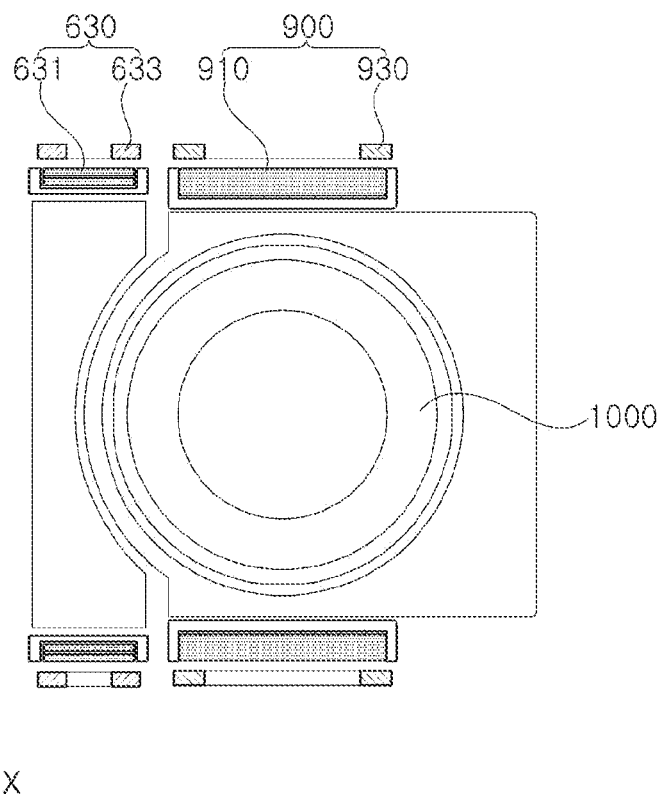
FIG. 37 illustrates a modified example of the shape and position of a second drive unit.
Figure 38:
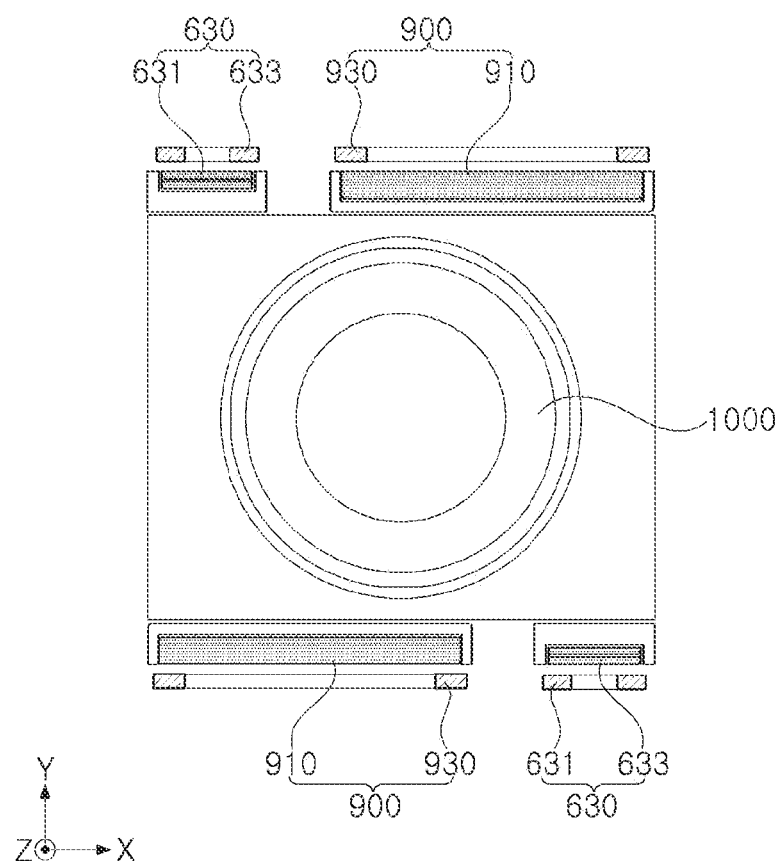
FIG. 38 illustrates a modified example of positions of a second sub drive unit and the second drive unit.

FIG. 37 illustrates a modified example of the shape and position of the second drive unit; and FIG. 38 illustrates a modified example of positions of the second sub drive unit and the second drive unit.

The example illustrated in FIG. 37 is different from still another example embodiment illustrated in FIG. 35 in the shape and position of the second drive unit 900. In addition, the example illustrated in FIG. 38 is different from still another example embodiment illustrated in FIG. 35 in the positions of the second sub drive unit 630 and the second drive unit 900.

First referring to FIG. 35, the second magnet 631 of the second sub drive unit 630 may be disposed on the side surface of the base 200, and the third magnet 910 of the second drive unit 900 may be disposed on a side surface of the carrier 100.

The side surface of the base 200 on which the second magnet 631 is disposed and a side surface of the carrier 100 on which the third magnet 910 is disposed may face the same direction (e.g., second axial (Y axis) direction). For example, the side surface of the base 200 on which the second magnet 631 is disposed and the side surface of the carrier 100 on which the third magnet 910 is disposed may each be a surface extended in the first axial (X axis) direction.

Therefore, a space where the third magnet 910 is disposed may be affected by the second magnet 631, and it may thus be difficult to dispose the third magnet 910 on the center of the side surface of the carrier 100. In this case, the driving force generated by the third magnet 910 and the third coil 930 may be biased to one side of the carrier 100. Here, there may occur a moment in which the rotational force acts on the carrier 100, and the carrier 100 may thus be tilted during its movement.

Therefore, as illustrated in FIG. 37, a size of the third magnet 910 may be reduced and the third magnet 910 may be disposed in the center of the carrier 100, thereby preventing the moment of the rotational force from occurring. The third magnet 910 may include two magnets disposed on both the side surfaces of the carrier 100, thereby securing sufficient driving force necessary for performing autofocusing.

Referring to FIG. 38, the two third magnets 910 may be disposed spaced apart from each other in a diagonal direction of the carrier 100, and two second magnets 631 may also be disposed spaced apart from each other in the diagonal direction of the base 200.

For example, when viewed from the optical axis (Z axis) direction, one second magnet 631 may be disposed opposite one third magnet 910 in the second axial (Y axis) direction, and the other second magnet 631 may be disposed opposite the other third magnet 910 in the second axial (Y axis) direction.

When the magnets are disposed in this manner, it is possible to prevent the moment in which the rotational force acts on the carrier 100 from occurring even though the third magnet 910 is elongated in the first axial (X axis) direction.

Figure 39:
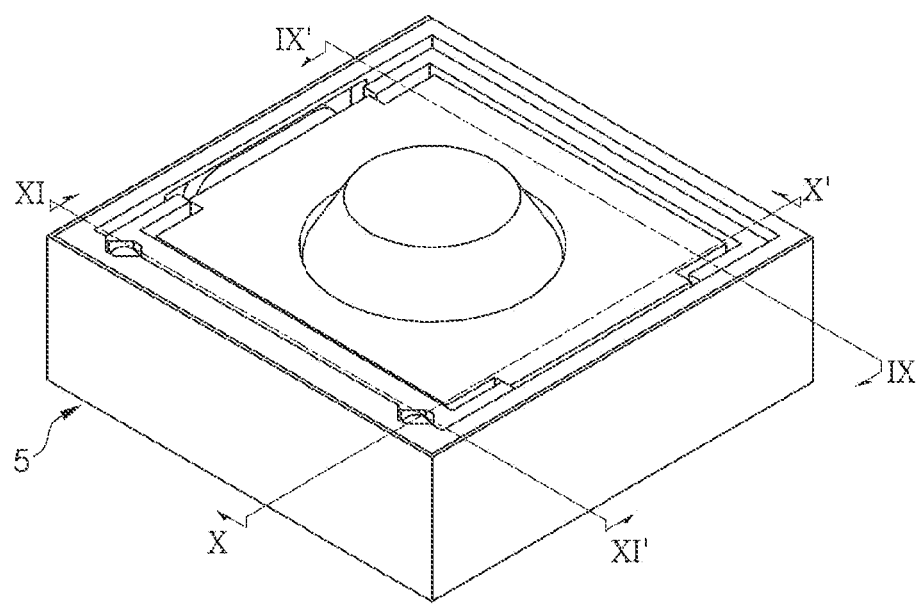
FIG. 39 is a perspective view of a camera module according to yet still another example embodiment of the present disclosure.
Figure 40:
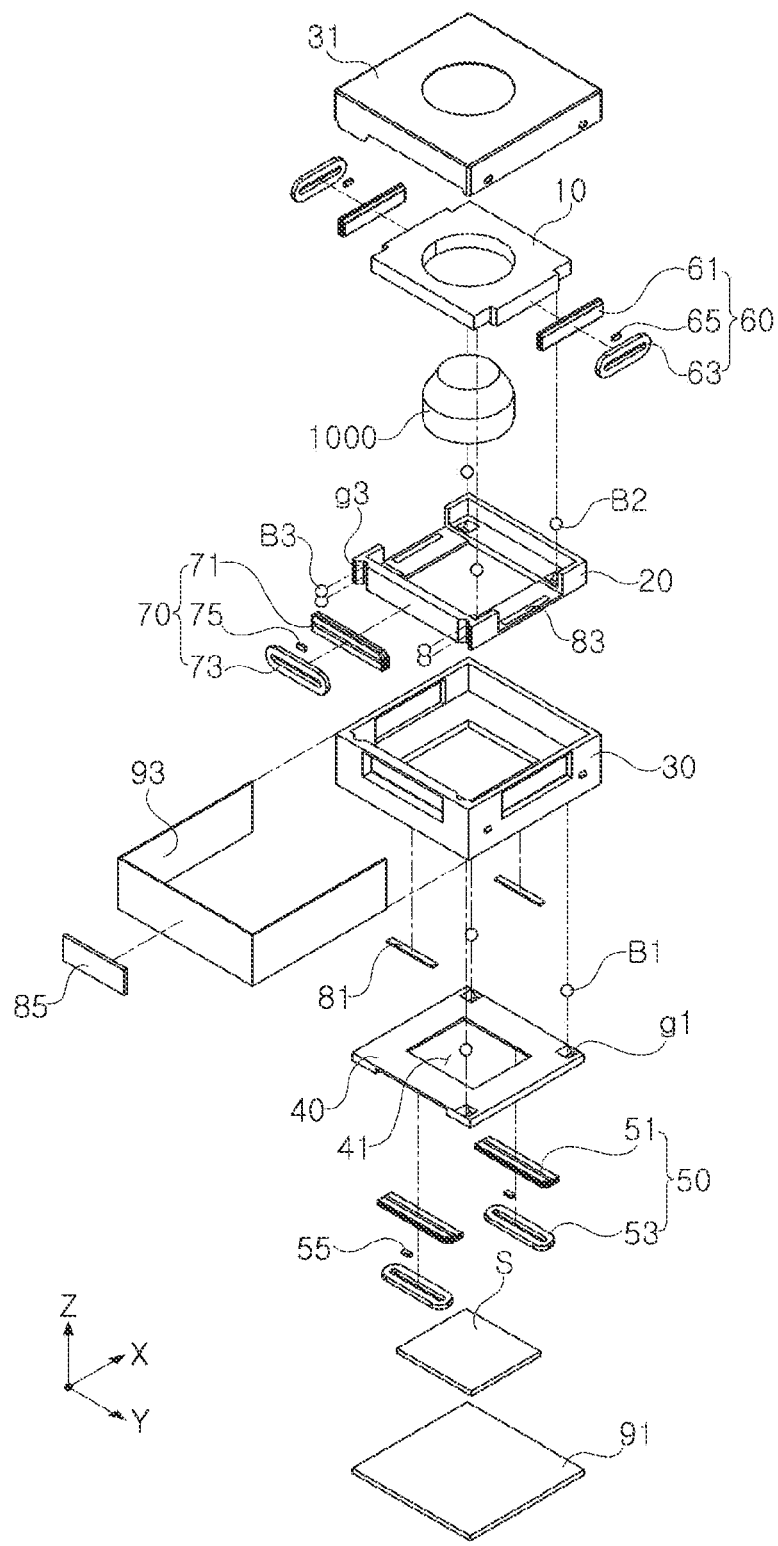
FIG. 40 is a schematic exploded perspective view of the camera module according to yet still another example embodiment of the present disclosure.

FIG. 39 is a perspective view of a camera module according to yet still another example embodiment of the present disclosure; and FIG. 40 is a schematic exploded perspective view of the camera module according to yet still another example embodiment of the present disclosure.

Referring to FIGS. 39 and 40, a camera module C5 according to yet still another example embodiment of the present disclosure may include the lens module 1000 and an actuator 5.

The lens module 1000 may include the at least one lens L and the lens barrel 1100. The at least one lens L may be disposed in the lens barrel 1100. When the lens module 1000 includes the plurality of lenses L, the plurality of lenses L may be mounted in the lens barrel 1100 along the optical axis (Z axis).

The at least one lens L and the lens barrel 1100 may each have the structure described with reference to FIGS. 4 and 5.

In this example embodiment, the lens module 1000 may be the moving member which is moved while the autofocusing (AF) and optical image stabilization (OIS) are performed. For example, autofocusing may be performed by moving the lens module 1000 in the optical axis (Z axis) direction, or the optical image may be stabilized by moving the lens module 1000 in the direction perpendicular to the optical axis (Z axis).

In addition, the lens module 1000 may be a fixed member that is not moved when the driving force is generated in another direction perpendicular to the optical axis (Z axis). For example, the image sensor S may be moved to perform optical image stabilization (OIS) when the driving force is generated in another direction which is perpendicular to the optical axis (Z axis).

That is, in this example embodiment, when moved in one of the two axial movements required for the image stabilization, the image sensor S rather than the lens module 1000 may be moved. Therefore, the image stabilization may be performed by the smaller driving force, and the components included in the actuator 5 may be made smaller.

The actuator 5 may include a lens holder 10, a carrier 20, a housing 30 and a guide member 40.

The housing 30 may have a shape of a square box having an open top and bottom. The housing 30 may be a fixed member that is not moved while autofocusing and the image stabilization are performed.

The guide member 40 may be disposed on a bottom portion of the housing 30, and the image sensor S may be disposed on the guide member 40.

The guide member 40 may be moved in any one direction (e.g., first axial (X axis) direction) perpendicular to the optical axis (Z axis). That is, the guide member 40 may be moved relative to the housing 30.

The image sensor S may be disposed on the guide member 40, and the guide member 40 may be moved together with the image sensor S to perform the image stabilization.

The lens module 1000 may be coupled to the lens holder 10. The lens holder 10 may be disposed in the carrier 20, and the carrier 20 may be disposed in the housing 30.

The carrier 20 may be moved in the optical axis (Z axis) direction. That is, the carrier 20 may be moved in the housing 30 in the optical axis (Z axis) direction.

The lens holder 10 may be disposed in the carrier 20, and the lens holder 10 may thus also be moved along with the carrier 20 in the optical axis (Z axis) direction, thereby performing autofocusing.

The lens holder 10 may be moved in the carrier 20 in another direction (e.g., second axial (Y axis) direction) perpendicular to the optical axis (Z axis). That is, the lens holder 10 may be a moving member that is moved in the optical axis (Z axis) direction while autofocusing is performed, and may be a moving member that is moved in one direction perpendicular to the optical axis (Z axis) even while the image stabilization is performed.

The first axial (X axis) direction may indicate the direction perpendicular to the optical axis (Z axis), and the second axial (Y axis) direction may indicate the direction perpendicular to both the optical axis (Z axis) direction and the first axial (X axis) direction.

The first ball member B1 may be disposed between the guide member 40 and the housing 30, and the second ball member B2 may be disposed between the carrier 20 and the lens holder 10.

The first ball member B1 may be disposed in contact with each of the guide member 40 and the housing 30, and the second ball member B2 may be disposed in contact with each of the carrier 20 and the lens holder 10.

When the guide member 40 is moved relative to the housing 30 in the direction perpendicular to the optical axis (Z axis), the first ball member B1 may roll in the direction perpendicular to the optical axis (Z axis) to support the movement of the guide member 40.

When the lens holder 10 is moved relative to the carrier 20 in the direction perpendicular to the optical axis (Z axis), the second ball member B2 may roll in the direction perpendicular to the optical axis (Z axis) to support the movement of the lens holder 10.

The third ball member B3 may be disposed between the carrier 20 and the housing 30. The third ball member B3 may be disposed in contact with each of the carrier 20 and the housing 30.

When the carrier 20 is moved in a direction relative to the housing 30 in the optical axis (Z axis) direction, the third ball member B3 may roll in the optical axis (Z axis) direction to support the movement of the carrier 20.

Figure 41:
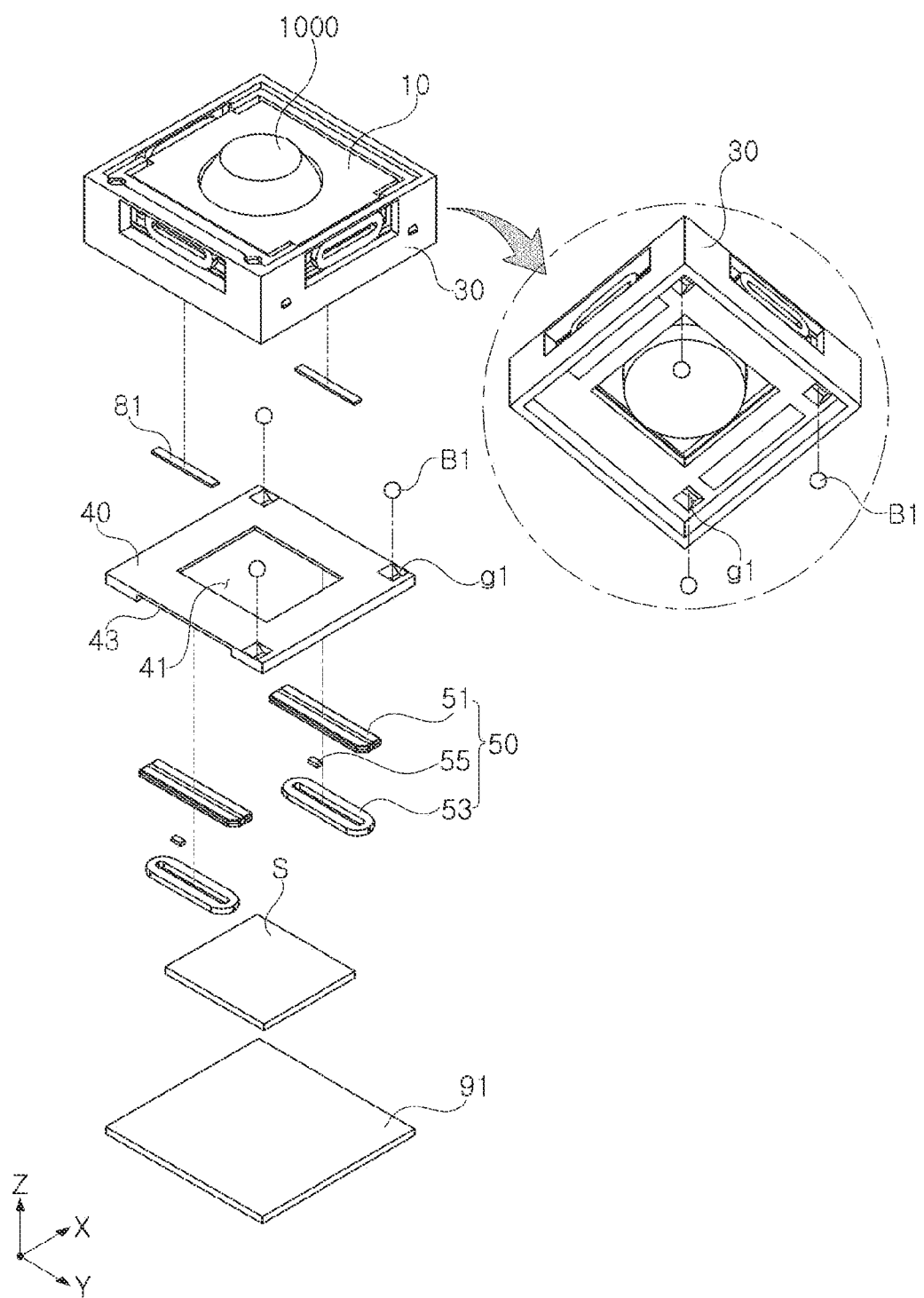
FIG. 41 is a perspective view illustrating that the guide member, the first drive unit, the image sensor, and the substrate are exploded in the camera module according to yet still another example embodiment of the present disclosure.

FIG. 41 is a perspective view illustrating that the guide member, the first drive unit, the image sensor and the substrate are exploded in the camera module according to yet still another example embodiment of the present disclosure.

One or more examples of the movement of the guide member 40 in the direction perpendicular to the optical axis (Z axis) are further described with reference to FIG. 41.

The guide member 40 may be disposed on the bottom portion of the housing 30.

The guide member 40 may have the shape of a rectangular frame, and a passage hole 41 may be formed in its center. The image sensor S may be mounted on the guide member 40, and light passing through the lens module 1000 may pass through the passage hole 41 to be received by the image sensor S.

The guide member 40 may be disposed on the bottom portion of the housing 30, and it may be desired to reduce a thickness of the guide member 40 to reduce a height of the actuator 5 in the optical axis (Z axis) direction.

However, when having the reduced thickness, the guide member 40 may have weaker rigidity to have lower reliability against the external impact, etc.

Therefore, the guide member 40 may include a reinforcing plate to have reinforced rigidity.

For example, the reinforcing plate may be insert-injected to be integrally coupled to the guide member 40. In this case, the reinforcing plate may be manufactured to be integrated with the guide member 40 by injecting a resin material into a mold in a state where the reinforcing plate is fixed in the mold.

The reinforcing plate may be disposed in the guide member 40. In addition, the reinforcing plate may be disposed to be partially exposed outwardly from the guide member 40. In this manner, the reinforcing plate may be partially exposed outwardly from the guide member 40 while being integrally formed in the guide member 40, which may improve a bonding force between the reinforcing plate and the guide member 40, and prevent the reinforcing plate from being separated from the guide member 40.

Meanwhile, the reinforcing plate may be the non-magnetic metal lest the reinforcing plate affects a magnetic field of a first drive unit 50 described below.

The guide member 40 may be moved in the first axial (X axis) direction.

The image sensor S may be disposed on the guide member 40, and the guide member 40 may be moved together with the image sensor S in the first axial (X axis) direction.

The actuator 5 may include the first drive unit 50. The first drive unit 50 may generate the driving force in the direction (e.g., first axial (X axis) direction) perpendicular to the optical axis (Z axis) to move the guide member 40 in the direction perpendicular to the optical axis (Z axis).

The first drive unit 50 may include a first magnet 51 and a first coil 53. The first magnet 51 and the first coil 53 may be disposed opposing each other in the optical axis (Z axis) direction.

The first magnet 51 may include two magnets, and the first coil 53 may include two coils.

The first magnet 51 may be disposed on the guide member 40. For example, the first magnet 51 may be disposed on a lower surface of the guide member 40. A mounting groove 43 in which the first magnet 51 is disposed may be positioned in the lower surface of the guide member 40. The first magnet 51 may be inserted into the mounting groove 43, thereby preventing the actuator 5 and the camera module C5 from having increased overall heights due to a thickness of the first magnet 51.

The first back yoke may be disposed between the guide member 40 and the first magnet 51. The first back yoke may prevent leakage of magnetic flux of the first magnet 51, thereby improving the driving force thereof.

The first magnet 51 may be magnetized so that one surface (e.g., surface facing the first coil 53) thereof has both the N pole and the S pole. For example, the N pole, the neutral region, and the S pole may be sequentially positioned on the one surface of the first magnet 51, facing the first coil 53, in the first axial (X axis) direction. The first magnet 51 may be elongated in the second axial (Y axis) direction.

The other surface (e.g., surface opposite to the one surface) of the first magnet 51 may be magnetized to have both the S pole and the N pole. For example, the S pole, the neutral region, and the N pole may be sequentially positioned on the other surface of the first magnet 51 along the first axial (X axis) direction.

The first coil 53 may be disposed to face the first magnet 51. For example, the first coil 53 may be disposed to face the first magnet 51 in the optical axis (Z axis) direction. The first coil 53 may have the hollow donut shape, and may be elongated in the second axial (Y axis) direction.

The first coil 53 may be disposed on a first substrate 91. The first substrate 91 may be mounted on the housing 30 so that the first magnet 51 and the first coil 53 face each other in the optical axis (Z axis) direction.

The first magnet 51 may be a moving member mounted on the guide member 40 and moved together with the guide member 40, and the first coil 53 may be a fixed member fixed to the first substrate 91 and the housing 30.

When power is applied to the first coil 53, the guide member 40 may be moved in the first axial (X axis) direction by electromagnetic force generated between the first magnet 51 and the first coil 53.

As illustrated in FIG. 41, the first coil 53 may be a wound coil and mounted on the first substrate 91. For another example, the first coil 53 may be copper foil patterns stacked and embedded in the first substrate 91.

The first ball member B1 may be disposed between the guide member 40 and the housing 30.

The first ball member B1 may be disposed in contact with each of the guide member 40 and the housing 30.

The first ball member B1 may serve to guide the movement of the guide member 40 while the image stabilization is performed. In addition, the first ball member B1 may also serve to keep a gap between the guide member 40 and the housing 30.

The first ball member B1 may guide the movement of the guide member 40 in the first axial (X axis) direction. For example, the first ball member B1 may roll in the first axial (X axis) direction when the driving force is generated in the first axial (X axis) direction. Accordingly, the first ball member B1 may guide the movement of the guide member 40 in the first axial (X axis) direction.

The first ball member B1 may include a plurality of balls disposed between the guide member 40 and the housing 30.

Referring to FIG. 41, the first guide groove g1 in which the first ball member B1 is disposed may be positioned in at least one of the surfaces of the guide member 40 and the housing 30, the surfaces facing each other in the optical axis (Z axis) direction. The plurality of first guide grooves g1 may be positioned to correspond to the plurality of balls included in the first ball member B1.

The first ball member B1 may be disposed in the first guide groove g1 and inserted between the guide member 40 and the housing 30.

When accommodated in the first guide groove g1, the first ball member B1 may be restricted from being moved in the optical axis (Z axis) direction or the second axial (Y axis) direction, and may be moved only in the first axial (X axis) direction. For example, the first ball member B1 may roll only in the first axial (X axis) direction.

To this end, the first guide groove g1 may be elongated in the first axial (X axis) direction.

Meanwhile, the actuator 5 may include a first yoke unit 81. The first yoke unit 81 may provide pressing force to keep the guide member 40 and the housing 30 in contact with the first ball member B1.

The first yoke unit 81 may be disposed on the housing 30. For example, the first yoke unit 81 may be disposed on a lower surface of the housing 30. The first yoke unit 81 may include two yokes.

The first yoke unit 81 may be disposed to face the first magnet 51 in the optical axis (Z axis) direction.

Accordingly, the attractive force may act between the first yoke unit 81 and the first magnet 51 in the optical axis (Z axis) direction.

Therefore, the guide member 40 may be pressed in a direction toward the first yoke unit 81, the guide member 40 and the housing 30 may thus remain in contact with the first ball member B1.

The first yoke unit 81 may be made of a material which may generate the attractive force between the first magnet 51 and the first magnet 51. For example, the first yoke unit 81 may be made of the magnetic material.

Figure 42:
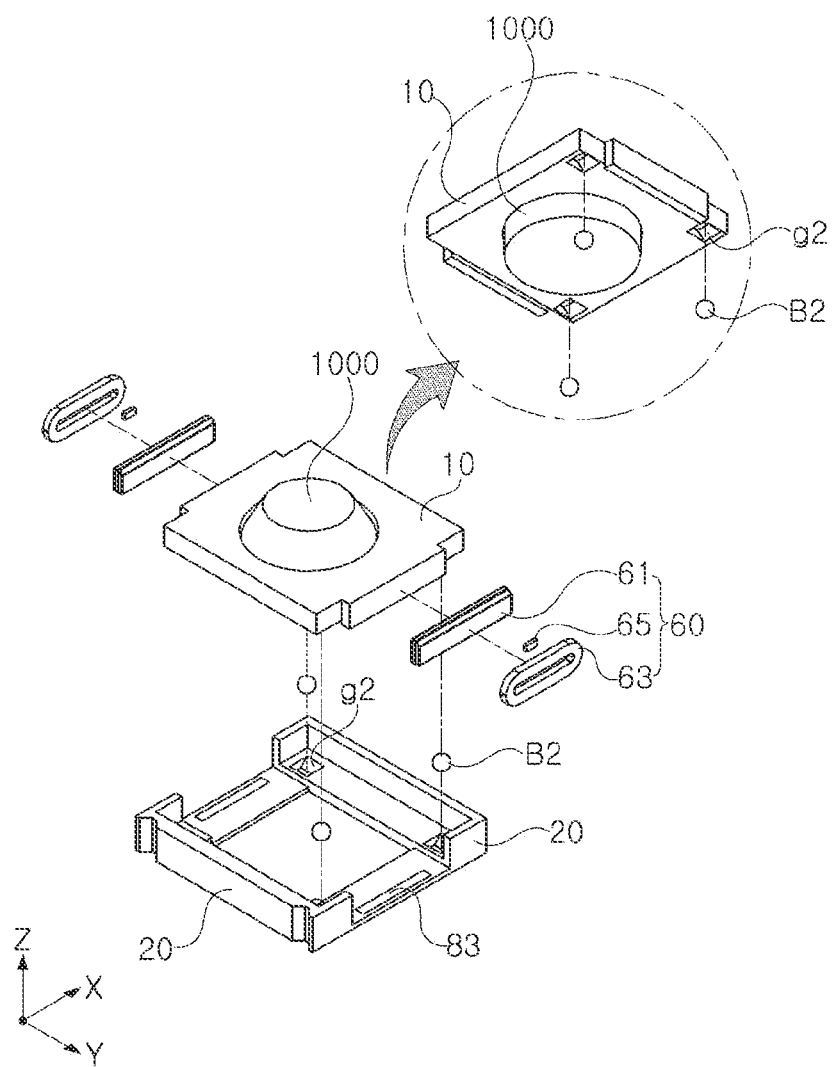
FIG. 42 is an exploded perspective view of the lens module, the lens holder, and the carrier.

FIG. 42 is an exploded perspective view of the lens module, the lens holder, and the carrier.

One or more examples of the movement of the lens holder 10 in the direction perpendicular to the optical axis (Z axis) will be further described with reference to FIG. 42.

The lens module 1000 may be coupled to the lens holder 10, and the lens holder 10 may be disposed in the carrier 20.

The lens holder 10 may be moved in the second axial (Y axis) direction.

The lens module 1000 may be disposed on the lens holder 10, and the lens holder 10 may be moved together with the lens module 1000 in the second axial (Y axis) direction.

The actuator 5 may include a second drive unit 60. The second drive unit 60 may generate the driving force in the direction (e.g., second axial (Y axis) direction) perpendicular to the optical axis (Z axis) to move the lens holder 10 in the direction perpendicular to the optical axis (Z axis).

The second drive unit 60 may include a second magnet 61 and a second coil 63. The second magnet 61 and the second coil 63 may be disposed to face each other in the direction (e.g., second axial (Y axis) direction) perpendicular to the optical axis (Z axis).

The second magnet 61 may include two magnets, and the second coil 63 may include two coils.

The second magnet 61 may be disposed on the lens holder 10. For example, the second magnet 61 may be disposed on a side surface of the lens holder 10.

The second back yoke may be disposed between the side surface of the lens holder 10 and the second magnet 61. The second back yoke may prevent leakage of magnetic flux of the second magnet 61, thereby improving the driving force thereof.

The second magnet 61 may be magnetized so that one surface (e.g., surface facing the second coil 63) thereof has the N pole or the S pole. For example, the one surface of the second magnet 61 facing the second coil 63 may have the S pole, and the other surface (e.g., side facing the side surface of the lens holder 10) of the second magnet 61 may have the N pole. The N and S poles may also be magnetized by being disposed in reverse order. The N and S poles may have the neutral region therebetween. The second magnet 61 may be elongated in the first axial (X axis) direction.

The second coil 63 may be disposed to face the second magnet 61. For example, the second coil 63 may be disposed to face the second magnet 61 in the second axial (Y axis) direction. The second coil 63 may have the hollow donut shape, and may be elongated in the first axial (X axis) direction.

The second coil 63 may be disposed on a second substrate 93. The second substrate 93 may be mounted on the housing 30 so that the second magnet 61 and the second coil 63 face each other in the second axial (Y axis) direction.

The second substrate 93 may have a shape of a 'E' shaped plane, and may be mounted on three side surfaces of the housing 30.

The second magnet 61 may be a moving member mounted on the lens holder 10 and moved together with the lens holder 10, and the second coil 63 may be a fixed member fixed to the second substrate 93 and the housing 30.

When power is applied to the second coil 63, the lens holder 10 may be moved in the second axial (Y axis) direction by electromagnetic force generated between the second magnet 61 and the second coil 63.

As illustrated in FIG. 42, the second coil 63 may be a wound coil and mounted on the second substrate 93. For another example, the second coil 63 may be copper foil patterns stacked and embedded in the second substrate 93.

The second ball member B2 may be disposed between the lens holder 10 and the carrier 20.

The second ball member B2 may be disposed in contact with each of the lens holder 10 and the carrier 20.

The second ball member B2 may serve to guide the movement of the lens holder 10 while the image stabilization is performed. In addition, the second ball member B2 may also serve to keep a gap between the lens holder 10 and the carrier 20.

The second ball member B2 may guide the movement of the lens holder 10 in the second axial (Y axis) direction. For example, the second ball member B2 may roll in the second axial (Y axis) direction when the driving force is generated in the second axial (Y axis) direction. Accordingly, the second ball member B2 may guide the movement of the lens holder 10 in the second axial (Y axis) direction.

The second ball member B2 may include a plurality of balls disposed between the lens holder 10 and the carrier 20.

Referring to FIG. 42, the second guide groove g2 in which the second ball member B2 is disposed may be positioned in at least one of the surfaces of the lens holder 10 and the carrier 20, the surfaces facing each other in the optical axis (Z axis) direction. The plurality of second guide grooves g2 may be positioned to correspond to the plurality of balls included in the second ball member B2.

The second ball member B2 may be disposed in the second guide groove g2 and inserted between the lens holder 10 and the carrier 20.

When accommodated in the second guide groove g2, the second ball member B2 may be restricted from being moved in the optical axis (Z axis) direction or the first axial (X axis) direction, and may be moved only in the second axial (Y axis) direction. For example, the second ball member B2 may roll only in the second axial (Y axis) direction.

To this end, the second guide groove g2 may be elongated in the second axial (Y axis) direction.

The actuator 5 may include a second yoke unit 83. The second yoke unit 83 may provide pressing force to keep the lens holder 10 and the carrier 20 in contact with the second ball member B2.

The second yoke unit 83 may be disposed on the carrier 20. For example, the second yoke unit 83 may be disposed on a bottom surface of the carrier 20. The second yoke unit 83 may include two yokes.

The second yoke unit 83 may be disposed to face the second magnet 61 in the optical axis (Z axis) direction.

Accordingly, the attractive force may act between the second yoke unit 83 and the second magnet 61 in the optical axis (Z axis) direction.

Therefore, the lens holder 10 may be pressed in a direction toward the second yoke unit 83, the lens holder 10 and the carrier 20 may thus remain in contact with the second ball member B2.

The second yoke unit 83 may be made of a material which may generate the attractive force between the second yoke unit 83 and the second magnet 61. For example, the second yoke unit 83 may be made of the magnetic material.

The first magnet 51 and the second magnet 61 may be disposed perpendicular to each other based on the plane perpendicular to the optical axis (Z axis), and the first coil 53 and the second coil 63 may also be disposed perpendicular to each other based on the plane perpendicular to the optical axis (Z axis).

The actuator 5 may detect positions of the guide member 40 and the lens holder 10 in the direction perpendicular to the optical axis (Z axis).

To this end, the actuator may include a first position sensing unit 55 and a second position sensing unit 65 (see FIGS. 40 through 42). The first position sensing unit 55 may be disposed on the first substrate 91 to face the first magnet 51, and the second position sensing unit 65 may be disposed on the second substrate 93 to face the second magnet 61. The first position sensing unit 55 and the second position sensing unit 65 may be the Hall sensors.

Meanwhile, for another example, the actuator may not include a separate Hall sensor. In this case, the first coil 53 and the second coil 63 may respectively serve as the first position sensing unit 55 and the second position sensing unit 65.

For example, the positions of the guide member 40 and the lens holder 10 may be detected based on a change in inductances of the first coil 53 and the second coil 63.

For example, the first magnet 51 and the second magnet 61 may also be moved as the guide member 40 and the lens holder 10 are moved, and the levels of inductance of the first coil 53 and the second coil 63 may thus be changed. Accordingly, the positions of the guide member 40 and the lens holder 10 may be detected based on the change in the levels of inductance of the first coil 53 and the second coil 63.

Figure 43:
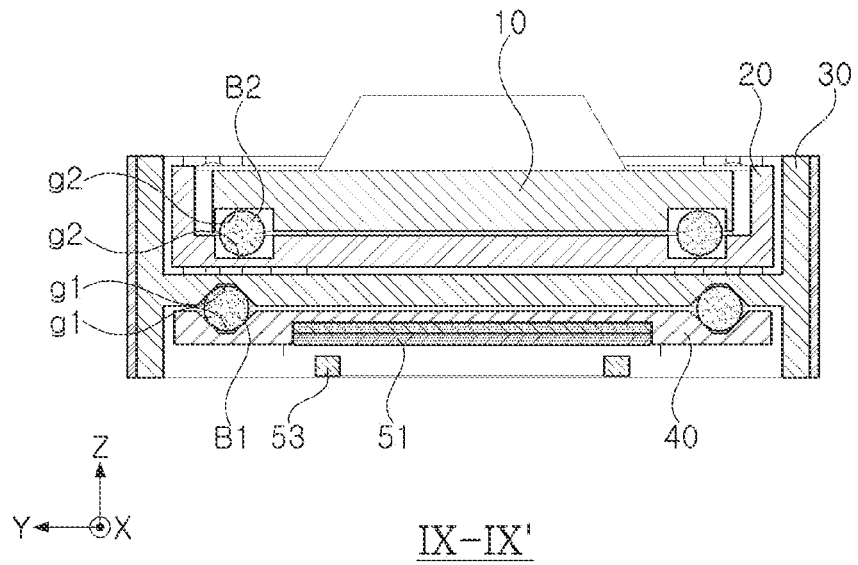
FIG. 43 is a cross-sectional view taken along line IX-IX' of FIG. 39.
Figure 44:
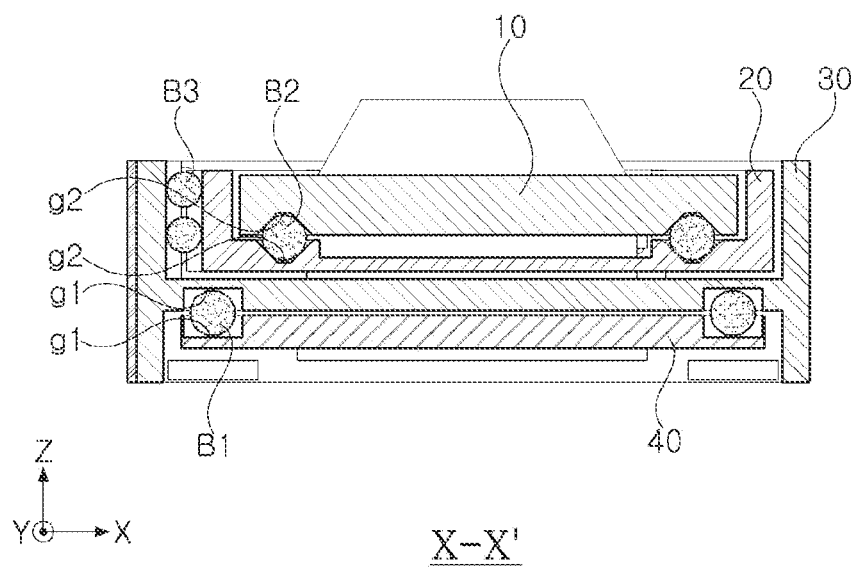
FIG. 44 is a cross-sectional view taken along line X-X' of FIG. 39.

FIG. 43 is a cross-sectional view taken along line IX-IX' of FIG. 39; and FIG. 44 is a cross-sectional view taken along line X-X' of FIG. 39.

As illustrated in FIG. 43, when the driving force is generated in the first axial (X axis) direction, the guide member 40 may be moved in the first axial (X axis) direction.

Here, the first ball member B1 disposed between the guide member 40 and the housing 30 may roll along the first axis (X axis).

As illustrated in FIG. 44, when the driving force is generated in the second axial (Y axis) direction, the lens holder 10 may be moved in the second axial (Y axis) direction.

Here, the second ball member B2 disposed between the lens holder 10 and the carrier 20 may roll along the second axis (Y axis).

The guide member 40 may be moved in the first axial (X axis) direction, and the lens holder 10 may be moved in the second axial (Y axis) direction.

A buffer member having elasticity may be disposed on at least one of the surfaces of the guide member 40 and the housing 30, the surfaces facing each other in the direction perpendicular to the optical axis (Z axis). The buffer member may be disposed on a side surface of the guide member 40.

In addition, the buffer member having elasticity may be disposed on at least one of the surfaces of the lens holder 10 and the carrier 20, the surfaces facing each other in the direction perpendicular to the optical axis (Z axis). The buffer member may be disposed on the side surface of the lens holder 10.

For example, a configuration of the first buffer member d1 described with reference to FIGS. 10 and 11 may be provided in the guide member 40 and the lens holder 10.

Therefore, the buffer member may reduce impact and noise occurring when the guide member 40 and the housing 30 collide with each other, or the lens holder 10 and the carrier 20 collide with each other.

Figure 45:
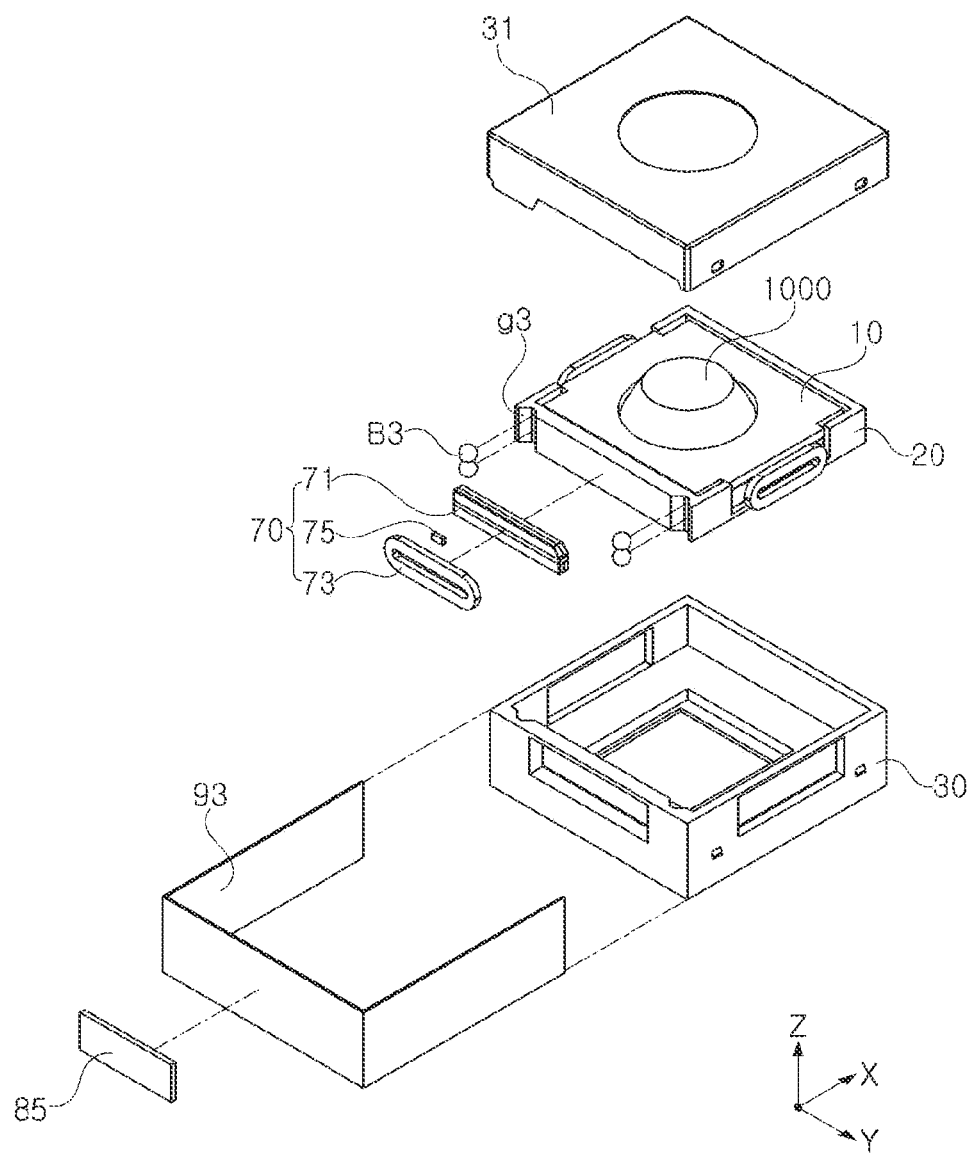
FIG. 45 is a perspective view illustrating that the housing and a third drive unit are exploded in the camera module according to yet still another example embodiment of the present disclosure.
Figure 46:
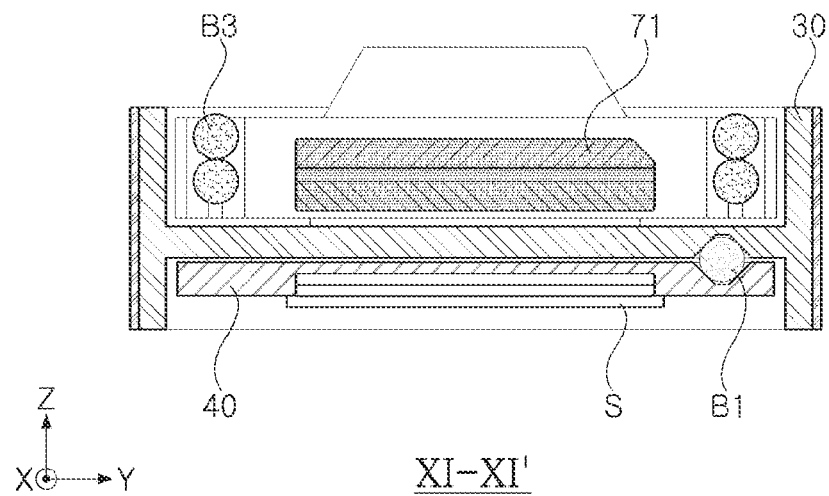
FIG. 46 is a cross-sectional view taken along line XI-XI' of FIG. 39.

FIG. 45 is a perspective view illustrating that the housing and a third drive unit are exploded in the camera module according to yet still another example embodiment of the present disclosure; and FIG. 46 is a cross-sectional view taken along line XI-XI' of FIG. 39.

One or more examples of the movement of the carrier 20 in the optical axis (Z axis) direction will be further described with reference to FIGS. 45 and 46.

The lens module 1000 may be coupled to the lens holder 10, and the lens holder 10 may be disposed in the carrier 20. In addition, the carrier 20 may be disposed in the housing 30.

The carrier 20 may be moved in the housing 30 in the optical axis (Z axis) direction.

The lens module 1000 and the lens holder 10 may be disposed on the carrier 20, and the carrier 20 may be moved together with the lens module 1000 and the lens holder 10 in the optical axis (Z axis) direction.

The actuator 5 may include a third drive unit 70. The third drive unit 70 may generate the driving force in the optical axis (Z axis) direction to move the carrier 20 in the optical axis (Z axis) direction.

The third drive unit 70 may include a third magnet 71 and a third coil 73. The third magnet 71 and the third coil 73 may be disposed opposing each other in the direction (e.g., first axial (X axis) direction) perpendicular to the optical axis (Z axis).

The third magnet 71 may be disposed on the carrier 20. For example, the third magnet 71 may be disposed on a side surface of the carrier 20.

The third back yoke may be disposed between the side surface of the carrier 20 and the third magnet 71. The third back yoke may prevent leakage of magnetic flux of the third magnet 71, thereby improving the driving force thereof.

The third magnet 71 may be magnetized so that one surface (e.g., surface facing the third coil 73) thereof has both the N pole and the S pole. For example, the N pole, the neutral region, and the S pole may be sequentially positioned on the one surface of the third magnet 71, facing the third coil 73, in the optical axis (Z axis) direction. The third magnet 71 may be elongated in the second axial (Y axis) direction.

The other surface (e.g., surface opposite to the one surface) of the third magnet 71 may be magnetized to have both the S pole and the N pole. For example, the S pole, the neutral region, and the N pole may be sequentially positioned on the other surface of the third magnet 71 along the optical axis (Z axis) direction.

The third coil 73 may be disposed to face the third magnet 71. For example, the third coil 73 may be disposed to face the third magnet 71 in the first axial (X axis) direction. The third coil 73 may have the hollow donut shape, and may be elongated in the second axial (Y axis) direction.

The third coil 73 may be disposed on the second substrate 93. The second substrate 93 may be mounted on the housing 30 so that the third magnet 71 and the third coil 73 face each other in the first axial (X axis) direction.

The third magnet 71 may be a moving member mounted on the carrier 20 and moved together with the carrier 20, and the third coil 73 may be a fixed member fixed to the second substrate 93 and the housing 30.

When power is applied to the third coil 73, the carrier 20 may be moved in the optical axis (Z axis) direction by electromagnetic force generated between the third magnet 71 and the third coil 73.

As illustrated in FIG. 45, the third coil 73 may be a wound coil and mounted on the second substrate 93. For another example, the third coil 73 may be copper foil patterns stacked and embedded in the second substrate 93.

The third ball member B3 may be disposed between the carrier 20 and the housing 30.

The third ball member B3 may be disposed in contact with each of the carrier 20 and the housing 30.

The third ball member B3 may serve to guide the movement of the carrier 20 while autofocusing is performed. In addition, the third ball member B3 may also serve to keep a gap between the carrier 20 and the housing 30.

The third ball member B3 may guide the movement of the carrier 20 in the optical axis (Z axis) direction. For example, the third ball member B3 may roll in the optical axis (Z axis) direction when the driving force is generated in the optical axis (Z axis) direction. Accordingly, the third ball member B3 may guide the movement of the carrier 20 in the optical axis (Z axis) direction.

The third ball member B3 may include a plurality of balls disposed between the carrier 20 and the housing 30.

Referring to FIG. 45, the third guide groove g3 in which the third ball member B3 is disposed may be positioned in at least one of the surfaces of the carrier 20 and the housing 30, the surfaces facing each other in the first axial (X axis) direction. The plurality of third guide grooves g3 may be positioned to correspond to the plurality of balls included in the third ball member B3.

The third ball member B3 may be disposed in the third guide groove g3 and inserted between the carrier 20 and the housing 30.

The third guide groove g3 may be elongated in the optical axis (Z axis) direction.

The actuator 5 may include a third yoke unit 85. The third yoke unit 85 may provide pressing force to keep the carrier 20 and housing 30 in contact with the third ball member B3.

The third yoke unit 85 may be disposed on the second substrate 93. For example, the third coil 73 may be disposed on one surface of the second substrate 93, and the third yoke unit 85 may be disposed on the other surface of the second substrate 93.

The third yoke unit 85 may be disposed to face the third magnet 71 in the first axial (X axis) direction.

Accordingly, the attractive force may act between the third yoke unit 85 and the third magnet 71 in the first axial (X axis) direction.

Therefore, the carrier 20 may be pressed in a direction toward the third yoke unit 85, the carrier 20 and the housing 30 may thus remain in contact with the third ball member B3.

The third yoke unit 85 may be made of a material which may generate the attractive force between the third yoke unit 85 and the third magnet 71. For example, the third yoke unit 85 may be made of the magnetic material.

The number of the plurality of balls included in the third ball member B3, the shape of the third guide groove g3, the configuration in which the center point CP of the attractive force is disposed in the support region "A," and the like are the same as those in the structure described with reference to FIGS. 12, 13A, 13B, 14, and 18.

The actuator 5 may detect a position of the carrier 20 in the direction of the optical axis (Z axis).

To this end, the actuator may include a third position sensing unit 75. The third position sensing unit 75 may be disposed on the second substrate 93 to face the third magnet 71. The third position sensing unit 75 may be the Hall sensor.

For another example, the third position sensing unit 75 may include a sensing yoke and a sensing coil. The sensing coil may include two coils disposed in the optical axis (Z axis) direction. The two coils may be disposed to face the sensing yoke. The sensing yoke may be disposed on the carrier 20, and may be the magnetic material and/or the conductor.

However, the actuator may not include a separate sensing yoke, and in this case, the sensing coil may be disposed to face the third magnet 71.

Therefore, the position of the carrier 20 may be detected based on change in the level of inductance of the sensing coil.

For example, the sensing yoke may also be moved as the carrier 20 is moved, and the level of inductance of the sensing coil may thus be changed. Therefore, the position of the carrier 20 may be detected based on the change in the level of inductance of the sensing coil.

The actuator 5 may include a cover 31. The cover 31 may be hooked with the housing 30.

The cover 31 may be coupled to the housing 30 to cover at least a portion of an upper surface of the lens holder 10.

Therefore, the cover 31 may serve as a stopper to prevent the lens holder 10 from being separated externally from the actuator.

In addition, the cover 31 may be disposed to prevent the third ball member B3 from being separated from the actuator. That is, the cover 31 may cover an upper portion of a region where the third ball member B3 is positioned.

Figure 47:
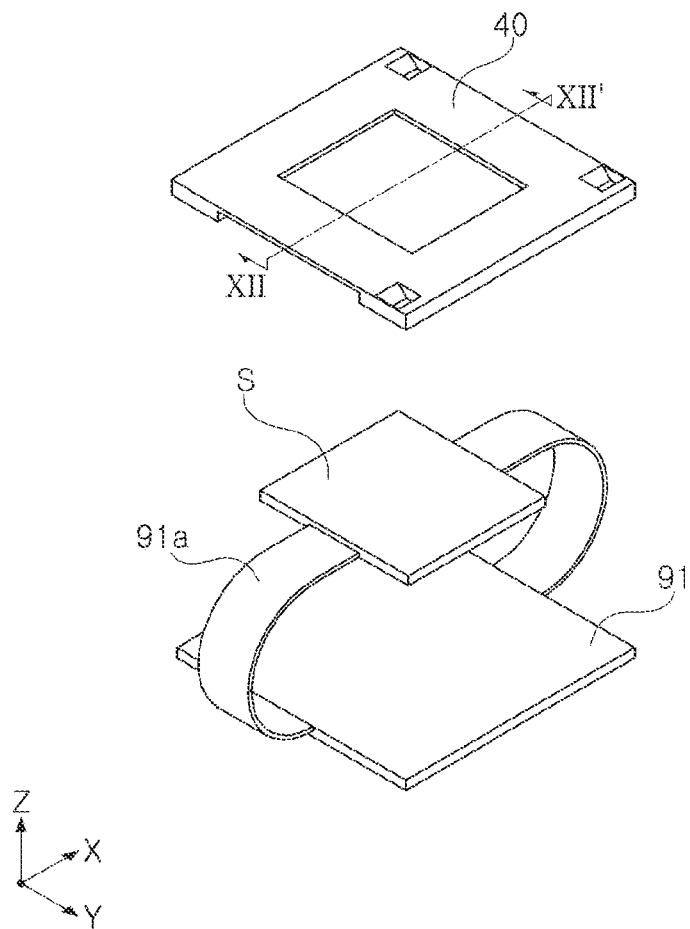
FIG. 47 is an exploded perspective view illustrating the guide member, the image sensor, and the first substrate.
Figure 48:
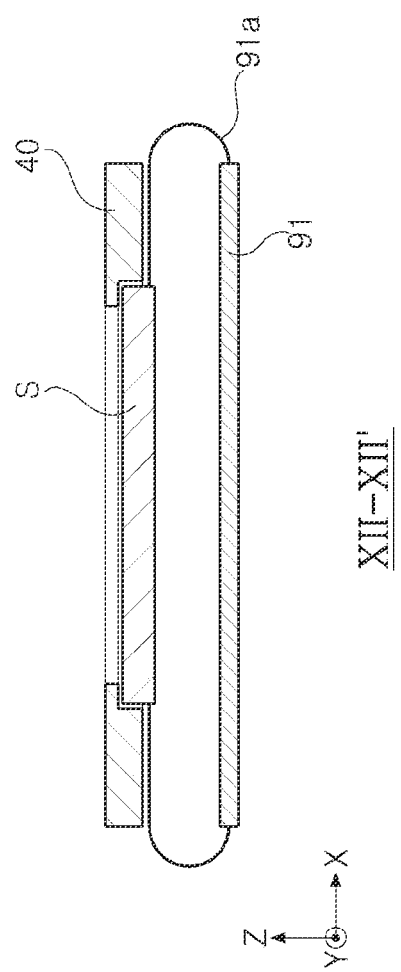
FIG. 48 is a cross-sectional view taken along line XII-XII' of FIG. 47.

FIG. 47 is an exploded perspective view illustrating the guide member, the image sensor and the first substrate; and FIG. 48 is a cross-sectional view taken along line XII-XII' of FIG. 47.

While the image stabilization is performed, the image sensor S may be moved in the first axial (X axis) direction, and the lens holder 10 may be moved in the second axial (Y axis) direction. In addition, the lens holder 10 may be moved in the optical axis (Z axis) direction while autofocusing is performed.

That is, in this example embodiment, when moved in one of the two axial movements required for the image stabilization, the image sensor S rather than the lens module 10 may be moved. Therefore, the image stabilization may be performed by the smaller driving force, and the components included in the actuator 5 may be made smaller.

Referring to FIGS. 47 and 48, the image sensor S may be electrically connected to the first substrate 91. For example, the image sensor S may be connected to the first substrate 91 by a connection unit 91*a*. The connection unit 91*a* may have one side connected to the first substrate 91, and the other side connected to the image sensor S.

The image sensor S may be moved in one axial direction (e.g., first axial (X axis) direction), and the connection unit 91*a* connecting the image sensor S and the first substrate 91 to each other may be flexible.

For example, the connection unit 91*a* may be the flexible film on which the conductor is patterned, or may be the plurality of cables. Therefore, the connection unit 91*a* may be bent when the image sensor S is moved.

In this example embodiment, the image sensor S may be moved in one axial direction to minimize tension applied to the connection unit 91*a* during the movement of the image sensor S, thereby ensuring the actuator to be stably driven.

As set forth above, the actuator for a camera, the camera module and the portable electronic device including the same according to an example embodiment of the present disclosure may have the improved image stabilization performance.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for a camera comprising:
   a housing having an inner space;
   a base and a carrier, disposed in the housing in one direction;
   a first drive unit generating driving forces in a first direction perpendicular to the one direction and a second direction perpendicular to both the one direction and the first direction, and including a plurality of magnets and a plurality of coils; and
   a second drive unit generating a driving force in the one direction, and including a magnet and a coil,
   wherein an optical member is disposed on the carrier,
   wherein the carrier and the base are configured to be moved together in the first direction and the second direction, and
   wherein the carrier is configured to be moved relative to the base in the one direction.

2. The actuator for a camera of claim 1, further comprising a guide member disposed between the housing and the base,
   wherein the guide member is configured to be moved together with the carrier and the base in the first direction.

3. The actuator for a camera of claim 2, wherein the first drive unit comprises:
   a first sub drive unit including a first magnet and a first coil facing the first magnet in the one direction; and
   a second sub drive unit including a second magnet and a second coil facing the second magnet in the one direction,
   wherein the first magnet is mounted on the guide member, and the second magnet is mounted on the base.

4. The actuator for a camera of claim 3, wherein a first substrate is mounted on the housing,
   wherein the first coil and the second coil are disposed on one surface of the first substrate, and
   wherein a first yoke on which a magnetic force acts between the first yoke and the first magnet and a second yoke on which a magnetic force acts between the second yoke and the second magnet are disposed on the other surface of the first substrate.

5. The actuator for a camera of claim 2, further comprising:
   a first ball member rolling in the first direction disposed between the guide member and the housing; and
   a second ball member rolling in the second direction disposed between the guide member and the base.

6. The actuator for a camera of claim 5, wherein a first guide groove defining a rolling direction of the first ball member is positioned in at least one of surfaces of the guide member and the housing, the surfaces opposing each other in the one direction, and
   wherein a second guide groove defining a rolling direction of the second ball member is positioned in at least one of surfaces of the guide member and the base, the surfaces opposing each other in the one direction.

7. The actuator for a camera of claim 1, wherein the first drive unit comprises:
   a first sub drive unit including a first magnet and a first coil facing the first magnet in the one direction; and
   a second sub drive unit including a second magnet and a second coil facing the second magnet in the one direction,
   wherein the first magnet and the second magnet are mounted on the base.

8. The actuator for a camera of claim 7, further comprising:
   a first ball member rolling in the first direction and the second direction disposed between the housing and the base; and
   a first substrate mounted on the housing,
   wherein the first coil and the second coil are disposed on one surface of the first substrate, and
   wherein a first yoke on which a magnetic force acts between the first yoke and the first magnet and a second yoke on which a magnetic force acts between the second yoke and the second magnet are disposed on the other surface of the first substrate.

9. The actuator for a camera of claim 7, wherein the first drive unit further includes a first position sensing unit facing the first magnet and the second magnet in the one direction,
   wherein at least one of the first coil and the second coil includes two coils, and
   wherein the first position sensing unit includes at least three position sensors, and two of the at least three position sensors are disposed adjacent to the two coils.

10. The actuator for a camera of claim 1, further comprising a first substrate mounted on the housing,
wherein the magnet of the second drive unit includes at least two magnets,
wherein the coil of the second drive unit includes at least two coils,
wherein the two magnets are respectively disposed on an upper surface and a lower surface of the carrier, and
wherein any one of the two coils is disposed on the first substrate, and the other coil is disposed on a second substrate positioned spaced apart from the first substrate in the one direction.

11. The actuator for a camera of claim 1, wherein the carrier comprises a body portion and a guide portion extended from one side of the body portion in the one direction,
wherein the base includes a seating portion facing the body portion in the one direction and a receiving portion extended from one side of the seating portion in the one direction, and
wherein at least a portion of the guide portion faces the receiving portion in the direction perpendicular to the one direction.

12. The actuator for a camera of claim 11, further comprising:
a third ball member disposed between the guide portion and the receiving portion; and
a third guide groove in which the third ball member is disposed positioned in surfaces of the guide portion and the receiving portion, the surfaces opposing each other in the direction perpendicular to the one direction.

13. The actuator for a camera of claim 12, wherein the third ball member includes a first ball group and a second ball group, and the first ball group and the second ball group each include a plurality of balls disposed in the one direction, and
wherein the number of the plurality of balls included in the first ball group is greater than the number of the plurality of balls included in the second ball group.

14. The actuator for a camera of claim 13, wherein at least two of the plurality of balls included in the first ball group are respectively in contact with the third guide groove at four points, and
wherein at least two of the plurality of balls included in the second ball group are respectively in contact with the third guide groove at three points.

15. The actuator for a camera of claim 14, wherein a distance between the at least two balls in contact with the third guide groove at four points is greater than a distance between the at least two balls in contact with the third guide groove at three points.

16. The actuator for a camera of claim 13, further comprising:
a first magnetic material disposed on the guide portion; and
a second magnetic material disposed on the receiving portion,
wherein a magnetic force is generated between the first magnetic material and the second magnetic material in the direction perpendicular to the one direction, and
wherein the first magnetic material and the second magnetic material are disposed closer to the first ball group than to the second ball group.

17. A camera module comprising:
the actuator for a camera of claim 1; and
a lens module fixed to the housing and including at least one lens,
wherein the optical member is an image sensor, and the image sensor is moved together with the carrier in the one direction, the first direction and the second direction.

18. A camera module comprising:
the actuator for a camera of claim 1; and
an image sensor fixed to the housing,
wherein the optical member is a lens module including at least one lens, and the lens module is moved together with the carrier in the one direction, the first direction and the second direction.

19. An actuator for a camera comprising:
a housing;
a base movable relative to the housing in a first direction perpendicular to an optical axis direction and a second direction perpendicular to the first direction and the optical axis direction;
a carrier disposed on the base and movable relative to the base in the optical axis direction; and
an image sensor disposed on the carrier.

20. The actuator for a camera of claim 19, further comprising:
a first magnet facing a first coil in the optical axis direction to generate a driving force on the base in the first direction;
a second magnet facing a second coil in the optical axis direction to generate a driving force on the base in the second direction; and
a third magnet facing a third coil in the optical axis direction to generate a driving force on the carrier in the optical axis direction.

21. The actuator for a camera of claim 20, further comprising a guide member disposed between the housing and the base,
wherein the first magnet is disposed on the guide member,
wherein the second magnet is disposed on the base, and
wherein movement of the guide member in the first direction moves the base in the first direction.

22. The actuator for a camera of claim 19, further comprising a guide member disposed between the housing and the base,
wherein movement of the guide member in the first direction moves the base in the first direction.

23. The actuator for a camera of claim 22, further comprising:
a first ball member rolling in the first direction disposed between the guide member and the housing; and
a second ball member rolling in the second direction disposed between the guide member and the base.

24. A camera module comprising:
the actuator for a camera of claim 19; and
a lens module fixed to the housing and including at least one lens,
wherein light refracted by the lens module is incident on the image sensor.

25. An actuator for a camera comprising:
a housing;
a guide member disposed on the housing, and movable relative to the housing in a first direction perpendicular to an optical axis direction;
a first ball member rolling in the first direction disposed between the guide member and the housing;
a base disposed on the guide member, movable in the first direction with the guide member, and movable relative to the guide member in a second direction perpendicular to the first direction and the optical axis direction;

a second ball member rolling in the second direction disposed between the guide member and the base;

a carrier disposed on the base, and movable relative to the base in the optical axis direction; and a lens module including at least one lens, and disposed on the carrier.

26. The actuator for a camera of claim 25, further comprising an elastic member connecting the base and the carrier, wherein the elastic member comprises a fixed portion fixed to the base, a moving portion disposed in the fixed portion and fixed to the carrier, and a bent portion connecting the fixed portion and the moving portion to each other.

27. The actuator for a camera of claim 25, further comprising a third ball member disposed between the base and the carrier.

28. The actuator for a camera of claim 25, further comprising a third ball member rolling in the first direction and the second direction disposed between the base and the housing.

29. An actuator for a camera comprising:

a housing;

a guide member disposed on the housing, and movable relative to the housing in a first direction perpendicular to an optical axis direction;

a carrier disposed on the housing, and movable relative to the housing in the optical axis direction;

a lens holder disposed on the carrier, and movable relative to the carrier in a second direction perpendicular to the first direction and the optical axis direction;

a lens module disposed on the lens holder, and including at least one lens; and an image sensor disposed on the guide member, wherein light refracted by the lens module is incident on the image sensor.

30. The actuator for a camera of claim 29, further comprising:

a first ball member rolling in the first direction disposed between the guide member and the housing;

a second ball member rolling in the second direction disposed between the carrier and the lens holder; and a third ball member rolling in the optical axis direction disposed between the carrier and the housing.

31. The actuator for a camera of claim 29, further comprising:

a first magnet facing a first coil in the optical axis direction to generate a driving force on the guide member in the first direction;

a second magnet facing a second coil in the second direction to generate a driving force on the lens holder in the second direction; and a third magnet facing a third coil in the first direction to generate a driving force on the carrier in the optical axis direction.

* * * * *